United States Patent
Yoo et al.

(10) Patent No.: US 11,510,194 B2
(45) Date of Patent: *Nov. 22, 2022

(54) MIXED NUMEROLOGY OFDM DESIGN

(71) Applicant: QUALCOMM Incorporated, San Diego, CA (US)

(72) Inventors: Taesang Yoo, San Diego, CA (US); Siddhartha Mallik, San Diego, CA (US); Arumugam Chendamarai Kannan, San Diego, CA (US); Jelena Damnjanovic, Del Mar, CA (US); Madhavan Srinivasan Vajapeyam, San Diego, CA (US); Jun Wang, Poway, CA (US); Yongbin Wei, La Jolla, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

This patent is subject to a terminal disclaimer.

(21) Appl. No.: 16/805,322

(22) Filed: Feb. 28, 2020

(65) Prior Publication Data
US 2020/0205154 A1 Jun. 25, 2020

Related U.S. Application Data

(63) Continuation of application No. 14/532,714, filed on Nov. 4, 2014, now Pat. No. 10,772,092.
(Continued)

(51) Int. Cl.
*H04L 5/14* (2006.01)
*H04W 72/04* (2009.01)
(Continued)

(52) U.S. Cl.
CPC ......... *H04W 72/0446* (2013.01); *H04J 11/00* (2013.01); *H04L 1/18* (2013.01);
(Continued)

(58) Field of Classification Search
CPC ............... H04J 11/00; H04J 2011/0009; H04J 2011/0013; H04L 1/18; H04L 1/1854;
(Continued)

(56) References Cited

U.S. PATENT DOCUMENTS 8,457,260 B2   6/2013   Khandekar et al.
8,532,205 B2   9/2013   Moon et al.
(Continued)

FOREIGN PATENT DOCUMENTS

CN   1902841 A   1/2007
CN   1960352 A   5/2007
(Continued)

OTHER PUBLICATIONS

Ahmadi S., et al., "Proposal for IEEE 802.16m Frame Structure", IEEE 802.16 Broadband Wireless Access Working Group, IEEE, Piscataway, NJ, USA, Mar. 17, 2008 (Mar. 17, 2008), XP040391654, pp. 1-22.
(Continued)

*Primary Examiner* — Mansour Oveissi
(74) *Attorney, Agent, or Firm* — QUALCOMM Incorporated

(57) ABSTRACT

Methods, systems, and devices are described for hierarchical communications and low latency support within a wireless communications system. An eNB and/or a UE may be configured to operate within the wireless communications system which is at least partially defined through a first layer
(Continued)

with first layer transmissions having a first subframe type and a second layer with second layer transmissions having a second subframe type. The first subframe type may have a first round trip time (RTT) between transmission and acknowledgment of receipt of the transmission, and the second layer may have a second RTT that is less than the first RTT. Subframes of the first subframe type may be multiplexed with subframes of the second subframe type, such as through time division multiplexing. In some examples symbols of different duration may be multiplexed such that they different symbol durations coexist.

30 Claims, 27 Drawing Sheets

Related U.S. Application Data

(60) Provisional application No. 61/920,107, filed on Dec. 23, 2013.

(51) Int. Cl.
| | | |
|---|---|---|
| *H04L 5/00* | (2006.01) | |
| *H04J 11/00* | (2006.01) | |
| *H04L 1/18* | (2006.01) | |
| *H04L 27/26* | (2006.01) | |
| *H04W 74/08* | (2009.01) | |
| *H04L 43/0864* | (2022.01) | |
| *H04W 16/32* | (2009.01) | |

(52) U.S. Cl.
CPC ............ *H04L 1/1854* (2013.01); *H04L 5/001* (2013.01); *H04L 5/0007* (2013.01); *H04L 5/0037* (2013.01); *H04L 5/0044* (2013.01); *H04L 5/0055* (2013.01); *H04L 5/0076* (2013.01); *H04L 5/14* (2013.01); *H04L 27/2602* (2013.01); *H04L 27/2605* (2013.01); *H04L 43/0864* (2013.01); *H04W 16/32* (2013.01); *H04W 72/0453* (2013.01); *H04W 74/08* (2013.01); *H04J 2011/0009* (2013.01); *H04J 2011/0013* (2013.01)

(58) Field of Classification Search
CPC ............ H04L 27/2602; H04L 27/2605; H04L 43/0864; H04L 5/0007; H04L 5/001; H04L 5/0037; H04L 5/0044; H04L 5/0055; H04L 5/0076; H04L 5/14; H04W 16/32; H04W 72/0446; H04W 72/0453; H04W 74/08
See application file for complete search history.

(56) References Cited

U.S. PATENT DOCUMENTS

| | | | |
|---|---|---|---|
| 8,588,203 | B2 | 11/2013 | Agrawal et al. |
| 9,100,155 | B2 | 8/2015 | Luo et al. |
| 9,608,777 | B2 | 3/2017 | Malladi et al. |
| 9,608,778 | B2 | 3/2017 | Malladi et al. |
| 10,412,728 | B2 | 9/2019 | Malladi et al. |
| 10,772,092 | B2 | 9/2020 | Yoo et al. |
| 2005/0113099 | A1 | 5/2005 | Eriksson et al. |
| 2007/0047485 | A1 | 3/2007 | Gorokhov et al. |
| 2007/0058595 | A1 | 3/2007 | Classon et al. |
| 2007/0064669 | A1 | 3/2007 | Classon et al. |
| 2007/0195688 | A1 | 8/2007 | Bhushan et al. |
| 2007/0195690 | A1 | 8/2007 | Bhushan et al. |
| 2008/0095195 | A1 | 4/2008 | Ahmadi et al. |
| 2009/0097422 | A1 | 4/2009 | Halbauer et al. |
| 2009/0116427 | A1 | 5/2009 | Marks et al. |
| 2009/0116435 | A1 | 5/2009 | Koorapaty et al. |
| 2009/0175369 | A1 | 7/2009 | Atarashi et al. |
| 2009/0185476 | A1 | 7/2009 | Tsai et al. |
| 2009/0185632 | A1 | 7/2009 | Cai et al. |
| 2009/0217118 | A1 | 8/2009 | Miki et al. |
| 2010/0182975 | A1* | 7/2010 | Malladi ............... H04L 5/023 370/330 |
| 2010/0278123 | A1 | 11/2010 | Fong et al. |
| 2011/0026461 | A1 | 2/2011 | Tee et al. |
| 2011/0032850 | A1 | 2/2011 | Cai |
| 2011/0085457 | A1 | 4/2011 | Chen et al. |
| 2011/0096783 | A1* | 4/2011 | Cai ..................... H04L 5/0044 370/395.4 |
| 2011/0268062 | A1 | 11/2011 | Ji et al. |
| 2011/0268135 | A1 | 11/2011 | Kim et al. |
| 2011/0269442 | A1 | 11/2011 | Han et al. |
| 2011/0310837 | A1 | 12/2011 | Classon et al. |
| 2012/0082038 | A1 | 4/2012 | Xu et al. |
| 2012/0230270 | A1* | 9/2012 | Kim ................... H04L 27/2607 370/329 |
| 2012/0236783 | A1 | 9/2012 | Park et al. |
| 2012/0320860 | A1 | 12/2012 | Chun et al. |
| 2013/0002815 | A1 | 1/2013 | Smoot et al. |
| 2013/0028150 | A1* | 1/2013 | Ma ..................... H04L 27/2626 370/280 |
| 2013/0034071 | A1* | 2/2013 | Lee ..................... H04W 72/042 370/329 |
| 2013/0194931 | A1 | 8/2013 | Lee et al. |
| 2013/0215801 | A1* | 8/2013 | Mai ..................... H04J 3/02 370/280 |
| 2013/0301491 | A1 | 11/2013 | Bashar et al. |

FOREIGN PATENT DOCUMENTS

| | | |
|---|---|---|
| CN | 101151818 A | 3/2008 |
| CN | 101189816 A | 5/2008 |
| CN | 101369878 A | 2/2009 |
| CN | 101404539 A | 4/2009 |
| CN | 101404636 A | 4/2009 |
| CN | 101416554 A | 4/2009 |
| CN | 101437300 A | 5/2009 |
| CN | 101459581 A | 6/2009 |
| CN | 101478516 A | 7/2009 |
| CN | 101542942 A | 9/2009 |
| CN | 101567774 A | 10/2009 |
| CN | 101572593 A | 11/2009 |
| CN | 101855880 A | 10/2010 |
| CN | 101904125 A | 12/2010 |
| CN | 101940024 A | 1/2011 |
| CN | 102055575 A | 5/2011 |
| CN | 102257751 A | 11/2011 |
| CN | 102273162 A | 12/2011 |
| CN | 102348268 A | 2/2012 |
| CN | 102396197 A | 3/2012 |
| CN | 102668468 A | 9/2012 |
| CN | 102857463 A | 1/2013 |
| CN | 104205668 A | 12/2014 |
| EP | 1073228 A1 | 1/2001 |
| EP | 2188991 A1 | 5/2010 |
| EP | 2422568 A1 | 2/2012 |
| EP | 3687102 A1 | 7/2020 |
| JP | 2007214 | 8/2007 |
| JP | 2011504018 A | 1/2011 |
| JP | 2011507334 A | 3/2011 |
| WO | 2005122516 | 12/2005 |
| WO | 2006105005 A2 | 10/2006 |
| WO | 2007025160 A2 | 3/2007 |
| WO | 2008049028 A1 | 4/2008 |
| WO | 2008070530 | 6/2008 |
| WO | 2008093424 A1 | 8/2008 |
| WO | 2009062115 A2 | 5/2009 |
| WO | 2011056229 A2 | 5/2011 |
| WO | 2011140109 A1 | 11/2011 |
| WO | 2012086074 A1 | 6/2012 |
| WO | 2013041138 A1 | 3/2013 |
| WO | 2013137677 A1 | 9/2013 |

(56) References Cited

OTHER PUBLICATIONS

Dahlman E, et al., "LTE Radio Access: An Overview", (Chapter 7) In: "4G: LTE/LTE-Advanced for Mobile Broadband (second edition) [Kindle Edition]", Oct. 7, 2013 (Oct. 7, 2013), Academic Press, Elsevier, ISBN: 978-0-12-419985-9 pp. 103-119.

Dahlman E, et al., "Physical Transmission Resources (Chapter 9)" In: "4G: LTE/LTE-Advanced for Mobile Broadband (second edition) [Kindle Edition]", Oct. 7, 2013 (Oct. 7, 2013), Academic Press, XP055167425, ISBN: 978-0-12-419997-2 pp. 141-159, p. 141-p. 147.

Erhan D., "Priority Sending Algorithm for Small Data Packets Based on RPR Technology," Aug. 31, 2006, Wanfang Database.

European Search Report—EP20164014—Search Authority—The Hague—dated Jun. 15, 2020.

Huawei: "TDD HARQ RTT and Processing Number," TSG-RAN WG1 #51bis, R1-080126, Sevilla, Spain, Jan. 14-18, 2008, (Jan. 8, 2008), 12 pages.

International Search Report and Written Opinion—PCT/US2014/064149—ISA/EPO—dated Feb. 18, 2015.

CMCC, et al., "Paging Subframe Pattern for TDD", 3GPP TSG RAN WG2 #61bis, R2-081995, Mar. 31-Apr. 4, 2008 Shenzhen, China, pp. 1-10.

Huawei: "Backhaul Subframe Configuration and HARQ for FDD Type 1 Relay", 3GPP TSG RAN WG1 Meeting #59, R1-094724, Jeju, Korea, Nov. 9-13, 2009, 9 Pages.

LG Electronics: "Downlink Resource Allocation", 3GPP TSG RAN WG1#42, R1-050835 London, United Kingdom, Aug. 29, 2005-Sep. 2, 2005, 4 Pages.

LG Electronics Inc: "Backhaul Subframe Allocation and HARQ Timeline", TSG-RAN WG1 Meeting #60, R1-101361, San Francisco, USA, Feb. 22-26, 2010, 7 Pages.

NTT Docomo: "Comparison of System Level Throughput Between Single-Carrier FDMA and OFDMA in Evolved UTRA Uplink", TSG-RAN WG1 Meeting #43, R1-051420, Seoul, Korea, Nov. 7-11, 2005, pp. 1-11.

* cited by examiner

MIXED NUMEROLOGY OFDM DESIGN

CROSS REFERENCES

The present Application for patent is a continuation of U.S. patent application Ser. No. 14/532,714, entitled "Mixed Numerology OFDM design," filed Nov. 4, 2014, which claims priority to U.S. Provisional Patent Application No. 61/920,107, entitled "LTE Hierarchical Burst Mode," filed Dec. 23, 2013, both of which are expressly incorporated by reference herein.

BACKGROUND

The following relates generally to wireless communication, and more specifically to techniques for hierarchical communications in wireless communications systems.

A wireless communication network may include a number of base stations that can support communication for a number of mobile devices. A mobile device may communicate with a base station via downlink (DL) and uplink (UL) transmissions. The downlink (or forward link) refers to the communication link from the base station, such as an enhanced NodeB (eNB), to a mobile device, also referred to as a user equipment (UE). The uplink (or reverse link) refers to the communication link from the mobile device to the base station.

Multiple access technologies may use Frequency Division Duplexing (FDD) or Time Division Duplexing (TDD) to provide uplink and downlink communications over one or more carriers. TDD operation may provide relatively flexible deployments without requiring paired spectrum resources. TDD formats include transmission of frames of data, each including a number of different subframes in which different subframes may be uplink or downlink subframes. In systems that operate using TDD, different formats may be used in which uplink and downlink communications may be asymmetric. FDD operation utilizes different carriers for concurrent uplink and downlink communications.

In some wireless communication networks, base stations and UEs may support operation on multiple carriers, which may be referred to as carrier aggregation. Carrier aggregation may be used to increase throughput between a base station supporting multiple component carriers and a mobile device, and mobile devices may be configured to communicate using multiple component carriers associated with multiple base stations.

In some instances, transmission errors between mobile devices and base stations are avoided and/or corrected by utilizing an automatic repeat request (ARQ) scheme. An ARQ scheme may be employed to detect whether a received packet is in error. For example, in an ARQ scheme, a receiver may notify a transmitter with a positive acknowledgment (ACK), when a packet is received free from errors; and the receiver may notify the transmitter with a negative acknowledgment (NACK), if an error is detected. A hybrid ARQ (HARQ) scheme may be used to correct some errors and to detect and discard certain uncorrectable packets. In some scenarios, however, the overall HARQ delay may cause certain inefficiencies in wireless communications. Also, in some instances, mobile devices within a system may have varying latency requirements, and inefficient operation may be exacerbated for such devices.

SUMMARY

The described features generally relate to one or more improved systems, methods, and/or devices for hierarchical communications and low latency support within a wireless communications system. An eNB and/or a UE may be configured to operate within the multi-layered wireless communications system. The system may include first layer transmissions having a first subframe type and second layer transmissions having a second subframe type. The first subframe type may have a first round trip time (RTT) between transmission and acknowledgment of receipt of the transmission, and the second layer may have a second RTT that is less than the first RTT. In some examples, subframes of the first subframe type may be multiplexed with subframes of the second subframe type, for example through time division multiplexing.

In some examples, an eNB and/or UE may transmit, in a frame, one or more subframes having a first subframe type. Subframes of the first subframe type may be transmitted concurrently, on different carriers. The eNB and/or UE may also transmit, in the frame, a subframe of a second subframe type using one carrier. The carrier transmitting the second subframe type may have a bandwidth that is greater than the bandwidth of the first subframe type.

In still other examples, multiple symbol durations may coexist within a system to account for varying latency requirements. Different regions of a carrier may have different symbol durations, and the regions may be dynamically adjusted to account for changing latency demands of traffic within the system.

A method of wireless communication is described. The method may include configuring a carrier with a first region having a first symbol duration and a second region having a second symbol duration different from the first symbol duration, where the first and second regions are time-division multiplexed (TDM) or frequency-division multiplexed (FDM), and communicating with a user equipment (UE) using the first or second region based at least in part on a latency requirement of the UE.

An apparatus for wireless communication is also described. The apparatus may include a processor, memory in electronic communication with the processor, and instructions stored in the memory. The instructions may be executable by the processor to configure a carrier with a first region having a first symbol duration and a second region having a second symbol duration different from the first symbol duration, where the first and second regions are time-division multiplexed (TDM) or frequency-division multiplexed (FDM), and communicate with a user equipment (UE) using the first or second region based at least in part on a latency requirement of the UE.

A further apparatus for wireless communication is also described. The apparatus may include means for configuring a carrier with a first region having a first symbol duration and a second region having a second symbol duration different from the first symbol duration, where the first and second regions are time-division multiplexed (TDM) or frequency-division multiplexed (FDM), and means for communicating with a user equipment (UE) using the first or second region based at least in part on a latency requirement of the UE.

A computer readable medium storing code for wireless communication is also described. The code may include instructions executable to configure a carrier with a first region having a first symbol duration and a second region having a second symbol duration different from the first symbol duration, where the first and second regions are time-division multiplexed (TDM) or frequency-division multiplexed (FDM), and communicate with a user equipment (UE) using the first or second region based at least in part on a latency requirement of the UE.

Some examples of the method, apparatuses, or computer-readable media described above may also include features, means, or instructions for adjusting a portion of the carrier occupied by the second region based at least in part the latency requirement of the UE. In some examples, the first and second regions are TDM, and adjusting the portion of the carrier occupied by the second region includes adjusting a time duration or periodicity of the second region. In other examples, the first and second regions are FDM, and adjusting the portion of the carrier occupied by the second region includes adjusting a bandwidth of the second region. Further, some examples may include features, means, or instructions for configuring a guard band between the first and second regions. Additionally or alternatively, configuring the carrier may include transmitting a signal in a symbol of the first region, the signal indicative of the second symbol duration and it may include at least one of radio resource control (RRC) signaling, a broadcast message, Layer 1 signaling, or a media access control (MAC) layer signaling.

Some examples of the method, apparatuses, or computer-readable media described above may also include features, means, or instructions for configuring a third region of the carrier, the third region having the second symbol duration, wherein the first and second regions are FDM, and wherein the third region is TDM with the first and second regions. Some examples may also include features, means, or instructions for configuring a guard band between the first and second regions. In some examples, the second symbol duration is shorter than the first symbol duration.

A further method of wireless communication is also described. The method may include identifying a first region of a carrier, the first region having a first symbol duration, identifying a second region of the carrier, the second region having a second symbol duration different from the first symbol duration, where the first and second regions are time-division multiplexed (TDM) or frequency-division multiplexed (FDM), and communicating with a base station using the first or second region based at least in part on a latency requirement.

A further apparatus for wireless communication is also described. The apparatus may include a processor, memory in electronic communication with the processor, and instructions stored in the memory. The instructions may be executable by the processor to identify a first region of a carrier, the first region having a first symbol duration, identify a second region of the carrier, the second region having a second symbol duration different from the first symbol duration, where the first and second regions are time-division multiplexed (TDM) or frequency-division multiplexed (FDM), and communicate with a base station using the first or second region based at least in part on a latency requirement.

A further apparatus for wireless communication is also described. The apparatus may include means for identifying a first region of a carrier, the first region having a first symbol duration, means for identifying a second region of the carrier, the second region having a second symbol duration different from the first symbol duration, where the first and second regions are time-division multiplexed (TDM) or frequency-division multiplexed (FDM), and means for communicating with a base station using the first or second region based at least in part on a latency requirement.

A further computer-readable medium storing code for wireless communication is also described. The code may include instructions executable to identify a first region of a carrier, the first region having a first symbol duration, identify a second region of the carrier, the second region having a second symbol duration different from the first symbol duration, where the first and second regions are time-division multiplexed (TDM) or frequency-division multiplexed (FDM), and communicate with a base station using the first or second region based at least in part on a latency requirement.

In some examples of the methods, apparatus, or computer-readable media described above, the first and second regions are FDM, and the method, apparatus, or computer-readable medium may include features, means, or instructions for identifying a guard band between the first and second regions. In some examples, identifying the second region of the carrier includes receiving a signal in a symbol of the first region, the signal indicative of the second symbol duration and may include at least one of radio resource control (RRC) signaling, a broadcast message, Layer 1 signaling, or a media access control (MAC) layer signaling.

Some examples may also include features, means, or instructions for identifying a third region of the carrier, the third region having the second symbol duration, where the first and second regions are FDM and where the third region is TDM with the first and second regions. Additionally or alternatively, some examples include features, means, or instructions for identifying a guard band between the first and second regions. In some examples, the second symbol duration is shorter than the first symbol duration.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
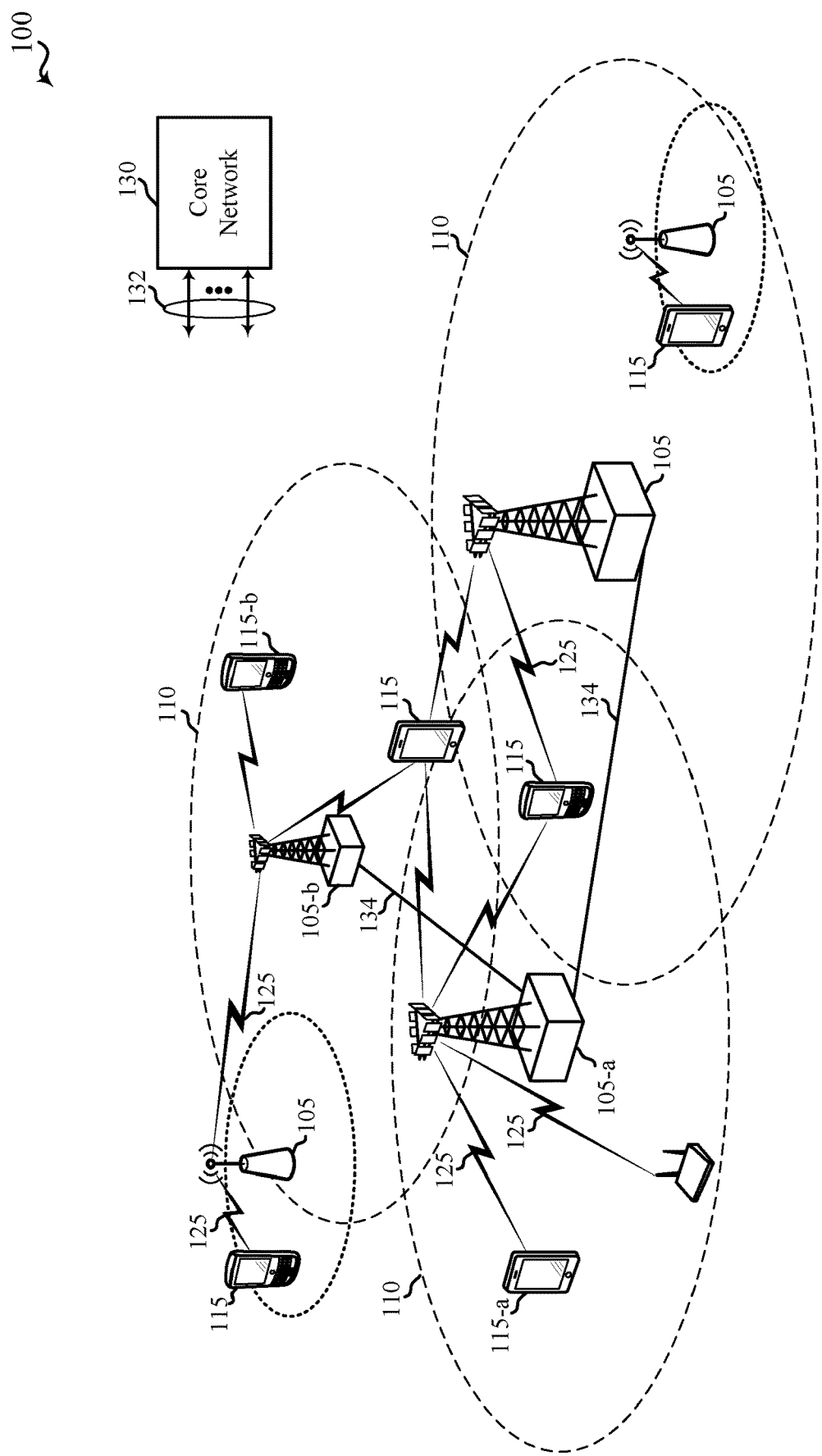
FIG. 1 shows a block diagram conceptually illustrating an example of a telecommunications system, in accordance with an aspect of the present disclosure.

Techniques are described for hierarchical communications within a wireless communications system. Also described are techniques for communicating with orthogonal frequency-division multiplexing (OFDM) symbols of different duration. This may be referred to as mixed OFDM numerology. An eNB and/or a UE, according to various examples, may be configured to operate within the wireless communications system which is partially defined through multiple hierarchical layers or which is configured with mixed OFDM numerology. A first hierarchical layer may support first layer transmissions with a first subframe type, and a second hierarchical layer may support second layer transmissions with a second subframe type. In some examples, as mentioned above, receivers may acknowledge receipt of a transmission by providing a positive acknowledgment (ACK) or negative acknowledgment (NACK) of the transmission through, for example, a HARQ scheme. Receivers operating in the first layer may, in examples, acknowledge receipt of a transmission in a subframe following the subframe in which the transmission was received. Receivers operating in the second layer may, in examples, acknowledge receipt of a transmission in a same subframe as the subframe in which the transmission was received. The time required to transmit an ACK/NACK and receive a retransmission may be referred to as round trip time (RTT), and subframes of the second subframe type may have a second RTT that is shorter than a RTT for subframes of the first subframe type.

In such examples, a latency for receivers operating in the second layer may be reduced relative to latency of the first layer. Reduced latency may provide for enhanced data transfer rates, in some examples, through relatively fast ACK/NACK and any necessary retransmissions. For example, Transmission Control Protocol (TCP) may be used to provide a reliable, ordered, and error-checked delivery of a stream of data between a transmitter and a receiver. TCP can have relatively stringent requirements for TCP segment error rates, and this impact is even more significant as data rates are increased. In order to achieve desired TCP segment error rates, packets may need to be retransmitted one or more times. The latency for ACK/NACK and retransmission may thus impact the time that it may take to achieve the TCP segment error rate, and may thus reduce the overall data rate that is achievable. Thus, reduced latency for such acknowledgments and retransmissions may reduce the time to achieve TCP segment error rates and may thereby allow enhanced data rates. Accordingly, receivers operating in the second hierarchical layer, either exclusively or in combination with operation in the first hierarchical layer, may support enhanced data rates relative to receivers operating exclusively in the first hierarchical layer.

In some further examples, an eNB and/or UE may concurrently transmit, within a frame, one or more subframes having a first subframe type using two or more separate carriers, and transmit, within the frame, a subframe of a second subframe type using one carrier. One or more of the carriers transmitting the first subframe type may have a first bandwidth, and the carrier transmitting the second subframe type may have a second bandwidth that is greater than the first bandwidth. In some examples, the first bandwidth may be 20 MHz, and the second bandwidth may be 40 MHz, 80 MHz, or 160 MHz. In some examples, scalable bandwidth for subframes of the second subframe type may be combined with shorter RTTs such as described above, to provide enhanced data rates.

In still other examples, an eNB may configure and/or a UE may identify, several regions of a carrier having different symbol durations. For instance, a carrier may be configured with a region having a longer symbol duration (e.g., 15 kHz subcarrier spacing) to support typical communications traffic, and the carrier may be configured with a region having a shorter symbol duration (e.g., 60 kHz subcarrier spacing) to serve low latency traffic. In some examples, a system may operate with a longer symbol duration by default, and the system may configure regions with shorter symbol duration on demand. While in other cases, a system may operate with a shorter symbol duration, and it may configure regions with longer symbol duration on demand. The default operation may be depend on traffic within the system, or may depend on particular goals of the system operator.

In some cases, a longer symbol duration may be advantageous. For example, for a given cyclic prefix length, a longer symbol duration may result in lower cyclic prefix overhead. A longer symbol duration may thus provide for better spectral efficiency than a shorter symbol duration. Nonetheless, shorter symbol duration may be desirable for low latency traffic. In addition to the HARQ advantages mentioned above, a shorter symbol duration may mean that each symbol contains fewer subcarriers, which, in turn, may result in shorter transmission, processing, decoding, or response times for devices within the system. A system may thus configure regions of shorter symbol duration on demand for low latency traffic.

The portions of a carrier configured for longer or short symbol duration—e.g., the portions of a carrier having a long symbol duration by default and configured with short-symbol-duration regions—may be adjusted. In the case of TDM, this adjustment may include adjusting duration or periodicity. For FDM, the adjustment may be a bandwidth adjustment.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

Referring first to FIG. 1, a diagram illustrates an example of a wireless communications system 100, in accordance with an aspect of the present disclosure. The wireless communications system 100 includes a plurality of access points (e.g., base stations, eNBs, or WLAN access points) 105, a number of user equipment (UEs) 115, and a core network 130. Some of the access points 105 may communicate with the UEs 115 under the control of a base station controller (not shown), which may be part of the core network 130 or the certain access points 105 (e.g., base stations or eNBs) in various examples. Access points 105 may communicate control information and/or user data with the core network 130 through backhaul links 132. In examples, the access points 105 may communicate, either directly or indirectly, with each other over backhaul links 134, which may be wired or wireless communication links. The wireless communications system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

In some examples, at least a portion of the wireless communications system 100 may be configured to operate on multiple hierarchical layers in which one or more of the UEs 115 and one or more of the access points 105 may be configured to support transmissions on a hierarchical layer that has a reduced latency with respect to another hierarchical layer. In some examples a hybrid UE 115-*a* may communicate with access point 105-*a* on both a first hierarchical layer that supports first layer transmissions with a first subframe type and a second hierarchical layer that supports second layer transmissions with a second subframe type. For example, access point 105-*a* may transmit subframes of the second subframe type that are time division duplexed with subframes of the first subframe type.

In some examples, hybrid UE 115-*a* may acknowledge receipt of a transmission by providing ACK/NACK for the transmission through, for example, a HARQ scheme. Acknowledgments from hybrid UE 115-*a* for transmissions in the first hierarchical layer may be provided, in some examples, after a predefined number of subframes following the subframe in which the transmission was received. The hybrid UE 115-*a*, when operating in the second hierarchical layer may, in examples, acknowledge receipt in a same subframe as the subframe in which the transmission was received. The time required to transmit an ACK/NACK and receive a retransmission may be referred to as round trip time (RTT), and thus subframes of the second subframe type may have a second RTT that is shorter than a RTT for subframes of the first subframe type.

In other examples, a second layer UE 115-*b* may communicate with access point 105-*b* on the second hierarchical layer only. Thus, hybrid UE 115-*a* and second layer UE 115-*b* may belong to a second class of UEs 115 that may communicate on the second hierarchical layer, while legacy UEs 115 may belong to a first class of UEs 115 that may communicate on the first hierarchical layer only. Access point 105-*b* and UE 115-*b* may communicate on the second hierarchical layer through transmissions of subframes of the second subframe type. Access point 105-*b* may transmit subframes of the second subframe type exclusively, or may transmit one or more subframes of the first subframe type on the first hierarchical layer that are time division multiplexed with subframes of the second subframe type. Second layer UE 115-*b*, in the event that access point 105-*b* transmits subframes of the first subframe type, may ignore such subframes of the first subframe type. Thus, second layer UE 115-*b* may acknowledge receipt of transmissions in a same subframe as the subframe in which the transmissions are received. Thus, second layer UE 115-*b* may operate with reduced latency compared to UEs 115 that operate on the first hierarchical layer.

Additionally or alternatively, the system may be configured with a carrier or carriers having regions with different, co-existing symbol duration. For instance, a carrier may be configured with a first region having a first symbol duration and second region having a second symbol duration. The regions may be TDM or FDM. An access point 105 may communicate with UEs 115 using the first or second region, or both, depending on a latency requirement of the UE 115.

The access points 105 may wirelessly communicate with the UEs 115 via one or more access point antennas. Each of the access points 105 sites may provide communication coverage for a respective coverage area 110. In some examples, access points 105 may be referred to as a base transceiver station, a radio base station, a radio transceiver, a basic service set (BSS), an extended service set (ESS), a NodeB, eNodeB, Home NodeB, a Home eNodeB, or some other suitable terminology. The coverage area 110 for a base station may be divided into sectors making up only a portion of the coverage area (not shown). The wireless communications system 100 may include access points 105 of different types (e.g., macro, micro, and/or pico base stations). The access points 105 may also utilize different radio technologies, such as cellular and/or WLAN radio access technologies. The access points 105 may be associated with the same or different access networks or operator deployments. The coverage areas of different access points 105, including the coverage areas of the same or different types of access points 105, utilizing the same or different radio technologies, and/or belonging to the same or different access networks, may overlap.

In LTE/LTE-A network communication systems, the terms evolved Node B (eNodeB or eNB) may be generally used to describe the access points 105. The wireless communications system 100 may be a Heterogeneous LTE/LTE-A network in which different types of access points provide coverage for various geographical regions. For example, each access point 105 may provide communication coverage for a macro cell, a pico cell, a femto cell, and/or other types of cell. Small cells such as pico cells, femto cells, and/or other types of cells may include low power nodes or LPNs. A macro cell generally covers a relatively large geographic area (e.g., several kilometers in radius) and may allow unrestricted access by UEs 115 with service subscriptions with the network provider. A small cell would generally cover a relatively smaller geographic area and may allow unrestricted access by UEs 115 with service subscriptions with the network provider, for example, and in addition to unrestricted access, may also provide restricted access by UEs 115 having an association with the small cell (e.g., UEs in a closed subscriber group (CSG), UEs for users in the home, and the like). An eNB for a macro cell may be referred to as a macro eNB. An eNB for a small cell may be referred to as a small cell eNB. An eNB may support one or multiple (e.g., two, three, four, and the like) cells.

The core network 130 may communicate with the eNBs or other access points 105 via a backhaul 132 (e.g., S1 interface, etc.). The access points 105 may also communicate with one another, e.g., directly or indirectly via backhaul links 134 (e.g., X2 interface, etc.) and/or via backhaul links 132 (e.g., through core network 130). The wireless communications system 100 may support synchronous or asynchronous operation. For synchronous operation, the access points 105 may have similar frame timing, and transmissions from different access points 105 may be approximately aligned in time. For asynchronous operation, the access points 105 may have different frame timing, and transmissions from different access points 105 may not be aligned in time. Furthermore, transmissions in the first hierarchical layer and second hierarchical layer may or may not be synchronized among access points 105. The techniques described herein may be used for either synchronous or asynchronous operations.

The UEs 115 are dispersed throughout the wireless communications system 100, and each UE 115 may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNodeBs, small cell eNodeBs, relays, and the like. A UE 115 may also be able to communicate over different access networks, such as cellular or other WWAN access networks, or WLAN access networks.

The communication links 125 shown in wireless communications system 100 may include uplink (UL) transmissions from a UE 115 to an access point 105, and/or downlink (DL) transmissions, from an access point 105 to a UE 115. The downlink transmissions may also be called forward link transmissions while the uplink transmissions may also be called reverse link transmissions. The communications links 125 may carry transmissions of each hierarchical layer which, in some examples, may be multiplexed in the communications links 125. The UEs 115 may be configured to collaboratively communicate with multiple access points 105 through, for example, Multiple Input Multiple Output (MIMO), carrier aggregation (CA), Coordinated Multi-Point (CoMP), or other schemes. MIMO techniques use multiple antennas on the access points 105 and/or multiple antennas on the UEs 115 to transmit multiple data streams. Carrier aggregation may utilize two or more component carriers on a same or different serving cell for data transmission. CoMP may include techniques for coordination of transmission and reception by a number of access points 105 to improve overall transmission quality for UEs 115 as well as increasing network and spectrum utilization.

As mentioned, in some examples access points 105 and UEs 115 may utilize carrier aggregation to transmit on multiple carriers. In some examples, access points 105 and UEs 115 may concurrently transmit in a first hierarchical layer, within a frame, one or more subframes each having a first subframe type using two or more separate carriers. Each carrier may have a bandwidth of, for example, 20 MHz, although other bandwidths may be utilized. Hybrid UE 115-a, and/or second layer UE 115-b may, in certain examples, receive and/or transmit one or more subframes in a second hierarchical layer utilizing a single carrier that has a bandwidth greater than a bandwidth of one or more of the separate carriers. For example, if four separate 20 MHz carriers are used in a carrier aggregation scheme in the first hierarchical layer, a single 80 MHz carrier may be used in the second hierarchical layer. The 80 MHz carrier may occupy a portion of the radio frequency spectrum that at least partially overlaps the radio frequency spectrum used by one or more of the four 20 MHz carriers. In some examples, scalable bandwidth for the second hierarchical layer type may be combined techniques to provide shorter RTTs such as described above, to provide further enhanced data rates.

Each of the different operating modes that may be employed by wireless communication system 100 may operate according to frequency division duplexing (FDD) or time division duplexing (TDD). In some examples, different hierarchical layers may operate according to different TDD or FDD modes. For example, a first hierarchical layer may operate according to FDD while a second hierarchical layer may operate according to TDD. In some examples, OFDMA communications signals may be used in the communications links 125 for LTE downlink transmissions for each hierarchical layer, while single carrier frequency division multiple access (SC-FDMA) communications signals may be used in the communications links 125 for LTE uplink transmissions in each hierarchical layer. Additional details regarding implementation of hierarchical layers in a system such as the wireless communications system 100, as well as other features and functions related to communications in such systems, are provided below with reference to FIGS. 2-19.

Figure 2:
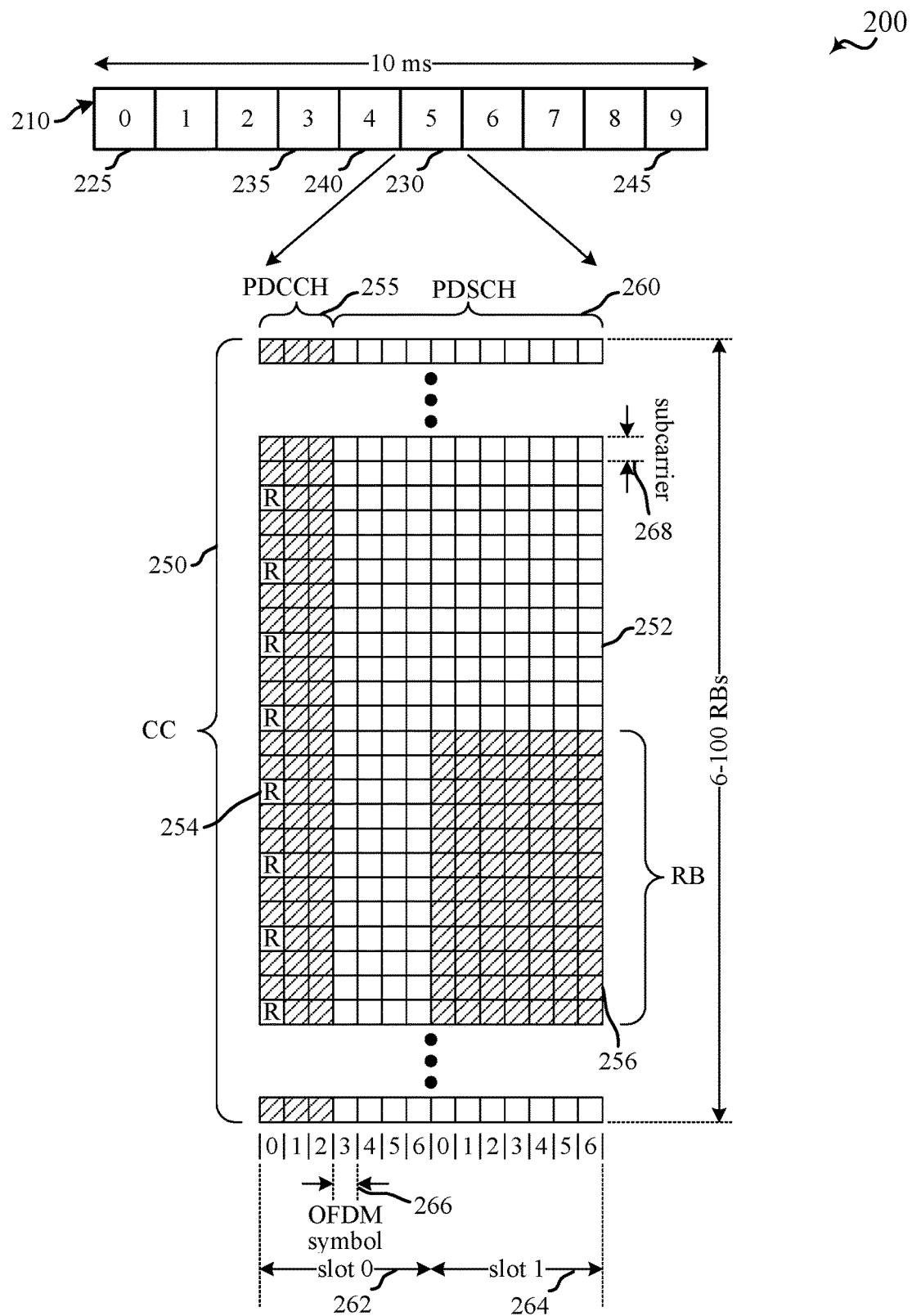
FIG. 2 is a diagram illustrating an example of a downlink frame structure that may be used in a wireless communication system, in accordance with an aspect of the present disclosure.

FIG. 2 is a diagram illustrating an example of a downlink frame structure 200 that may be used in a wireless communication system, including the wireless communication system 100 described above with reference to the FIG. 1. For example, the frame structure 200 may be used in LTE/LTE-A or similar systems. A frame 210 (10 ms) may be divided into 10 equally sized subframes (e.g., subframe 225, 230, etc.). In some examples, frame 210 may be used for transmissions of both a first hierarchical layer and a second hierarchical layer, with one or more subframes within frame 210 used for transmissions of the first hierarchical layer and one or more other subframes within frame 210 used for transmissions of the second hierarchical layer. For example, subframes 225 and 230 may be used for transmissions of the first hierarchical layer, and subframes 235, 240, and 245 may be used for transmissions of the second hierarchical layer. The first hierarchical layer in certain examples may correspond to a legacy LTE/LTE-A layer, and second hierarchical layer may correspond to a low latency layer.

In examples where the first hierarchical layer corresponds to a legacy LTE/LTE-A layer, first layer subframes may include two consecutive time slots 262 and 264. An OFDMA component carrier 250 may be illustrated as a resource grid representing the two time slots 262, 264, each time slot including seven OFDM symbols 266, for a normal cyclic prefix. The resource grid may be divided into multiple resource elements 252. In legacy LTE/LTE-A, a resource block 256 may contain 12 consecutive subcarriers 268 in the frequency domain and, for a normal cyclic prefix in each OFDM symbol 266, 7 consecutive OFDM symbols 266 in the time domain, or 84 resource elements 252. The tone spacing for subcarriers 268 may be 15 kHz, and a useful symbol duration for OFDM symbols 266 may be 66.67 µs. As compared with other symbol duration that may be configured within the system, the symbol duration for OFDM symbols 266 may represent a longer symbol duration. OFDM symbols 266 may also include a cyclic prefix that is, for a normal legacy LTE cyclic prefix, 5.1 µs for a first OFDM symbol 266 in each slot 262, 264, or 4.69 µs for other OFDM symbols 266. As noted, in examples where the second hierarchical layer corresponds to a low latency layer, low latency or burst subframes may replace a number of the downlink subframes (and may be of the same duration). Burst subframes, according to some examples, may include more symbols within the subframe, and each symbol may have a reduced symbol duration relative to the legacy OFDM (or SC-FDM) symbols 266. Burst mode symbols also may have increased tone spacing for subcarriers relative to legacy symbols, and in some examples have a tone spacing of 120 kHz. Additionally or alternatively, frame structure 210 may coexist, e.g., in the same hierarchical layer, with other regions of a carrier having shorter symbol duration. More detailed examples will be described with reference to FIGS. 3A-10.

Some of the resource elements, designated R (e.g., 254), may include DL reference signals (DL-RS). The DL-RS may include Cell-specific RS (CRS) (also sometimes called common RS) and UE-specific RS (UE-RS). UE-RS may be transmitted only on the resource blocks upon which the corresponding physical DL shared channel (PDSCH) 260 is mapped. The number of bits carried by each resource element may depend on the modulation scheme.

As illustrated in FIG. 2, a physical downlink control channel (PDCCH) 255 may be time-division multiplexed with a physical downlink shared channel (PDSCH) 260 and may be fully distributed within the entire bandwidth of the component carrier 250 within a first region of first layer subframe 230. In the example illustrated in FIG. 2, PDCCH 255 takes up the first three symbols of the subframe 230. PDCCH 255 may have more or fewer symbols as is appropriate based on the component carrier bandwidth and amount of control information for the subframe 230.

The PDCCH may carry downlink control information (DCI) in control channel elements (CCEs). The DCI may include, for example, information regarding the downlink scheduling assignments, uplink resource grants, transmission scheme, uplink power control, hybrid automatic return repeat request (HARD) information, modulation and coding schemes (MCS) and other information. In some examples, the DCI may include information for each hierarchical layer. In other examples, subframes of different subframe types may include DCI for different hierarchical layers. A DCI can be UE-specific (dedicated) or cell-specific (common) and placed in different dedicated and common search spaces within the PDCCH depending on the format of the DCI.

In various examples, acknowledgement/negative acknowledgement (ACK/NACK) for downlink transmissions may be performed by Hybrid ARQ Acknowledgement (HARQ-ACK) using a physical uplink control channel (PUCCH). PUCCH resources for HARQ-ACK may be determined based on when a downlink transmission is received. In some examples, HARQ-ACK may be transmitted in PUCCH resources based on a subframe k in which the downlink transmission is received. For legacy FDD operation, in certain examples, HARQ-ACK for downlink transmissions may be reported in a PUCCH subframe determined based on the downlink subframe (e.g., k+4). For legacy TDD operation, HARQ-ACK may be provided in a first available uplink subframe following a certain time period from the downlink subframe k (e.g., the first available subframe k+4 or after). In examples where the first hierarchical layer corresponds to a legacy LTE/LTE-A layer, HARQ-ACK may take several milliseconds. In examples where the second hierarchical layer corresponds to a low latency layer (as will be described in more detail with reference to FIGS. 3A-10), the RTT for acknowledgment may be significantly reduced (e.g., to within a subframe). While the example of FIG. 2 is described with respect to downlink transmissions, similar structures and timing may be used in uplink transmissions which, in some examples, may be transmitted using SC-FDMA symbols.

Figure 3A:
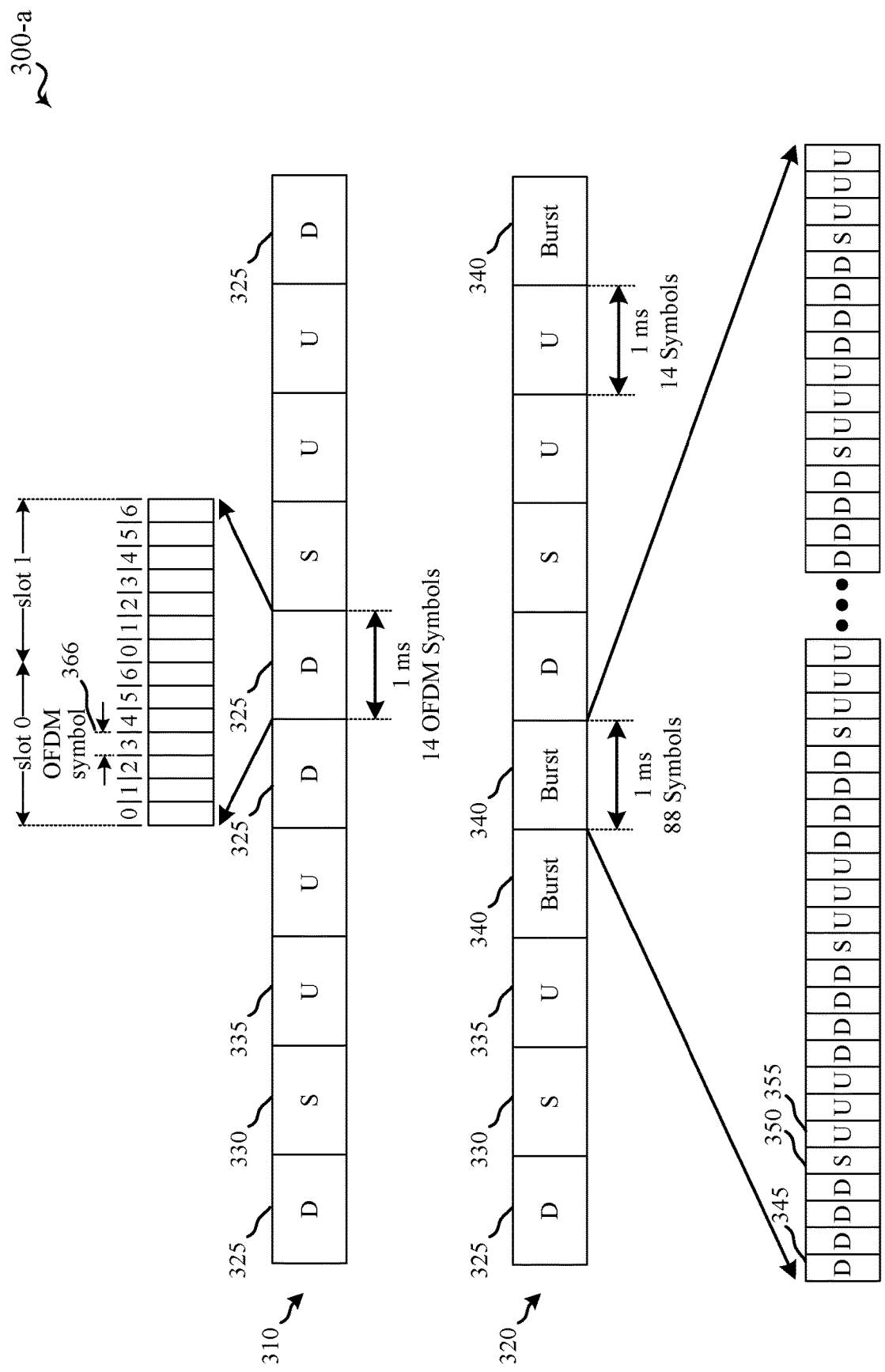
FIG. 3A is a block diagram conceptually illustrating an example of a radio frame and different subframes that may be transmitted on different layers of a wireless communication system, in accordance with an aspect of the present disclosure.

As discussed above, various examples provide communications in a wireless communications system, such as wireless communications system 100 of FIG. 1, according to multiple hierarchical layers. Communications in a first hierarchical layer may use the frame structure, slots, symbols and subcarrier spacing such as described above with respect to FIG. 2, and communications in a second hierarchical layer may use symbols having a reduced symbol duration. FIG. 3A is a block diagram 300-*a* conceptually illustrating an example of radio frames and different subframes that may be transmitted on different layers of a wireless communication system, in accordance with an aspect of the present disclosure. The radio frames of FIG. 3A may be transmitted using portions of the wireless communications system 100 described with reference to FIG. 1 between one or more access points 105 and one or more UEs 115, for example. In this example, a legacy TDD frame 310 may include ten 1 ms subframes that include downlink subframes 325, special subframes 330, and uplink subframes 335. The downlink subframes 325, special subframes 330, and uplink subframes 335 may include a subframe structure as discussed above with respect to FIG. 2, including 14 symbols 366 within each 1 ms subframe. In some examples, downlink subframes 325 may include downlink OFDM symbols, uplink subframes may include SC-FDM symbols, and special subframes 330 may include both uplink SC-FDM symbols and downlink OFDM symbols.

In the example of FIG. 3A, low latency or burst mode frame 320 may replace a number of the downlink subframes 325 with burst subframes 340. Burst subframes 340, according to some examples, may be transmitted in a different hierarchical layer than downlink subframes 325, special subframes 330, and uplink subframes 335. Burst subframes 340, in examples, may include 88 symbols (although, as discussed herein, many different symbol variations may be used in other examples). In the example of FIG. 3A, burst subframes 340 may be TDD burst subframes and may include downlink symbols 345, special symbols 350, and uplink symbols 355. Each of the symbols 345, 350, and 355 may have a reduced symbol duration relative to the legacy OFDM or SC-FDM symbols (e.g., symbols 266 of FIG. 2), and in some examples have a symbol duration of 11.36 μs per symbol, including a useful symbol duration of 8.33 μs and a cyclic prefix duration of 3.03 μs. The symbols 345, 350, or 355 may thus represent a shorter symbol duration as compared to other symbol durations configured with the system. Symbols 345, 350, and 355 may have increased tone spacing for subcarriers relative to legacy symbols, and in some examples have a tone spacing of 60 or 120 kHz. In some examples, a hybrid UE, second layer UE, and/or eNB may generate legacy symbols 366 utilizing a single internal clock configured to generate legacy symbols 366 having a first symbol duration, and may generate the symbols 345, 350, 355 of burst subframes by adapting the clock to generate symbols 345, 350, 355 having a second symbol duration. In other examples, separate clocks may be used to generate legacy symbols 366 and the symbols 345, 350, 355 of burst subframes.

Symbols 345, 350, and 355 may include control channels and shared channels similarly as discussed with respect to FIG. 2, which may be included within symbols or across symbols. In some examples, hybrid UEs (e.g., UE 115-*a* of FIG. 1) may be configured to communicate using both legacy subframes 325, 330, 335, and burst subframes 340. Likewise, second layer UEs (e.g., UE 115-*b* of FIG. 1) may be configured to communicate using only burst subframes 340, and legacy UEs may be configured to communicate using only legacy subframes 325, 330, 335. In examples where a UE may communicate on just one hierarchical layer, subframes of the other hierarchical layer(s) may be ignored.

In the example of FIG. 3A, frame 320 includes three burst subframes 340, although this may increase or decrease based on system requirements, current demands of the system, and/or one or more other factors. For example, an eNB (such as access point 105 of FIG. 1) may determine that no UEs are within its coverage area that may be configured for operation on the second hierarchical layer, and thus not transmit any burst subframes 340. In other cases, an eNB may determine that a relatively large number of UEs are in its coverage area and may configure a relatively large number of subframes as burst subframes 340. In some cases, an eNB may transmit burst subframes exclusively. Such configurations may be set by a carrier, may be semi-static, or may be dynamically changed based on conditions of the wireless communications system at a given time.

Figure 3B:
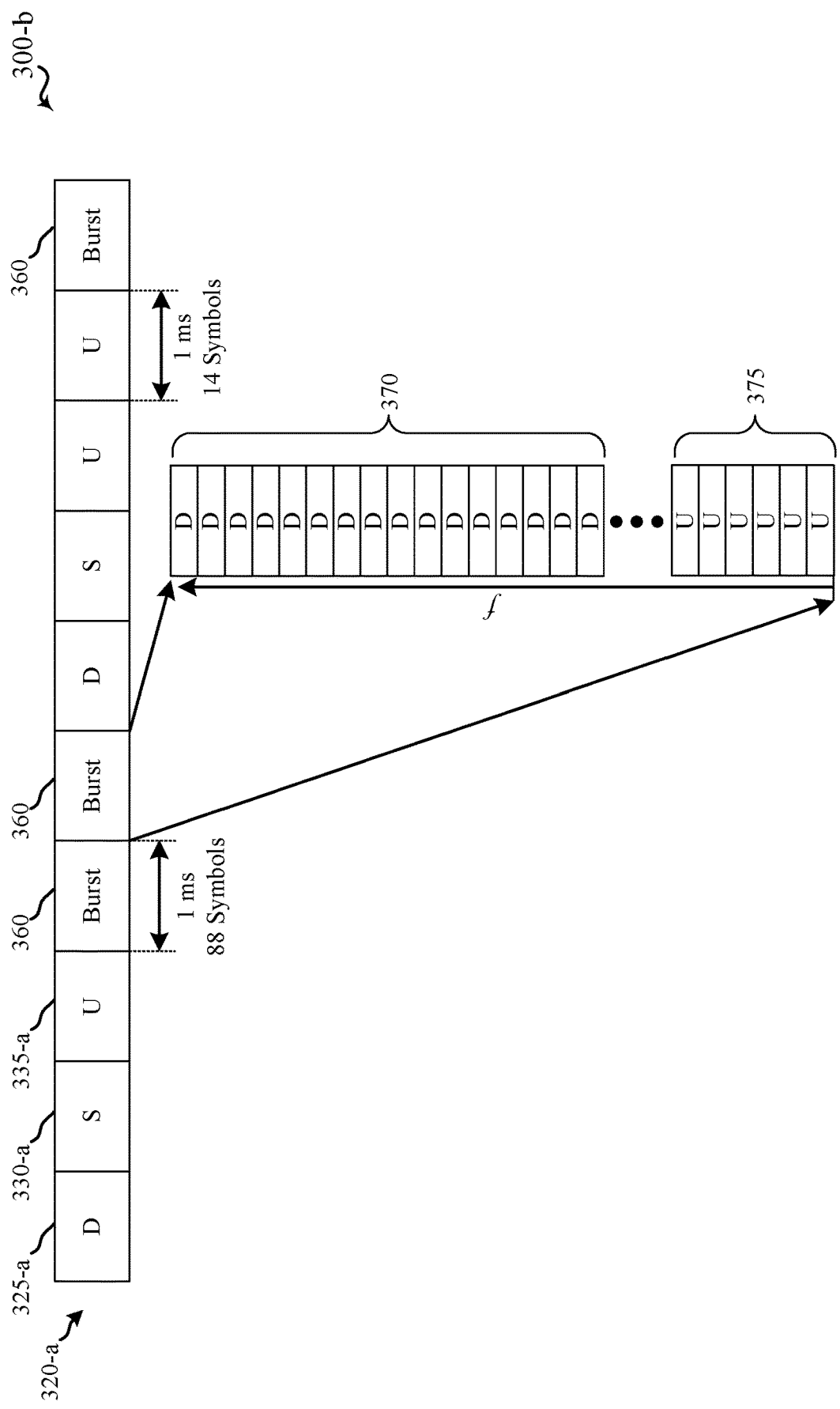
FIG. 3B is a block diagram conceptually illustrating an example of a radio frame and different subframes that may be transmitted on different layers of a wireless communication system, in accordance with an aspect of the present disclosure.

FIG. 3B is a block diagram 300-*b* conceptually illustrating an example of a radio frame and different subframes that may be transmitted on different layers of a wireless communication system, in accordance with an aspect of the present disclosure. The radio frames of FIG. 3B may be transmitted using portions of the wireless communications system 100 described with reference to FIG. 1 between one or more access points 105 and one or more UEs 115, for example. FIG. 3B may include burst mode frame 320-*a*, which may include downlink subframes 325-*a*, special subframes 330-*a*, and uplink subframes 335-*a* similar to downlink subframes 325, special subframes 330, and uplink subframes 335 as described above with reference to FIG. 3A. Additionally, burst mode frame 320-*a* may replace a number of subframes with burst subframes 360.

In the example of FIG. 3B, burst subframes 360 may include a number of frequency bands, such as downlink frequency bands 370 or uplink frequency bands 375. Burst subframes 360 may be similar to the burst subframes 340 of FIG. 3A, in that burst subframes 360 may be transmitted in a different hierarchical layer than downlink subframes 325-*a*, special subframes 330-*a*, and uplink subframes 335-*a*. Burst subframes 360 may be frequency division multiplexed with other subframes of the burst mode frame 320-*a*. In some examples, burst subframes 360 may be referred to as FDD burst subframes, in a manner similar to the TDD burst subframes described above with reference to FIG. 3A; and they may include both downlink frequency bands 370 and uplink frequency bands 375.

Each of the downlink frequency bands 370 and uplink frequency bands 375 may be made up of one or more subcarriers. In some examples, the frequency bands 370 or 375 may span 14 symbols, or 88 symbols, depending on the duration of the symbol period; but the frequency bands 370 and 375 may span any number of symbols. Each downlink frequency band 370 and uplink frequency band 375 may include control channels and shared channels similar to those discussed with respect to FIG. 2, which may be included within symbols or across symbols. In some examples, hybrid UEs (e.g., UE 115-*a* of FIG. 1) may be configured to communicate using both legacy subframes 325-*a*, 330-*a*, 335-*a*, and burst subframes 360. Likewise, second layer UEs (e.g., UE 115-*b* of FIG. 1) may be configured to communicate using only burst subframes 360, and legacy UEs may be configured to communicate using only legacy subframes 325, 330, 335. In examples where a UE may communicate on just one hierarchical layer, subframes of the other hierarchical layer(s) may be ignored.

In some examples, the frequency bands 370 and 375 may use constant (e.g., predetermined), semi-static, or dynamically changed portions of frequency spectrum, which may be based on channel conditions or a number of UEs within a coverage area. As discussed above with reference to FIG. 3A, an eNB may vary the number of burst subframes transmitted, or may transmit burst subframes exclusively.

Figure 3C:
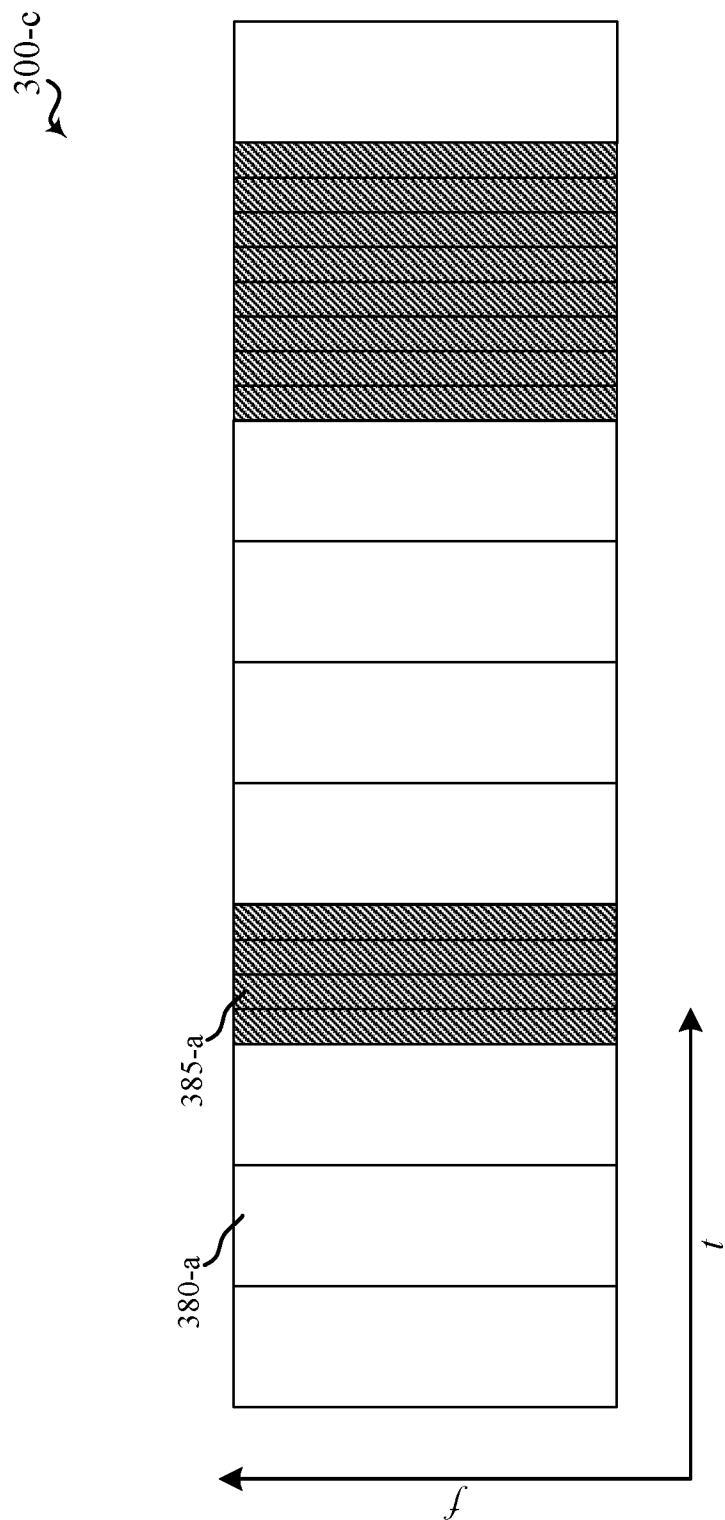
FIG. 3C is a block diagram conceptually illustrating an example of a carrier of a wireless communication system with symbols having different symbol durations time-division multiplexed, in accordance with an aspect of the present disclosure.

Next, FIG. 3C is a block diagram conceptually illustrating an example of a carrier 300-*c* of a wireless communication system with symbols having different symbol durations time-division multiplexed, in accordance with an aspect of the present disclosure. The carrier 300-*c* may be transmitted using portions of the wireless communications system 100 described with reference to FIG. 1 between one or more access points 105 and one or more UEs 115, for example.

The carrier 300-*c* may include a region 380-*a* having a longer symbol duration and a second region 385-*a* having a shorter symbol duration. As described above, the symbol duration of regions 380-*a* and 385-*a* may be longer or shorter relative to one another. So, for example, region 380-*a* may have symbols having a useful symbol duration of 66.67 μs, while region 385-*a* may have symbols having a useful symbol duration of 8.33 μs. As depicted in the example of FIG. 3C, the regions 380-*a* and 385-*a* may be TDM. The carrier 300-*c* may include additional regions, which may likewise be TDM.

The portion of the carrier 300-*c* occupied by the region 380-*a* or the region 385-*a* may be adjusted according to a latency requirement of a UE 115 (FIG. 1) served by the carrier 300-*c*. In the case of carrier 300-*c*, in which the regions 380-*a* and 385-*a* are TDM, this adjusting may include adjusting a time duration or a periodicity of either region 380-*a* or 385-*a*. In some examples, a signal transmitted in a symbol of the region 380-*a* indicates the symbol duration of the region 385-*a*. That is, in some cases, a UE 115 receives, in a symbol of region 380-*a*, RRC signaling, a broadcast message, Layer 1 signaling, MAC signaling, or the like, that configures the region 385-*a*. This signaling may be utilized to create, modify, or remove region 385-*a*, for example.

Figure 3D:
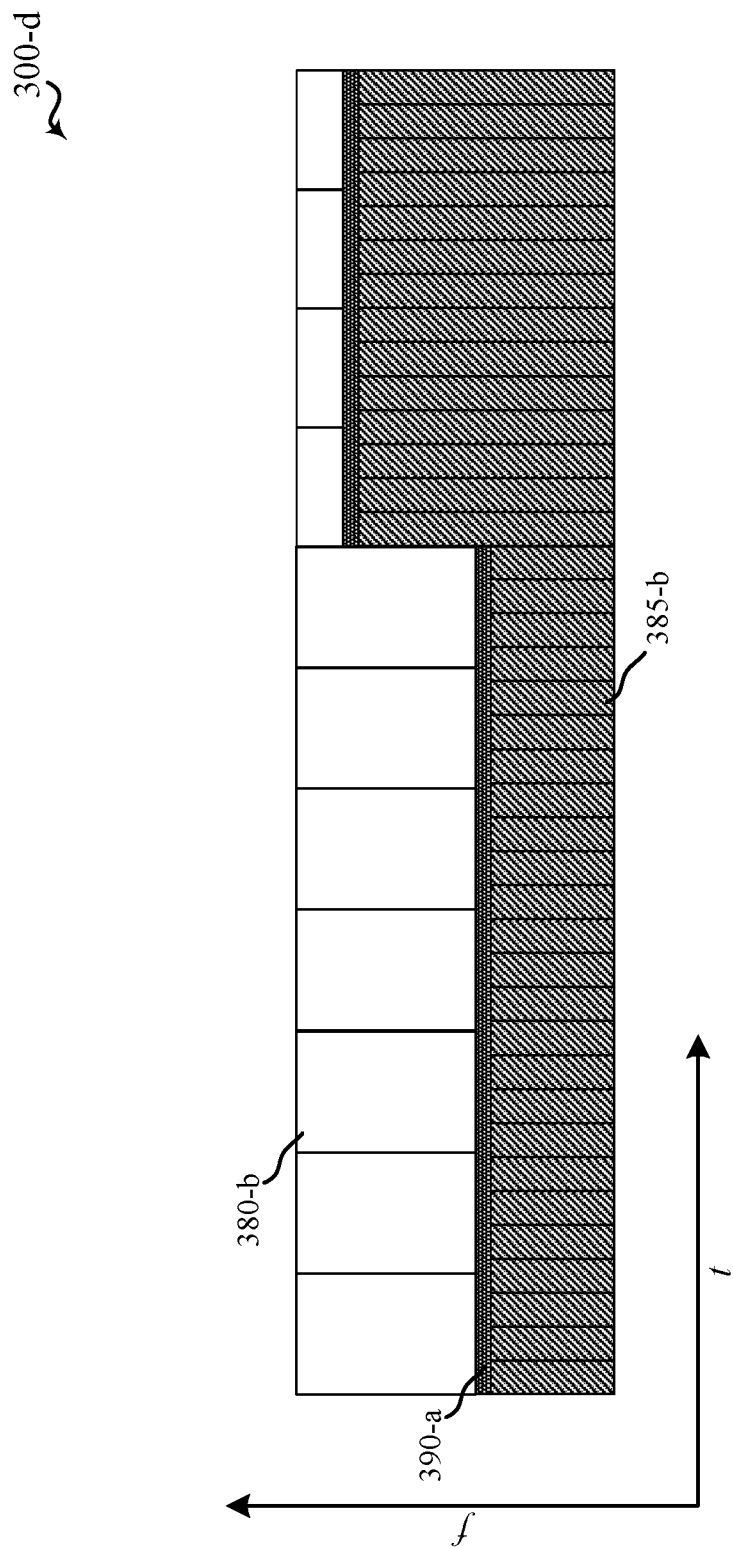
FIG. 3D is a block diagram conceptually illustrating an example of a carrier of a wireless communication system with symbols having different symbol durations frequency-division multiplexed, in accordance with an aspect of the present disclosure.

FIG. 3D is a block diagram conceptually illustrating an example of a carrier 300-*d* of a wireless communication system with symbols having different symbol durations frequency-division multiplexed, in accordance with an aspect of the present disclosure. The carrier 300-*c* may, for example, be transmitted using portions of the wireless communications system 100 described with reference to FIG. 1 between one or more access points 105 and one or more UEs 115.

The carrier 300-*d* may include a region 380-*b* having a longer symbol duration and a second region 385-*b* having a shorter symbol duration. As described above, the symbol duration of regions 380-*b* and 385-*b* may be longer or shorter relative to one another. In the example of FIG. 3D, the regions 380-*b* and 385-*b* may be FDM. The carrier 300-*d* may also include a guard band 390-*a* between the regions 380-*b* and 385-*b*. The guard band 390-*a* may be a portion of spectrum that is not used by for uplink or downlink transmissions, and may help reduce interference for devices communicating in regions 380-*b* or 385-*b*. The carrier 300-*d* may include additional regions, which may likewise be FDM, or they may be TDM.

The portion of the carrier 300-*d* occupied by the region 380-*b* or the region 385-*b* may be adjusted according to a latency requirement of a UE 115 (FIG. 1) served by the carrier 300-*d*. For carrier 300-*d*, in which the regions 380-*b* and 385-*b* are FDM, adjusting may include adjusting a bandwidth of either region 380-*b* or 385-*b*. A signal transmitted in a symbol of the region 380-*b* may indicate the bandwidth or symbol duration, or both, of the region 385-*b*. That is, in some cases, a UE 115 receives, in a symbol of region 380-*a*, RRC signaling, a broadcast message, Layer 1 signaling, MAC signaling, or the like, that configures the region 385-*b*.

Figure 3E:
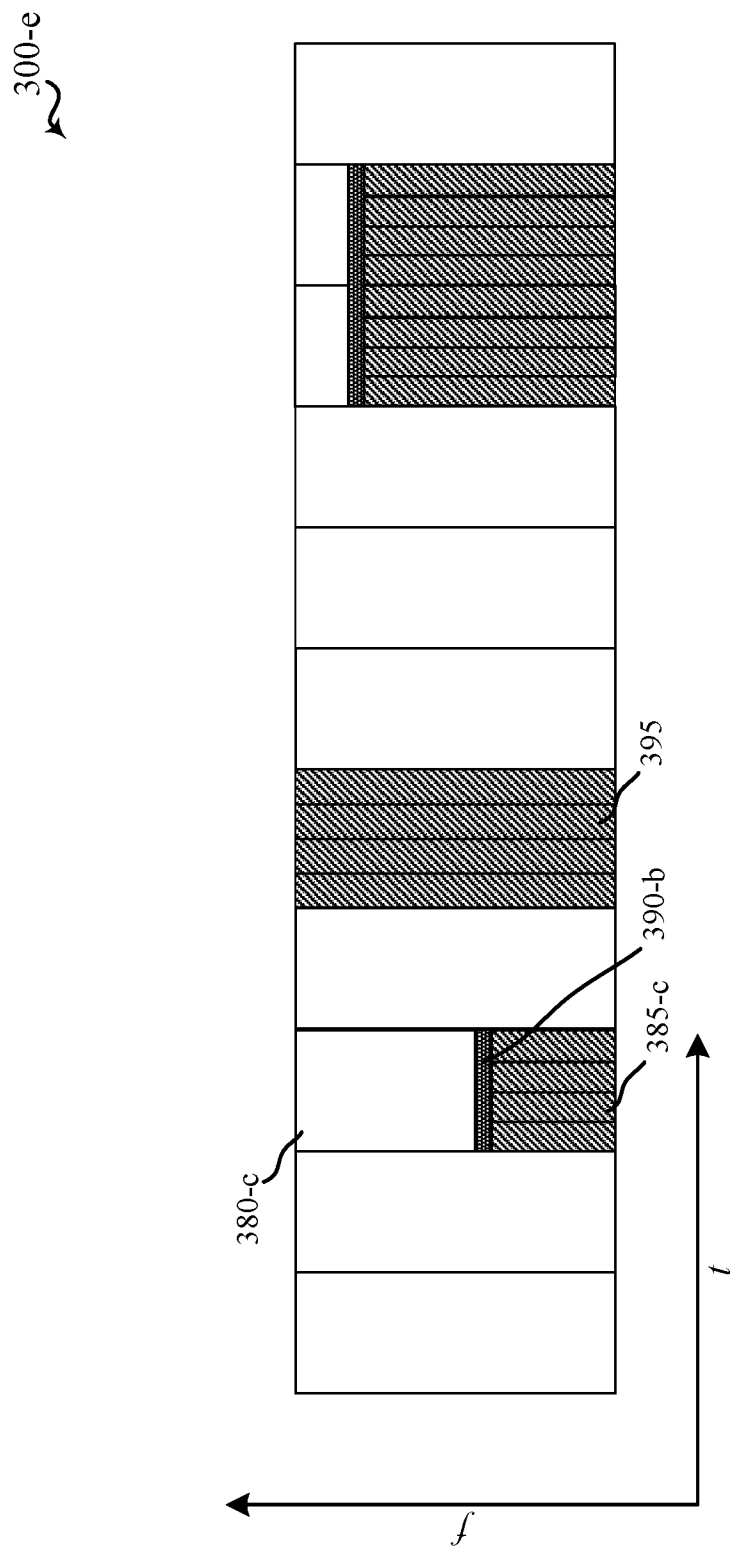
FIG. 3E is a block diagram conceptually illustrating an example of a carrier of a wireless communication system with symbols having different symbol durations time-division multiplexed and frequency-division multiplexed, in accordance with an aspect of the present disclosure.

FIG. 3E is a block diagram conceptually illustrating an example of a carrier 300-*e* of a wireless communication system with symbols having different symbol durations time-division multiplexed and frequency-division multiplexed, in accordance with an aspect of the present disclosure. The carrier 300-*e* may, for example, be transmitted using portions of the wireless communications system 100 described with reference to FIG. 1 between one or more access points 105 and one or more UEs 115.

The carrier 300-*e* may include a region 380-*c* having a longer symbol duration and a second region 385-*c* having a shorter symbol duration. The symbol duration of regions 380-*c* and 385-*c* may, as described above, be longer or shorter relative to one another. In the example of FIG. 3E, the regions 380-*c* and 385-*c* may be FDM; and the carrier 300-*e* may also include a guard band 390-*b* between the regions 380-c and 385-c. The carrier 300-d may include additional regions, which may likewise be FDM, or they may be TDM. In some examples, the carrier 300-e includes a region 395 TDM with regions 380-c and 385-c. The region 395 may have a symbol duration that is the same as the symbol duration of region 385-c. Or, the region 395 may be configure with a symbol duration that is different from both the regions 380-c and 385-c.

The portions of the carrier 300-e occupied by regions 380-c, 385-c, or 390 may be adjusted according to the latency requirements of a UE 115 (FIG. 1). This may include adjusting a bandwidth, a duration, or a periodicity.

Figure 4:
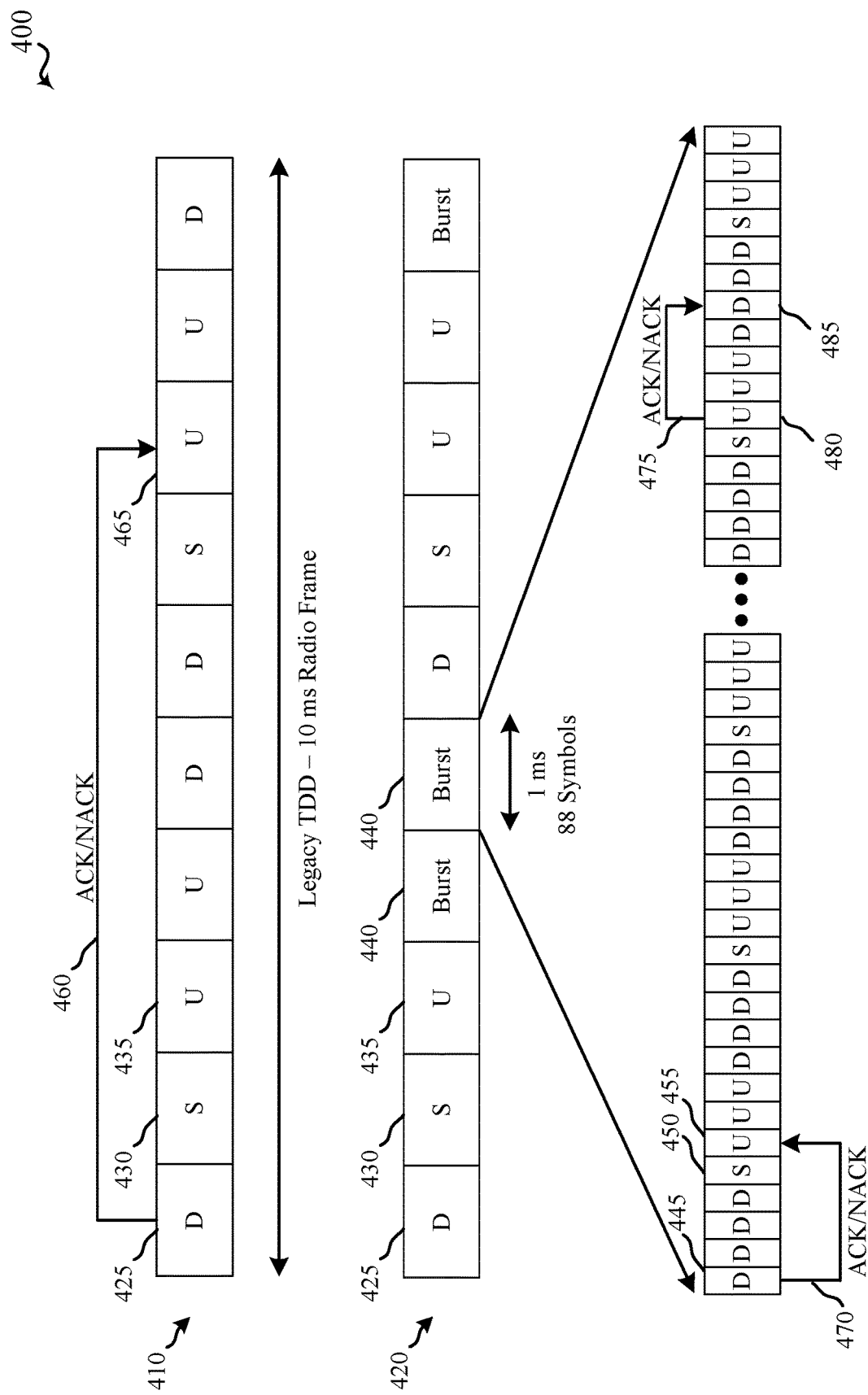
FIG. 4 is a block diagram conceptually illustrating an example of a radio frame and transmission acknowledgment timing for different subframes that may be transmitted on different layers of a wireless communication system, in accordance with an aspect of the present disclosure.

As mentioned above, a second hierarchical layer in a wireless communications system, such as wireless communication system 100 of FIG. 1 for example, may have lower latency as compared to a first hierarchical layer. FIG. 4 is a block diagram 400 conceptually illustrating an example of a radio frames and transmission acknowledgment timing for different subframes that may be transmitted on different hierarchical layers of a wireless communication system, in accordance with an aspect of the present disclosure. The radio frames of FIG. 4 may be transmitted using portions of the wireless communications system 100 described with reference to FIG. 1 between one or more access points 105 and one or more UEs 115, for example. In this example, similarly as described with respect to FIG. 3A, a legacy TDD frame 410 may include ten 1 ms subframes that include downlink subframes 425, special subframes 430, and uplink subframes 435. The downlink subframes 425, special subframes 430, and uplink subframes 435 may include a subframe structure as discussed above with respect to FIG. 2, including 14 symbols within each 1 ms subframe.

In the example of FIG. 4, a low latency or burst mode frame 420 may replace a number of the downlink subframes 425 with burst subframes 440. Burst subframes 440, similarly as discussed above, may be transmitted in a different hierarchical layer than downlink subframes 425, special subframes 430, and uplink subframes 435. Burst subframes 440, in examples, may include 88 symbols, and may include downlink symbols 445, special symbols 450, and uplink symbols 455. Each of the symbols 445, 450, and 455 may have a reduced symbol duration relative to the legacy symbols (e.g., symbols 266 of FIG. 2), such as described above with respect to FIG. 3A. Such reduced symbol duration may enable acknowledgment of transmissions with a reduced latency relative to acknowledgment of transmissions according to legacy HARQ schemes.

For example, in legacy TDD frame 410, a UE may receive a downlink transmission in downlink subframe 425 and transmit an acknowledgment related to the downlink transmission according to a legacy HARQ scheme in which ACK/NACK it transmitted in a first available subframe at or after k+4 subframes from the receipt of the downlink transmission. In the example of FIG. 4, subframe k+4 from downlink subframe 425 is another downlink subframe, and the ACK/NACK 460 is thus transmitted in following uplink subframe 465. Thus, in this example, there is a 7 ms delay between downlink subframe 425 and providing the ACK/NACK 460 associated with the subframe. In the event that a retransmission is necessary based on the ACK/NACK 460, the retransmission may then be scheduled for a subsequent downlink subframe, resulting in a RTT that, in this example, would be a minimum of 11 ms. In the event that an acknowledgment may be provided in the fourth subframe following a downlink transmission (e.g., in FDD mode ACK/NACK may be consistently transmitted in subframe k+4), a minimum RTT may then be 8 ms.

Within burst subframes 440, in the example of FIG. 4, the latency related to providing acknowledgment of a transmission may be reduced. For example, transmissions using the second hierarchical layer may follow similar HARQ techniques as with legacy transmissions, and an acknowledgment of a transmission may be provided in a symbol that is k+4 symbols after receipt of a transmission, or in a first available symbol for transmission afterward. For example, a UE may receive downlink transmission in symbol 445 and provide an ACK/NACK 470 in uplink symbol 455, which is five symbols after the receipt of downlink transmission in downlink symbol 445 because the fourth symbol following the transmission is a special symbol 450. Thus, the UE may provide ACK/NACK 470 of the downlink transmission within the burst subframe 440, which is less than one ms following the receipt of the downlink transmission in downlink symbol 445. In some examples, similarly as discussed above with respect to FIG. 3A, the symbol duration for symbols in the burst subframe 440 may be 11.36 µs, resulting in an acknowledgment being provided in this example 56.8 µs following the downlink symbol 445 transmission. The eNB may then schedule any required retransmission and thus may provide, in some examples, a resulting RTT of approximately 100 µs or less.

While ACK/NACK 470 is described with respect to a UE receiving a downlink symbol 445, similar functions may be performed for uplink transmissions. For example, a UE may transmit an uplink symbol 480 to an eNB, which may be acknowledged by the eNB through ACK/NACK 475 that is provided in downlink symbol 485. In the even that a retransmission is necessary, such a retransmission may be provided in a subsequent uplink symbol from the UE and thus may again provide, in some examples, a resulting RTT of approximately 100 µs or less. Accordingly, latency associated with transmissions in burst subframes 440 may be significantly reduced. Such reduced latency may enable enhanced data rates, through reduced RTTs which may reduce overall retransmission times. Such reduced RTTs may thus impact the time that it may take to achieve the TCP segment error rate, and may thus enhance the overall data rate that is achievable between a UE and an eNB.

Figure 5:
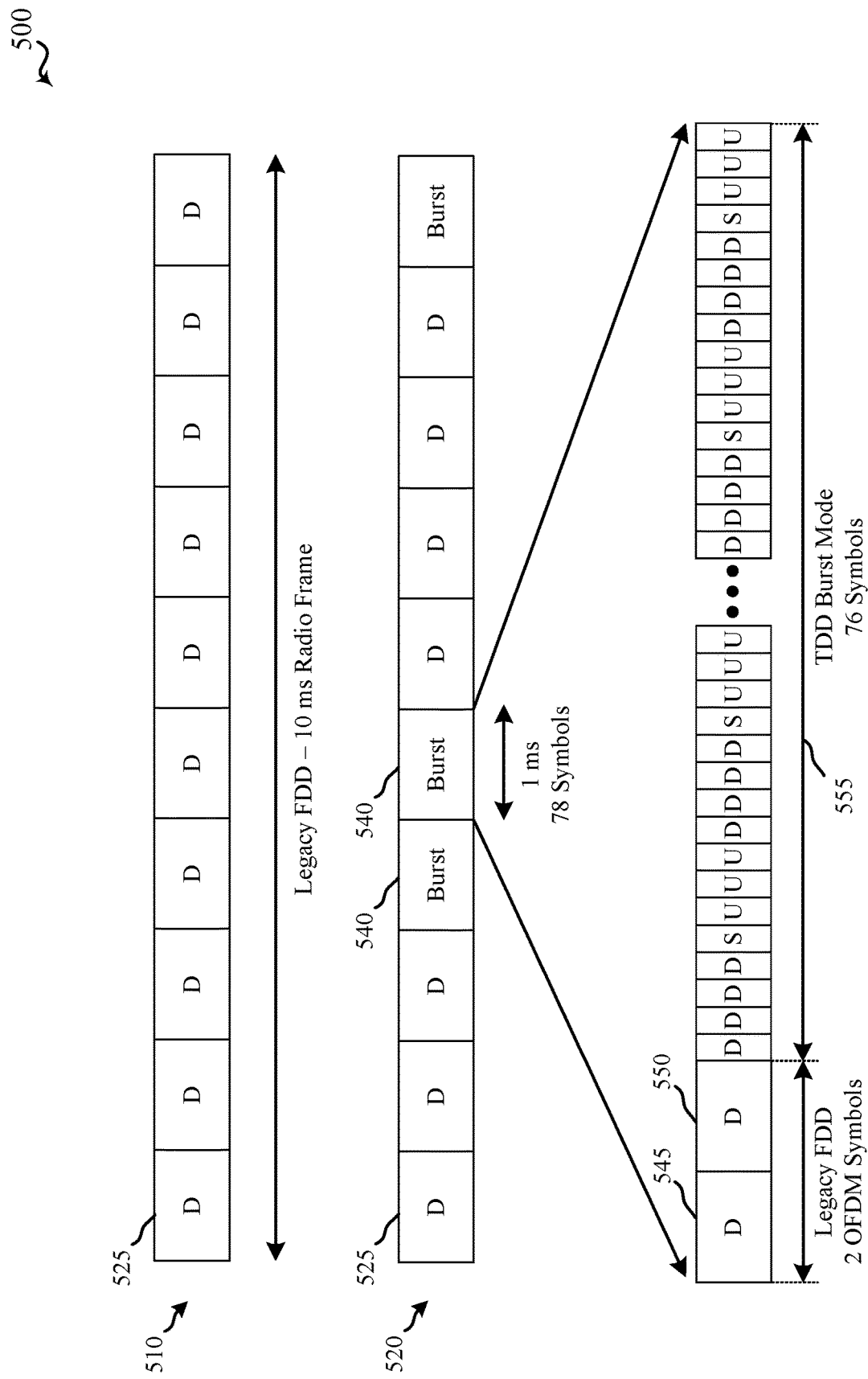
FIG. 5 is a block diagram conceptually illustrating another example of a radio frame and different subframes that may be transmitted on different layers of a wireless communication system, in accordance with an aspect of the present disclosure.

While the examples discussed with reference to FIGS. 3A, 3B, and 4 describe first hierarchical layer TDD transmissions, such techniques are also applicable to other transmission modes. FIG. 5 is a block diagram 500 conceptually illustrating another example of radio frames and different subframes that may be transmitted on different layers of a wireless communication system, in accordance with an aspect of the present disclosure. The radio frames of FIG. 5 may be transmitted using portions of the wireless communications system 100 described with reference to FIG. 1 between one or more access points 105 and one or more UEs 115, for example. In this example, similarly as described with respect to FIG. 3A, a legacy FDD frame 510 may include ten 1 ms downlink subframes 525. The downlink subframes 525 may include a subframe structure as discussed above with respect to FIGS. 2 and 3, including 14 symbols within each 1 ms subframe.

In the example of FIG. 5, a low latency or burst mode frame 520 may replace a number of the downlink subframes 525 with burst subframes 540. Burst subframes 540, similarly as discussed above, may be transmitted in a different hierarchical layer than downlink subframes 525. In some examples, however, FDD downlink subframes 525 may include scheduling information in the first two symbols of the subframe 525. In order to provide compatibility with UEs that are not capable of operating in the second hierarchical layer, burst subframes 540, in examples, may include two legacy FDD OFDM downlink symbols 545 and 550, followed by 76 TDD burst mode symbols 555, which may include downlink symbols, special symbols, and uplink symbols similarly as discussed above with respect to FIGS. 3A, 3B, and 4. The legacy FDD OFDM symbols 545 and 550 may be received by a UE that is not capable of receiving burst mode symbols 555, and may perform legacy scheduling functions based on the information in legacy FDD symbols 545 and 550. In some examples, burst subframes 540 may be selected to correspond to FDD subframes 525 that may provide multicast or broadcast content, and that legacy UEs may not be configured to receive, and therefore such legacy UEs in such cases would ignore the remainder of such subframes in any event.

Thus, in the example, of FIG. 5, hybrid multiplexing may be implemented, in which a first hierarchical layer may operate using FDD, while a second hierarchical layer may operate using TDD. According to various examples, the first hierarchical layer may operate in FDD, TDD, or supplemental downlink (SDL) mode, and the second hierarchical layer may operate in FDD, TDD, or SDL mode independently of the mode of the first hierarchical layer. Similarly as discussed above, the burst mode symbols 555 may have a reduced symbol duration relative to the legacy symbols (e.g., symbols 266, 366 of FIG. 2 or 3). Such reduced symbol duration may enable acknowledgment of transmissions with a reduced latency relative to acknowledgment of transmissions according to legacy HARQ schemes.

Figure 6:
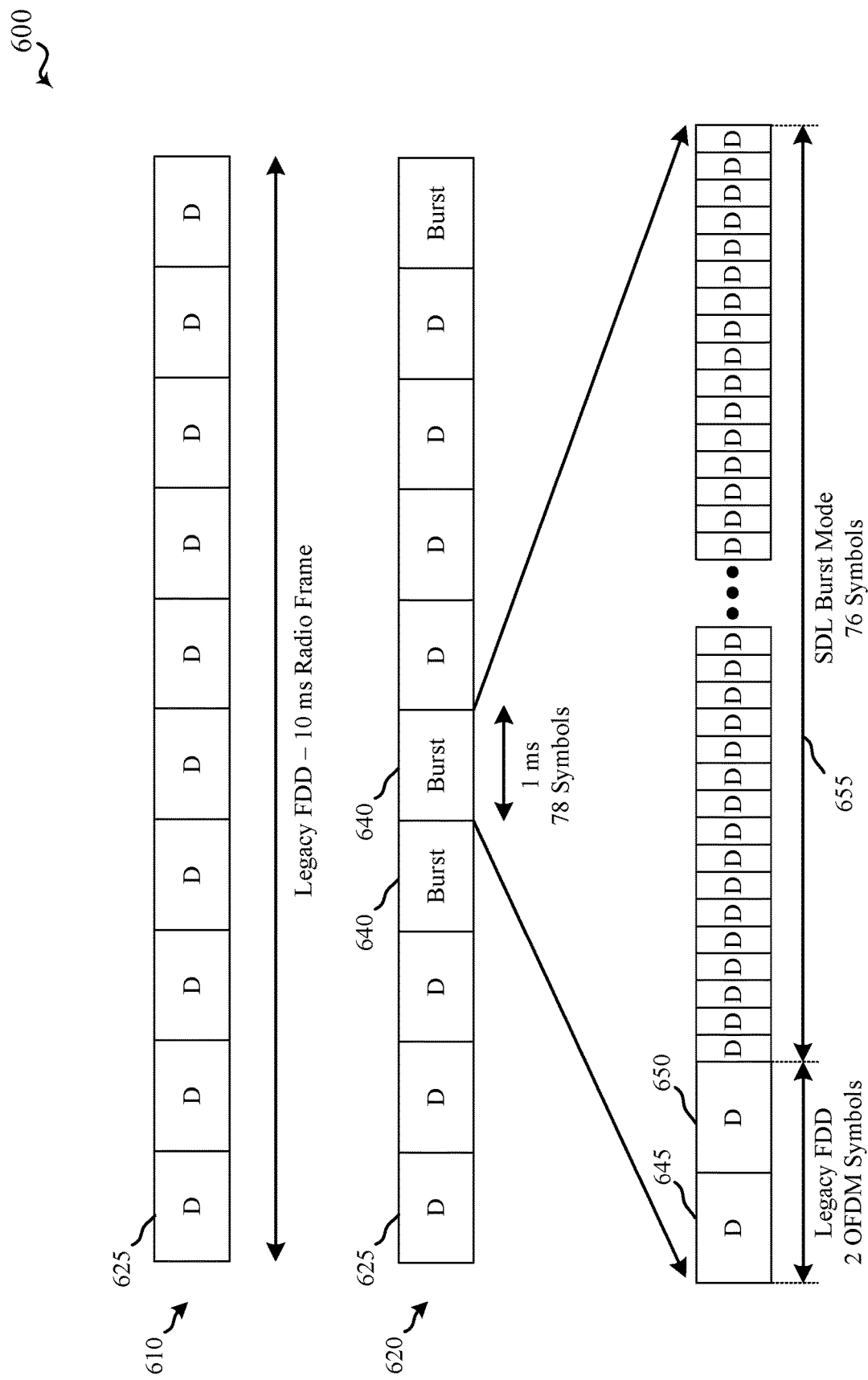
FIG. 6 is a block diagram conceptually illustrating another example of a radio frame and different subframes that may be transmitted on different layers of a wireless communication system, in accordance with an aspect of the present disclosure.

While the example discussed with reference to FIG. 5 describes TDD operation in a second hierarchical layer, other modes, such as FDD or SDL, may be used in the second hierarchical layer, as discussed with reference to FIG. 3B, for instance. FIG. 6 is a block diagram 600 conceptually illustrating another example of radio frames and different subframes that may be transmitted on different layers of a wireless communication system, in accordance with an aspect of the present disclosure. The radio frames of FIG. 6 may be transmitted using portions of the wireless communications system 100 described with reference to FIG. 1 between one or more access points 105 and one or more UEs 115, for example. In this example, similarly as described with respect to FIG. 5, a legacy FDD frame 610 may include ten 1 ms downlink subframes 625. The downlink subframes 625 may include a subframe structure as discussed above with respect to FIGS. 2-5, including 14 symbols within each 1 ms subframe.

In the example of FIG. 6, a low latency or burst mode frame 620 may replace a number of the downlink subframes 625 with burst subframes 640. Burst subframes 640, similarly as discussed above, may be transmitted in a different hierarchical layer than downlink subframes 625. In some examples, similarly as discussed above with respect to FIG. 5, FDD downlink subframes 625 may include scheduling information in the first two symbols of the subframe 625. In order to provide compatibility with UEs that are not capable of operating in the second hierarchical layer, burst subframes 640, in examples, may include two legacy FDD OFDM symbols 645 and 650, followed by 76 SDL burst mode downlink symbols 655. The legacy FDD OFDM symbols 645 and 650 may be received by a UE that is not capable of receiving burst mode symbols 655, and may perform legacy scheduling functions based on the information in legacy FDD OFDM symbols 645 and 650. In some examples, burst subframes 640 may be selected to correspond to FDD subframes 625 that may provide multicast or broadcast content, and that legacy UEs may not be configured to receive, and therefore such legacy UEs in such cases would ignore the remainder of such subframes in any event. Similarly as discussed above, the burst mode symbols 655 may have a reduced symbol duration relative to the legacy symbols (e.g., symbols 266, 366 of FIG. 2 or 3). Such reduced symbol duration may enable acknowledgment of transmissions with a reduced latency relative to acknowledgment of transmissions according to legacy HARQ schemes.

Figure 7:
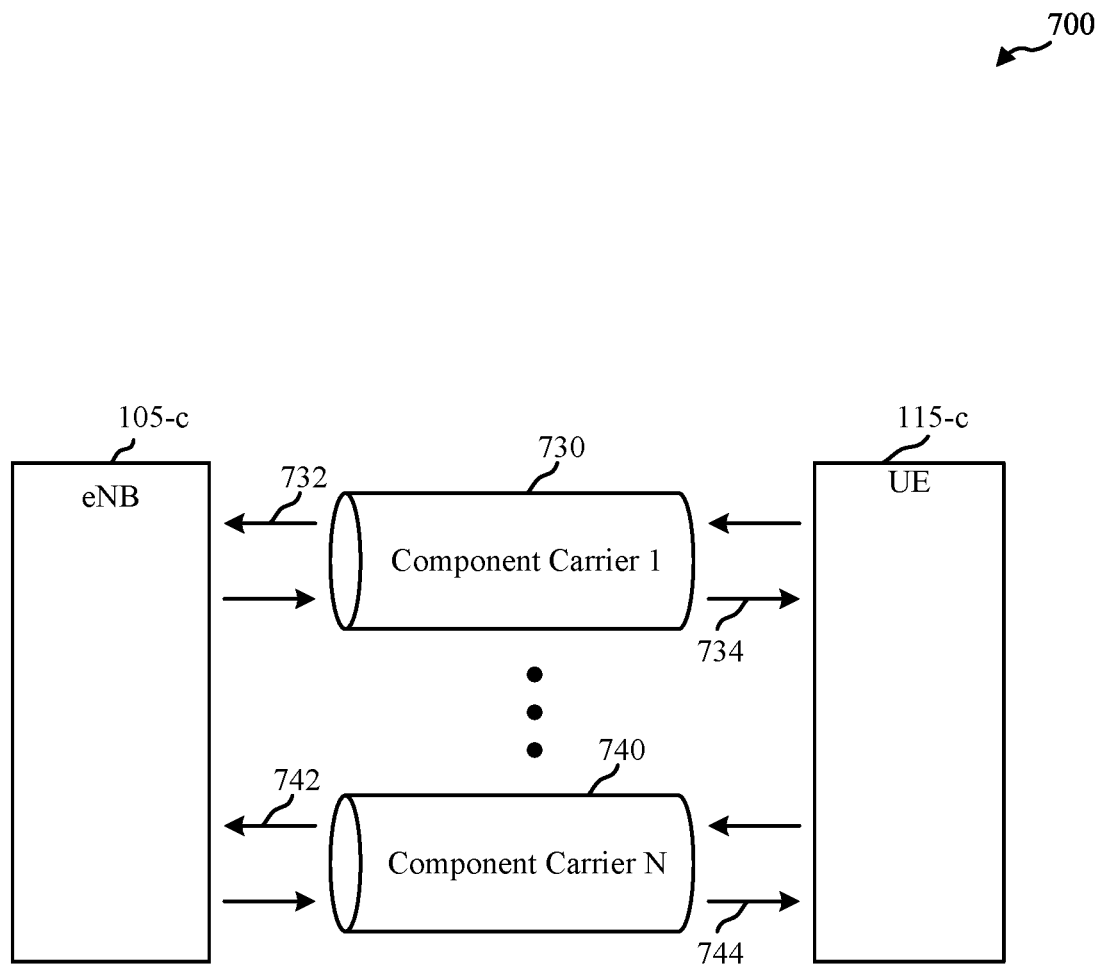
FIG. 7 is a block diagram conceptually illustrating a portion of a wireless communications system that may utilize carrier aggregation, in accordance with aspects of the present disclosure.

While various of the above examples provide different hierarchical layers of communication using one component carrier, techniques described herein are applicable to wireless communications systems that may utilize carrier aggregation. FIG. 7 is a block diagram conceptually illustrating a wireless communications system that may utilize carrier aggregation, in accordance with aspects of the present disclosure. In this example, a portion of a wireless communications system 700 is illustrated in which eNB 105-c may communicate with UE 115-c using carrier aggregation. The wireless communications system 700 may be an example of portions of the wireless communications system 100 described with reference to FIG. 1. Moreover, the eNB 105-c may be an example of one of the access points 105 of FIG. 1, while the UEs 115-c may be examples of the UEs 115 described with reference to FIG. 1. In some examples, eNB 105-c and UE 115-c may be configured to operate on multiple hierarchical layers, similarly as discussed above with respect to FIGS. 1-6.

The system 700 can include a user equipment 115-c, which can communicate with eNB 105-c using one or more component carriers 1 through N ($CC_1$-$CC_N$). While only one user equipment 115-c and one eNB 105-c are illustrated in FIG. 7, it will be appreciated that the system 700 can include any number of UEs 115 and/or eNBs 105. The eNB 105-c can transmit information to the user equipment 115-c over forward (downlink) channels 732 through 742 on component carriers $CC_1$ through $CC_N$. In addition, the user equipment 115-c can transmit information to the eNB 105-c over reverse (uplink) channels 734 through 744 on component carriers $CC_1$ though $CC_N$.

In legacy LTE-A based systems, the UE 115-c may be configured with multiple component carriers utilized by the eNB 105-c to enable a wider overall transmission bandwidth. As illustrated in FIG. 7, the user equipment 115-c can be configured with "component carrier 1" 730 through "component carrier N" 740, where N is an integer greater than or equal to one. While FIG. 7 depicts two component carriers, it is to be appreciated that the user equipment 115-c can be configured with any suitable number of component carriers and, accordingly, the subject matter disclosed herein and the claims are not limited to two component carriers. Component carrier 730 through 740 can include respective downlink channels 732 through 742 as well as respective uplink channels 734 through 744.

In multi-carrier operations, each component carrier 730 through 740 may operate using a specified bandwidth. For example, the bandwidth for each component carrier 730 through 740 may be 20 MHz. In some examples, UE 115-c and eNB 105-c may be configured to operate in a second hierarchical layer in which the bandwidth for transmitting may be scaled according to the aggregated bandwidth of the component carriers. In some examples, UE 115-a and eNB 105-c may transmit time division multiplexed subframes, in a similar manner as discussed above, on a first hierarchical layer and a second hierarchical layer. In examples, one or more subframes transmitted on the first hierarchical layer may be concurrently transmitted using two or more separate component carriers 730-740. One or more burst subframes of the second hierarchical layer may be multiplexed with the subframes transmitted on the first hierarchical layer, with the burst subframes transmitted using one carrier having a bandwidth that is greater than the bandwidth of the component carriers 730-740. For example, if two component carriers are used for first hierarchical layer transmissions each having 20 MHz bandwidth, the burst subframe may be transmitted using a 40 MHz bandwidth. Thus, the radio frequency spectrum occupied by the two component carriers would overlap with the radio frequency spectrum occupied by the burst subframe. However, the two component carriers may have associated guard bands that may not be required for the burst subframe transmission, and thus the bandwidth may be used more efficiently.

Figure 8A:
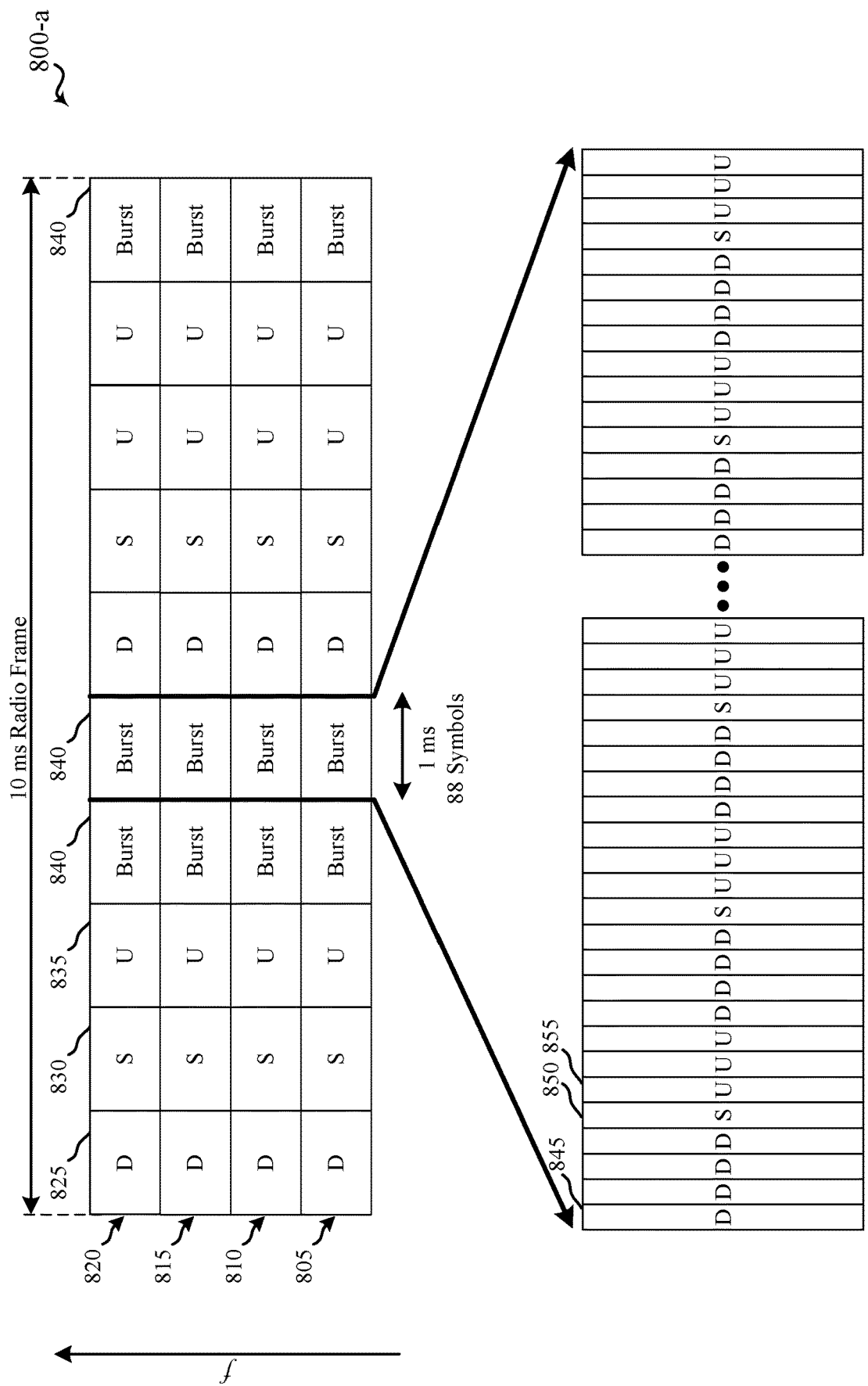
FIG. 8A is a block diagram conceptually illustrating an example of radio frames for different component carriers and scalable bandwidth subframes that may transmitted on different layers of a wireless communication system, in accordance with an aspect of the present disclosure.

With reference now to FIG. 8A is a block diagram 800-a conceptually illustrating an example of radio frames and different subframes that may be transmitted on different component carriers and on different layers of a wireless communication system, in accordance with an aspect of the present disclosure. The radio frames of FIG. 8A may be transmitted using portions of the wireless communications systems 100 and/or 700 described with reference to FIGS. 1 and/or 7 between one or more access points or eNBs 105 and one or more UEs 115, for example. In this example, four TDD radio frames 805 through 820 may be concurrently transmitted using carrier aggregation. Each of the TDD frames 805-820 may include ten 1 ms subframes that include downlink subframes 825, special subframes 830, and uplink subframes 835. Time division multiplexed with the subframes 825, 830, 835, according to examples, are burst subframes 840. The downlink subframes 825, special subframes 830, and uplink subframes 835 may include a subframe structure as discussed above with respect to FIG. 2, including 14 symbols within each 1 ms subframe.

In the example of FIG. 8A, low latency burst subframes 840 may be transmitted in a different hierarchical layer than downlink subframes 825, special subframes 830, and uplink subframes 835. Burst subframes 840, in examples, may include 88 symbols that are each scaled in bandwidth to occupy the aggregated bandwidth of each of the component carriers used to transmit the legacy subframes 825, 830, and 835. In the example of FIG. 8A, burst subframes 840 may be TDD burst subframes and may include downlink symbols 845, special symbols 850, and uplink symbols 855. Each of the symbols 845, 850, and 855 may have a reduced symbol duration relative to the legacy symbols (e.g., symbols 266, 366 of FIGS. 2, 3), and in some examples have a symbol duration of 11.36 μs per symbol, including a useful symbol duration of 8.33 μs and a cyclic prefix duration of 8.03 μs. Symbols 845, 850, and 855 may have increased tone spacing for subcarriers relative to legacy symbols, and in some examples have a tone spacing of 120 kHz. In some examples, a hybrid UE, second layer UE, and/or eNB may generate legacy symbols such as symbols for subframes 825, 830, and 835 utilizing an internal clock configured to generate legacy symbols having a first symbol duration, and may generate the symbols 845, 850, 855 of burst subframe by adapting the clock to generate symbols 845, 850, 855 having a second symbol duration. Hybrid UEs, second layer UEs, and/or eNBs may scale the bandwidth used for transmission of the burst subframes 840 through adapting an RF transmit/receive chain to transmit using the scaled bandwidth.

In some examples, hybrid UEs (e.g., UE 115-a of FIG. 1) may be configured to communicate using both legacy subframes 825, 830, 835 through carrier aggregation, and burst subframes 840 using scaled bandwidth. Likewise, second layer UEs (e.g., UE 115-b of FIG. 1) may be configured to communicate using only burst subframes 840 using scaled bandwidth, and legacy UEs may be configured to communicate using only legacy subframes 825, 830, 835 through carrier aggregation. In examples where a UE may communicate on just one hierarchical layer, subframes of the other hierarchical layer(s) may be ignored.

Figure 8B:
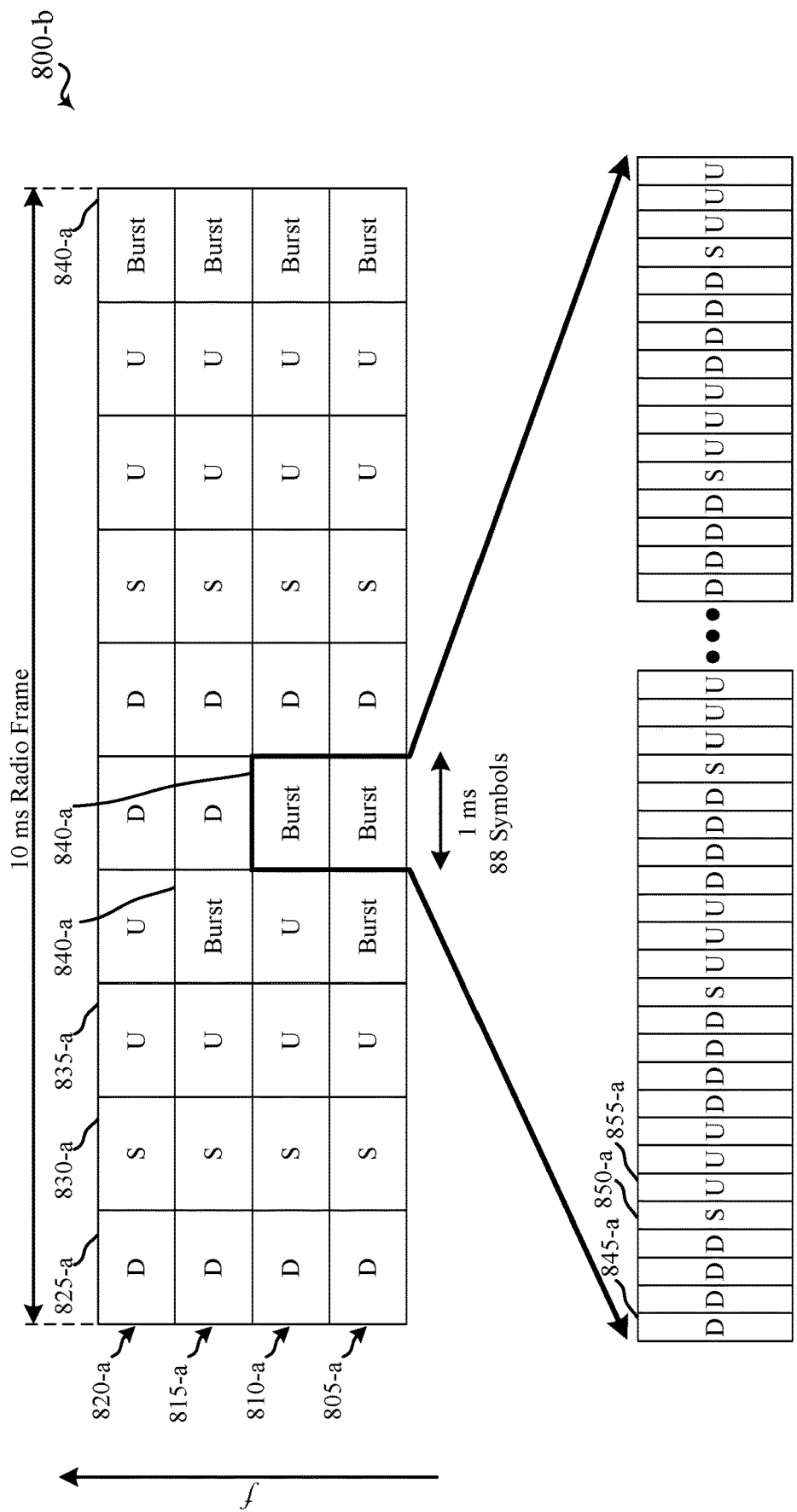
FIG. 8B is a block diagram conceptually illustrating an example of radio frames for different component carriers and scalable bandwidth subframes that may transmitted on different layers of a wireless communication system, in accordance with an aspect of the present disclosure.

FIG. 8B is a block diagram 800-b conceptually illustrating an example of radio frames and different subframes that may be transmitted on different component carriers and on different layers of a wireless communication system, in accordance with an aspect of the present disclosure. The radio frames of FIG. 8B may be transmitted using portions of the wireless communications system 100 and/or 700 described with reference to FIGS. 1 and/or 7 between one or more access points or eNBs 105 and one or more UEs 115, for example. FIG. 8B may include TDD radio frames 805-a, 810-a, 815-a, 820-a, downlink subframes 825-a, special subframes 830-a, uplink subframes 835-a, burst subframes 840-a, downlink symbols 845-a, special symbols 850-a, and uplink symbols 855-a which may be similar to, or the same as, TDD radio frames 805, 810, 815, 820, downlink subframes 825, special subframes 830, uplink subframes 835, burst subframes 840, downlink symbols 845, special symbols 850, and uplink symbols 855 described above with reference to FIG. 8A. As depicted in the example of FIG. 8B, hybrid and second layer UEs (e.g., UE 115-b of FIG. 1) may be configured to communicate on burst subframes 840-a using scaled bandwidth on a subset set of the aggregated component carriers.

Figure 9:
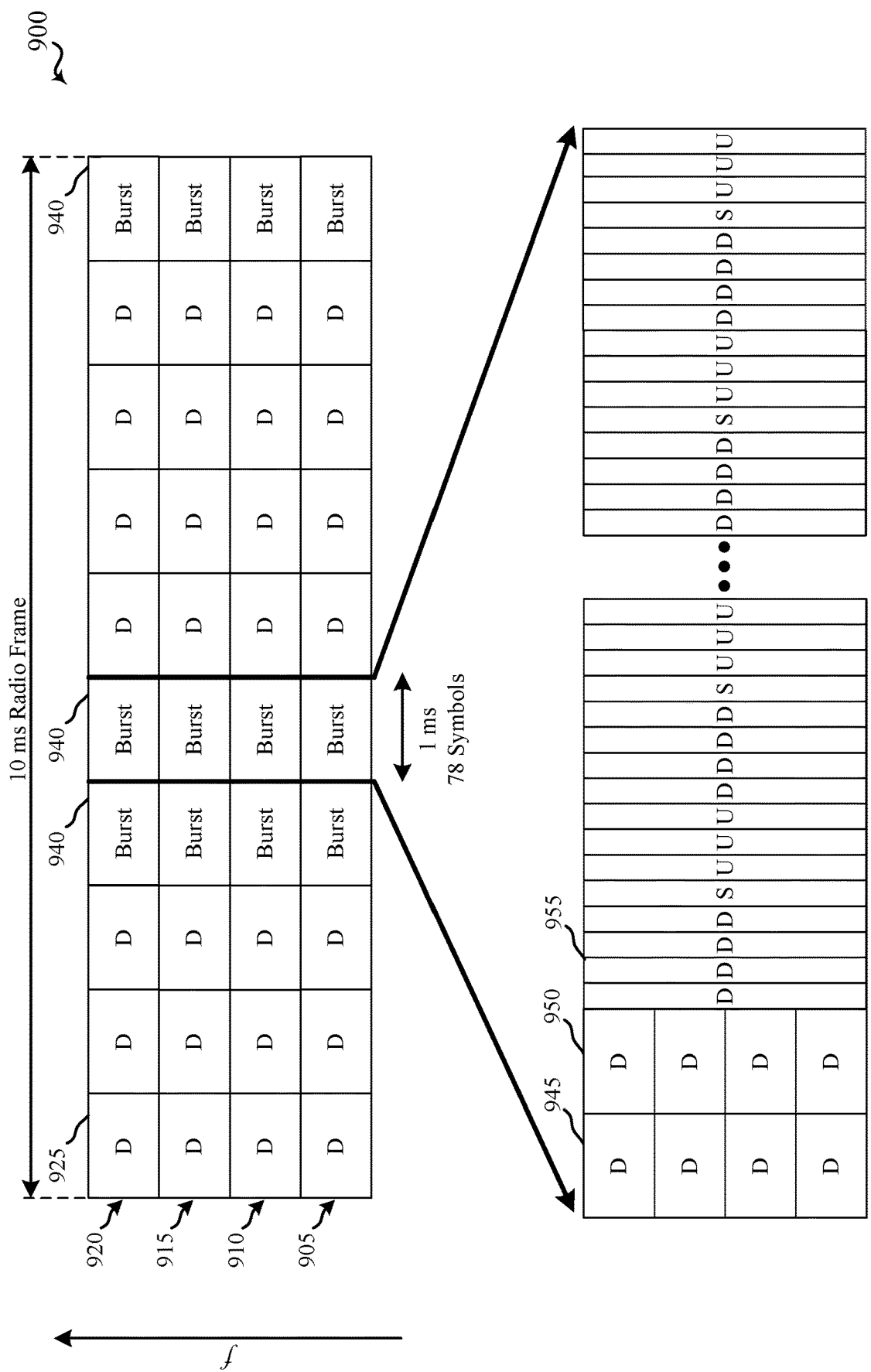
FIG. 9 is a block diagram conceptually illustrating another example of radio frames for different component carriers and scalable bandwidth subframes that may transmitted on different layers of a wireless communication system, in accordance with an aspect of the present disclosure.

While the examples discussed with reference to FIG. 8A describes first hierarchical layer TDD transmissions, such techniques are also applicable to other transmission modes. FIG. 9 is a block diagram 900 conceptually illustrating another example of radio frames and different subframes that may be transmitted on different layers of a wireless communication system, in accordance with an aspect of the present disclosure. The radio frames of FIG. 9 may be transmitted using portions of the wireless communications systems 100 and/or 700 described with reference to FIGS. 1 and/or 7 between one or more access points 105 and one or more UEs 115, for example. In this example, similarly as described with respect to FIG. 8A, FDD radio frames 905 through 920 may be concurrently transmitted using carrier aggregation. Each of the FDD frames 905-920 may include ten 1 ms subframes that include downlink subframes 925. Time division multiplexed with the subframes 925, according to examples, are burst subframes 940. The downlink subframes 925 may include a subframe structure as discussed above with respect to FIG. 2, including 14 symbols within each 1 ms subframe.

In the example of FIG. 9, a number of the downlink subframes 925 may be replaced with burst subframes 940. Burst subframes 940, similarly as discussed above, may be transmitted in a different hierarchical layer than downlink subframes 925. In some examples, however, FDD downlink subframes 925 may include scheduling information in the first two symbols of the subframe 925. In order to provide compatibility with UEs that are not capable of operating in the second hierarchical layer, burst subframes 940, in examples, may include two legacy FDD OFDM symbols 945 and 950 transmitted according to legacy carrier aggregation techniques, followed by 76 TDD burst mode symbols having scaled bandwidth.

The burst OFDM symbols may include downlink symbols, special symbols, and uplink symbols similarly as discussed above with respect to FIGS. 3A-5. The legacy FDD OFDM symbols 945 and 950 may be received by a UE that is not capable of receiving burst mode symbols 955, and may perform legacy scheduling functions based on the information in legacy FDD OFDM symbols 945 and 950. Similarly as discussed above, the burst mode symbols 955 may have a reduced symbol duration relative to the legacy symbols (e.g., symbols 266, 366 of FIG. 2 or 3). Such reduced symbol duration may enable acknowledgment of transmissions with a reduced latency relative to acknowledgment of transmissions according to legacy HARQ schemes, and may enable higher data rates. While the example of FIGS. 8A, 8B, and 9 describe TDD burst subframes 840 and 940, FDD and/or SDL burst subframes may also be transmitted, similarly as discussed above.

Figure 10:
FIG. 10 is a block diagram conceptually illustrating another example of radio frames for different component carriers and scalable bandwidth subframes that may transmitted on different layers of a wireless communication system, in accordance with an aspect of the present disclosure.

With reference now to FIG. 10 a block diagram 1000 conceptually illustrating another example of radio frames and different subframes that may be transmitted on different layers of a wireless communication system is described, in accordance with an aspect of the present disclosure. The radio frames of FIG. 10 may be transmitted using portions of the wireless communications systems 100 and/or 700 described with reference to FIGS. 1 and/or 7 between one or more access points 105 and one or more UEs 115, for example. In this example, similarly as described with respect to FIG. 9, FDD radio frames 1005 through 1020 may be concurrently transmitted using carrier aggregation. Each of the FDD frames 1005-1020 may include ten 1 ms subframes that include downlink subframes 1025. Time division multiplexed with the subframes 1025, according to examples, are burst subframes 1040. The downlink subframes 1025 may include a subframe structure as discussed above with respect to FIG. 2, including 14 symbols within each 1 ms subframe.

In the example of FIG. 10, a number of the downlink subframes 1025 may be replaced with burst subframes 1040. Burst subframes 1040, similarly as discussed above, may be transmitted in a different hierarchical layer than downlink subframes 1025. In some examples, however, FDD downlink subframes 1025 may include scheduling information in the first two symbols of the subframe 1025. In order to provide compatibility with UEs that are not capable of operating in the second hierarchical layer, burst subframes 1040, in examples, may include two legacy FDD OFDM symbols 1045 and 1050 transmitted according to legacy carrier aggregation techniques, followed by 12 FDD scaled bandwidth OFDM symbols 1055.

In such examples, each of the 12 FDD scaled bandwidth symbols may have the same symbol duration as legacy signals, but may be transmitted using scaled bandwidth to provide one carrier with increased bandwidth rather than four separate carriers. Similarly as discussed above, the scaled bandwidth symbols may have enhanced efficiencies as a result of, for example, eliminating guard bands associated with the four separate carriers. The legacy FDD symbols 1045 and 1050 may be received by a UE that is not capable of receiving burst mode symbols 1055, and may perform legacy scheduling functions based on the information in legacy FDD symbols 1045 and 1050. While the example of FIG. 10 illustrates FDD burst subframes 1040, TDD and/or SDL burst subframes may also be transmitted in a similar manner.

Figure 11A:
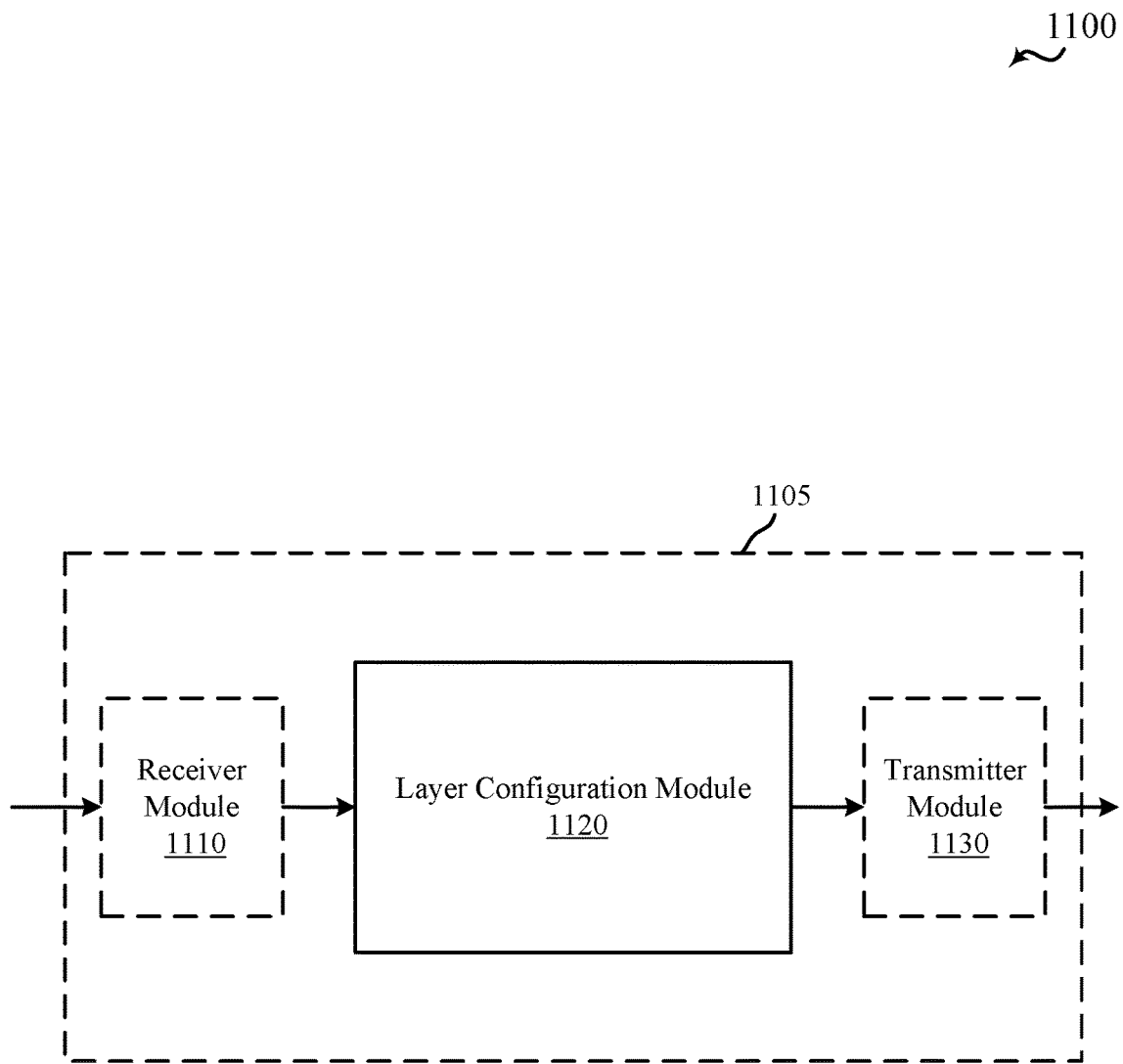
FIGS. 11A and 11B are block diagrams conceptually illustrating devices, such as eNBs or UEs, for use in wireless communications in accordance with aspects of the present disclosure.
Figure 11B:
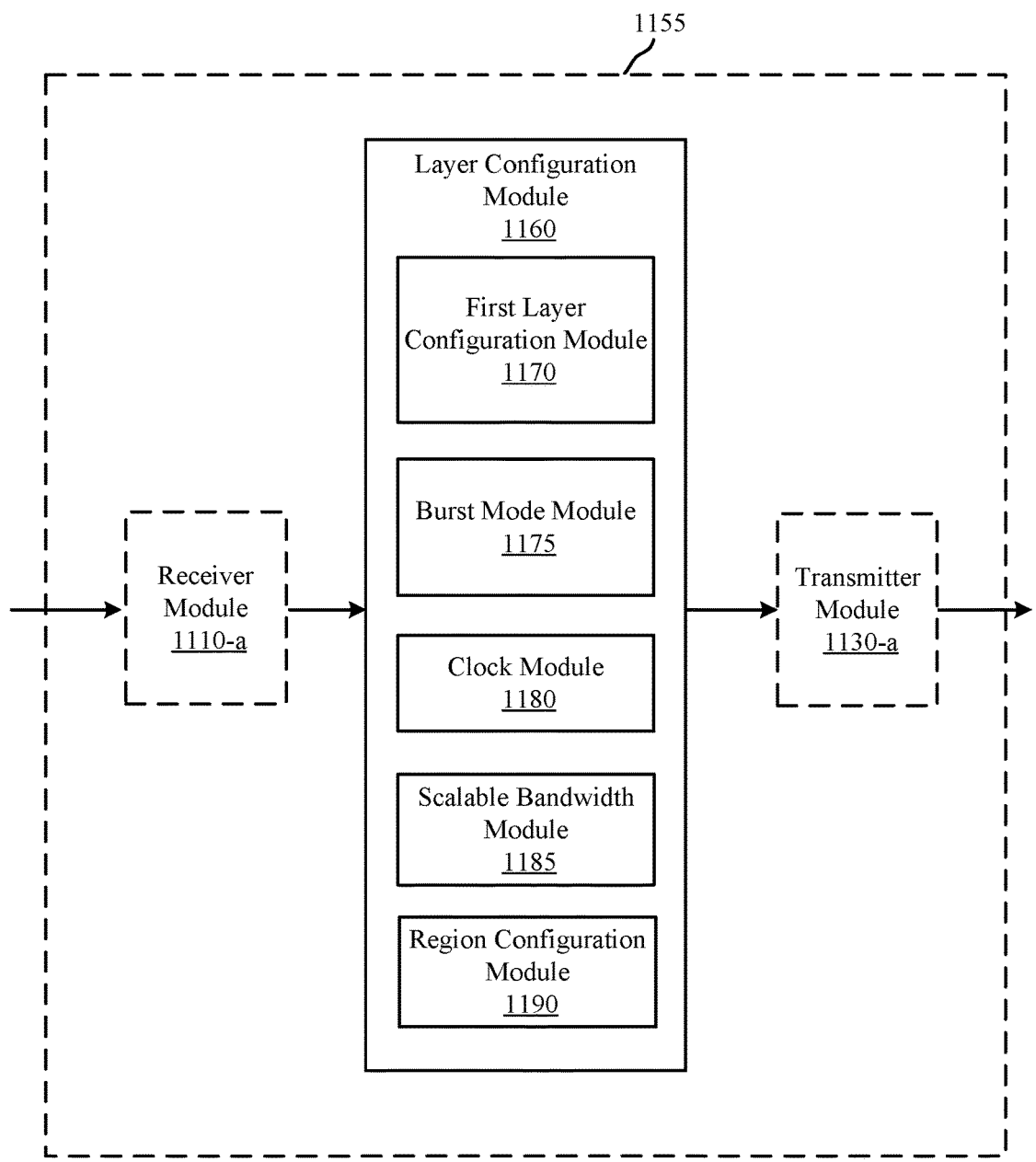

FIGS. 11A and 11B are block diagrams conceptually illustrating devices, such as eNBs or UEs, for use in wireless communications in accordance with aspects of the present disclosure. With reference first to FIG. 11A, a block diagram 1100 illustrates a device 1105 for use in wireless communications in accordance with various examples. In some examples, the device 1105 may be an example of one or more aspects of the access points, or eNBs 105 and/or UEs 115 described with reference to FIGS. 1 and/or 7. The device 1105 may also be a processor. The device 1105 may include a receiver module 1110, a layer configuration module, and/or a transmitter module 1130. Each of these components may be in communication with each other.

The components of the device 1105 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1110 may be or include a radio frequency (RF) receiver, such as an RF receiver operable to receive transmissions on two or more hierarchical layers (e.g., through legacy LTE subframes and burst subframes). The receiver module 1110 may be used to receive various types of data and/or control signals (i.e., transmissions) over one or more communication links of a wireless communications system, such as one or more communication links 125 of the wireless communications system 100 described with reference to FIG. 1.

In some examples, the transmitter module 1130 may be or include an RF transmitter, such as an RF transmitter operable to transmit on two or more hierarchical layers (e.g., through legacy LTE subframes and burst subframes). The transmitter module 1130 may be used to transmit various types of data and/or control signals (i.e., transmissions) over one or more communication links of a wireless communications system, such as one or more communication links 125 of the wireless communications system 100 described with reference to FIG. 1.

In some examples, the layer configuration module 1120 may configure and/or perform layer configuration for device 1105 operation in a wireless communications system having two or more hierarchical layers. Layer configuration module 1120 may, for example configure device 1105 to operate within the wireless communications system having first hierarchical layer transmissions with a first subframe type having a first RTT. Layer configuration module 1120 may also perform operations at a second hierarchical layer multiplexed with the first hierarchical layer, the second hierarchical layer having second layer transmissions with a second subframe type having a second RTT that is less than the first RTT. In some examples, the layer configuration module may configure or identify several regions of a carrier with different symbol durations. Configuration and operation may include transmission and/or reception of legacy and/or burst subframes, and may include transmission and/or reception of symbols of different durations TDM or FDM, such as described above with respect to FIGS. 1-10, for example.

Referring now to FIG. 11B, a block diagram 1150 illustrates a device 1155 for use in wireless communications, in accordance with various aspects of the present disclosure. In some examples, the device 1155 may be an example of one or more aspects of the access points or eNBs 105, UEs 115, and/or device 1105 described with reference to FIGS. 1, 7, and/or 11A. The device 1155 may also be a processor. The device 1155 may include a receiver module 1110, a layer configuration module 1160, and/or a transmitter module 1130. Each of these components may be in communication with each other.

The components of the device 1155 may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1110-a may be an example of the receiver module 1110 of FIG. 11A. The receiver module 1110-a may be or include a radio frequency (RF) receiver, such as an RF receiver operable to receive transmissions on two or more hierarchical layers (e.g., through legacy LTE subframes and burst subframes). The RF receiver, in some examples, may include separate receivers for the first and second hierarchical layers. In other examples, the RF receiver may include a single receiver, or a single receiver per transmit/receive chain, and a clock module 1180 of layer configuration module 1160 may be adapted to process received symbols having different symbol durations. The receiver module 1110-a may be used to receive various types of data and/or control signals (i.e., transmissions) over one or more communication links of a wireless communications system including over two or more hierarchical layers, such as one or more communication links 125 of the wireless communications system 100 described with reference to FIG. 1.

In some examples, the transmitter module 1130-a may be an example of the transmitter module 1130 of FIG. 11A. The transmitter module 1130-a may be or include a radio frequency (RF) transmitter, such as an RF transmitter operable to transmit on two or more hierarchical layers (e.g., through legacy LTE subframes and burst subframes). The RF transmitter 1130-a, in some examples, may include separate transmitters for the first and second hierarchical layers. In other examples, the RF transmitter may include a single transmitter, or a single transmitter per transmit/receive chain, and a clock module 1180 of layer configuration module 1160 may be adapted to generate symbols having different symbol durations. The transmitter module 1130-a may be used to receive various types of data and/or control signals (i.e., transmissions) over one or more communication links of a wireless communications system including over two or more hierarchical layers, such as one or more communication links 125 of the wireless communications system 100 described with reference to FIG. 1.

The layer configuration module 1160 may be an example of the layer configuration module 1120 described with reference to FIG. 11A and may include a first layer configuration module 1170, a burst mode module 1175, clock module 1180, and optional scalable bandwidth module 1185. Each of these components may be in communication with each other.

In some examples, the first layer configuration module 1170 may perform configuration for the device 1155 to operate in the first hierarchical layer and perform at least some functions for device operation in the first hierarchical layer, such as described above with respect to FIGS. 1-10, for example. In some examples, the first layer configuration module 1170, in conjunction with the transmitter module 1130-a or the receiver module 1110-a, may communicate (e.g., transmit or receive) a signal in a symbol of one region, where the signal is indicative of a symbol duration of another region. The burst mode module 1175 may configure for the device 1155 to operate in the second hierarchical layer and perform at least some functions for device operation in the second hierarchical layer, such as described above with respect to FIGS. 1-10, for example. The clock module 1180 may perform clock adaptation to allow a clock to be adapted in order to enable generation of symbols, and processing of received symbols, having different symbol durations, such as described above with respect to FIGS. 1-10, for example. In some examples, the clock module 1180 may adjust or identify a time duration or periodicity of a carrier region configured with a particular symbol duration. Scalable bandwidth module 1185 may perform bandwidth scaling in examples that may utilize carrier aggregation to transmit/receive multiple component carriers for legacy subframes and utilize scaled bandwidth on a single component carrier for burst subframes, such as described above with respect to FIGS. 1 and 7-10, for example. Additionally or alternatively, scalable bandwidth module 1185 may adjust or identify (e.g., based on a latency requirement) bandwidth of a carrier region configured with a particular symbol duration. In some examples, the region configuration module 1190 may configure or identify one or several regions of a carrier with different symbol durations, where the various regions may be TDM or FDM. The region configuration module 1190, in conjunction with the first layer configuration module 1170, may configure or identify a guard band between regions having different symbol durations.

Figure 12:
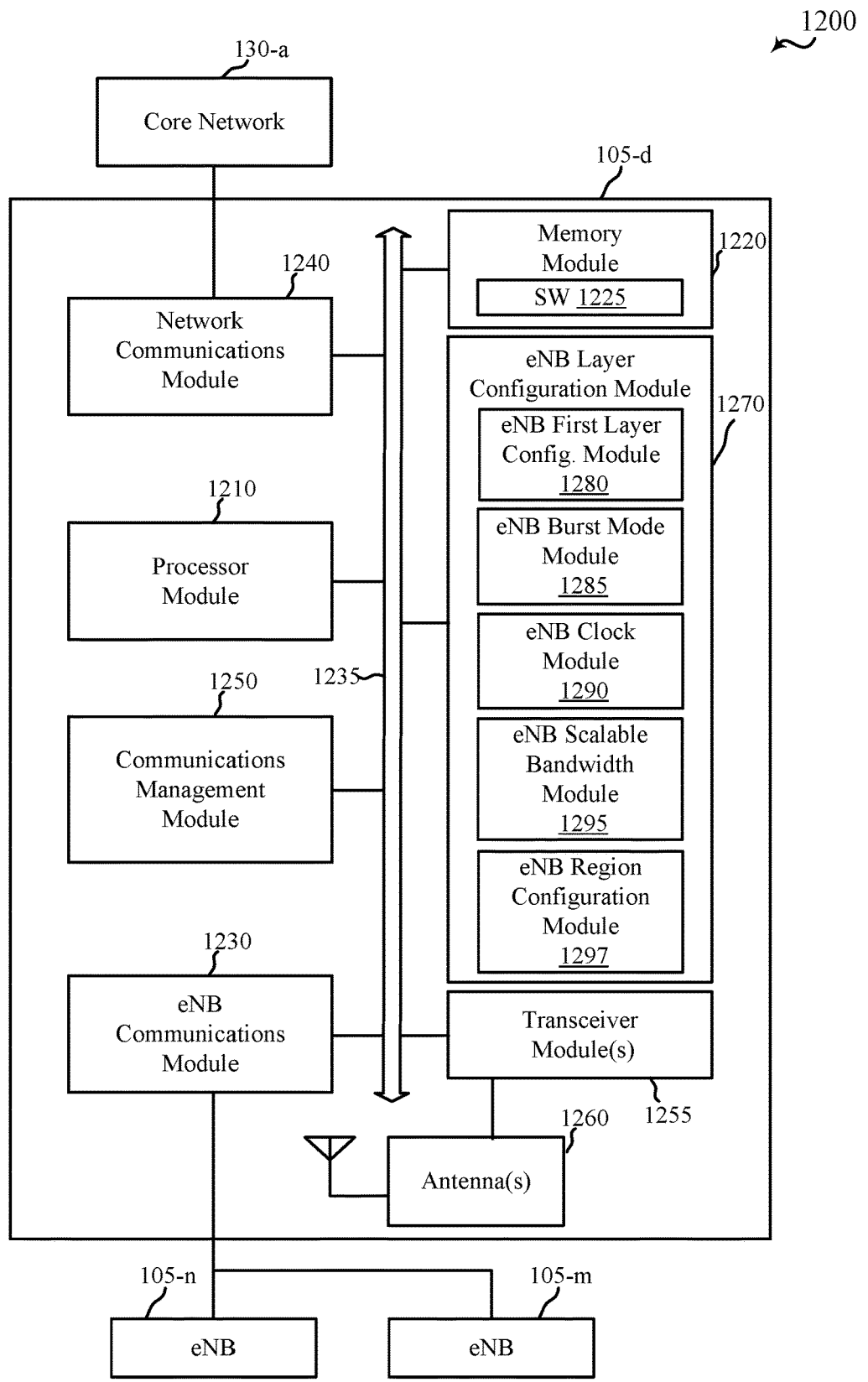
FIG. 12 is a block diagram conceptually illustrating a design of an eNB, in accordance with aspects of the present disclosure.

FIG. 12 is a block diagram conceptually illustrating a design of an eNB, in accordance with aspects of the present disclosure, configured for hierarchical communications within a wireless communications system. In examples, the eNB 105-d may be an example of one or more aspects of the access points, eNBs, or devices 105, 1105, and/or 1155 described with reference to FIGS. 1, 7 and/or 11. The eNB 105-d may be configured to implement at least some of the hierarchical communications features and functions described with respect to FIGS. 1-10. The eNB 105-d may include a processor module 1210, a memory module 1220, at least one transceiver module (represented by transceiver module(s) 1255), at least one antenna (represented by antenna(s) 1260), and/or an eNB LTE layer configuration module 1270. The eNB 105-d may also include one or both of an eNB communications module 1230 and a network communications module 1240. Each of these components may be in communication with each other, directly or indirectly, over one or more buses 1235.

The memory module 1220 may include random access memory (RAM) and/or read-only memory (ROM). The memory module 1220 may store computer-readable, computer-executable software (SW) code 1225 containing instructions that are configured to, when executed, cause the processor module 1210 to perform various functions described herein for hierarchical communications in two or more layers, including the transmission and/or reception of burst subframes having relatively low latency, such as described above. In some examples, the SW code 1225 may include instructions that are configured to cause the processor module 1210 to configured a carrier with a first region having a first symbol duration and a second region having a second symbol duration, where the first and second symbol durations are different—e.g., the first symbol duration may be longer than the second symbol duration. Alternatively, the software code 1225 may not be directly executable by the processor module 1210 but be configured to cause the eNB 105-*d*, e.g., when compiled and executed, to perform various of the functions described herein.

The processor module 1210 may include an intelligent hardware device, e.g., a central processing unit (CPU), a microcontroller, an ASIC, etc. The processor module 1210 may process information received through the transceiver module(s) 1255, the base station communications module 1230, and/or the network communications module 1240. The processor module 1210 may also process information to be sent to the transceiver module(s) 1255 for transmission through the antenna(s) 1260, to the eNB communications module 1230 for transmission to one or more other base stations or eNBs 105-*n* and 105-*m*, and/or to the network communications module 1240 for transmission to a core network 130-*a*, which may be an example of aspects of the core network 130 described with reference to FIG. 1. The processor module 1210 may handle, alone or in connection with the eNB layer configuration module 1270, various aspects of hierarchical communications in two or more hierarchical layers, such as described above with respect to FIGS. 1-10.

The transceiver module(s) 1255 may include a modem configured to modulate the packets and provide the modulated packets to the antenna(s) 1260 for transmission, and to demodulate packets received from the antenna(s) 1260. The transceiver module(s) 1255 may be implemented as one or more transmitter modules and one or more separate receiver modules. The transceiver module(s) 1255 may support communications in two or more hierarchical layers (e.g., through legacy LTE subframes and burst subframes), or may support communications with regions of different symbol durations that are TDM or FDM. The transceiver module(s) 1255 may be configured to communicate bi-directionally, via the antenna(s) 1260, with one or more of the UEs or devices 115, 1105 and/or 1155 described with reference to FIGS. 1, 7 and/or 11, for example. The eNB 105-*d* may include multiple antennas 1260 (e.g., an antenna array). The eNB 105-*d* may communicate with the core network 130-*a* through the network communications module 1240. The eNB 105-*d* may communicate with other access points or eNBs, such as the eNB 105-*n* and/or 105-*m*, using the eNB communications module 1230.

According to the architecture of FIG. 12, the eNB 105-*d* may further include a communications management module 1250. The communications management module 1250 may manage communications with other base stations, eNBs, and/or devices. The communications management module 1250 may be in communication with some or all of the other components of the eNB 105-*d* via the bus or buses 1235. Alternatively, functionality of the communications management module 1250 may be implemented as a component of the transceiver module(s) 1255, as a computer program product, and/or as one or more controller elements of the processor module 1210.

The eNB layer configuration module 1270 may be configured to perform and/or control some or all of the eNB hierarchical communications functions or aspects described with reference to FIGS. 1-10. For example, the eNB layer configuration module 1270 may be configured to support communications on one or more hierarchical layers of a wireless communications system having multiple hierarchical layers, such as through transmission/reception of burst subframes; and the eNB layer configuration module 1270 may be configured to support a wireless communications system in which several regions of a carrier having different symbol duration coexist. The eNB layer configuration module 1270 may include an eNB first layer configuration module 1280 to configure the eNB 105-*d* for communications in a wireless communication system having multiple hierarchical layers or to signal, in a symbol of one region, a symbol duration of another region, an eNB burst mode module 1285 configured to perform functions related to the transmission and reception of burst subframes, eNB clock module 1290 configured to provide clock adaptation or to adjust a time duration or periodicity of a carrier region based on symbol duration, eNB scalable bandwidth module 1295 configured to perform bandwidth scaling across multiple subcarriers or to adjust bandwidth of a carrier region configured with a particular symbol duration, and eNB region configuration module 1297 to configured one or several regions of a carrier with different symbol durations or guard bands. The eNB layer configuration module 1270 may be an example of similar modules (e.g., modules 1120 and 1160) described with reference to FIGS. 11A and/or 11B. The eNB layer configuration module 1270, or portions of it, may include a processor and/or some or all of the functionality of the eNB layer configuration module 1270 may be performed by the processor module 1210 and/or in connection with the processor module 1210.

Figure 13:
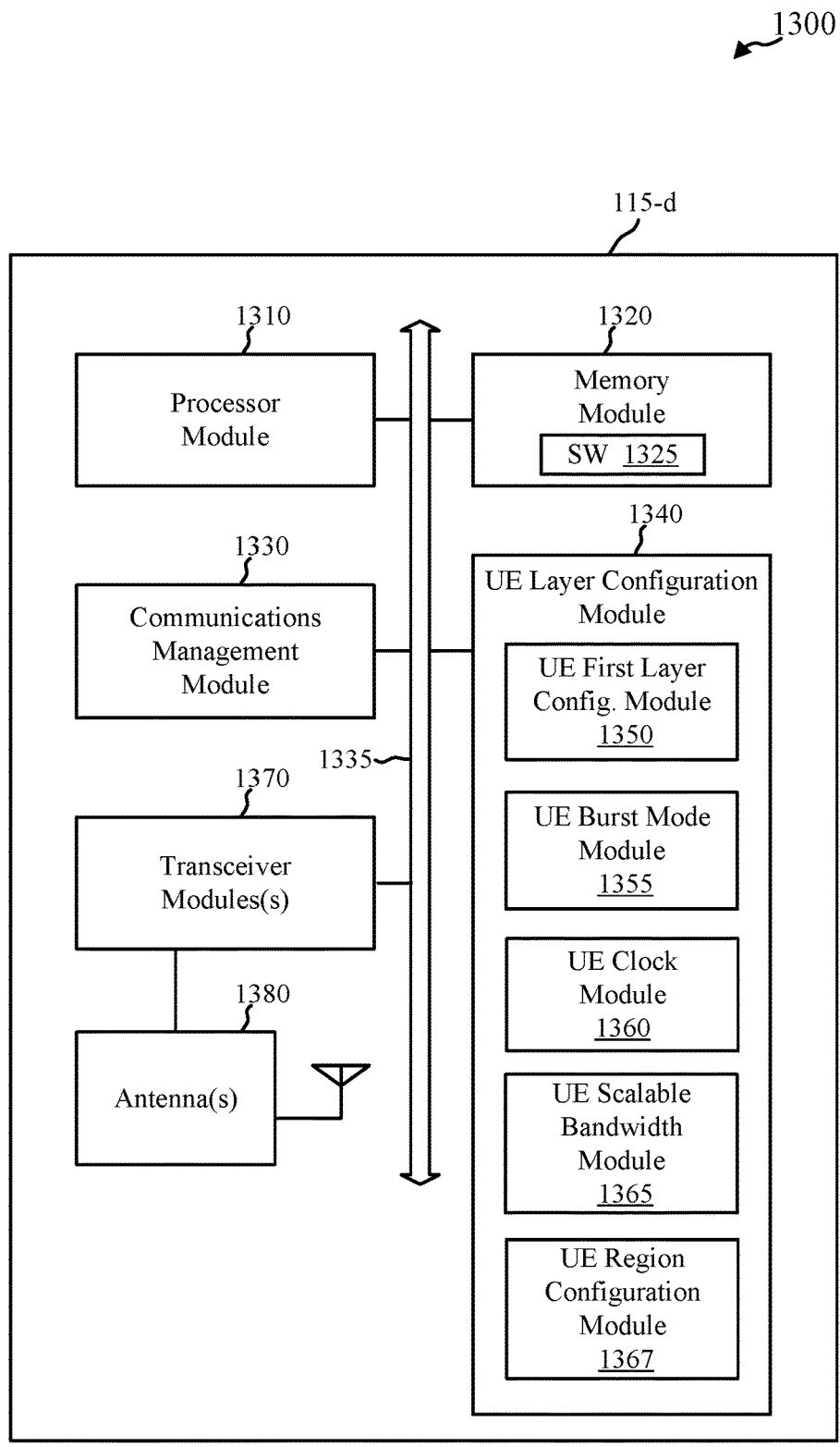
FIG. 13 is a block diagram conceptually illustrating a design of a UE, in accordance with aspects of the present disclosure.

FIG. 13 is a block diagram 1300 conceptually illustrating a design of a UE, in accordance with aspects of the present disclosure, configured for hierarchical communications in a wireless communications system. The UE 115-*d* may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The UE 115-*d* may have an internal power supply (not shown), such as a small battery, to facilitate mobile operation. In some examples, the UE 115-*d* may be an example of one or more of the UEs or devices 115, 1105 and/or 1155 described with reference to FIGS. 1, 7, 11A and/or 11B. The UE 115-*d* may be configured to communicate with one or more of the access points, eNBs or devices 105, 1105 and/or 1155 described with reference to FIGS. 1, 7, 11A, 11B and/or 12.

The UE 115-*d* may include a processor module 1310, a memory module 1320, at least one transceiver module (represented by transceiver module(s) 1370), at least one antenna (represented by antenna(s) 1380), and/or a UE layer configuration module 1340. Each of these components may be in communication with each other, directly or indirectly, over one or more buses 1335.

The memory module 1320 may include RAM and/or ROM. The memory module 1320 may store computer-readable, computer-executable software (SW) code 1325 containing instructions that are configured to, when executed, cause the processor module 1310 to perform various functions described herein for hierarchical communications or communications with regions of different symbol durations in a wireless communication system. Alternatively, the software code 1325 may not be directly executable by the processor module 1310 but be configured to cause the UE 115-*d* (e.g., when compiled and executed) to perform various of the UE functions described herein.

The processor module 1310 may include an intelligent hardware device, e.g., a CPU, a microcontroller, an ASIC, etc. The processor module 1310 may process information received through the transceiver module(s) 1370 and/or information to be sent to the transceiver module(s) 1370 for transmission through the antenna(s) 1380. The processor module 1310 may handle, alone or in connection with the UE layer configuration module 1340, various aspects of hierarchical communications on one or more hierarchical layers of a wireless communications system, including transmission and reception of burst subframes, for example; and the processor module 1310, e.g., in conjunction with the UE layer configuration module 1340, may identify and communicate with one or several regions of a carrier having different symbol durations.

The transceiver module(s) 1370 may be configured to communicate bi-directionally with eNBs. The transceiver module(s) 1370 may be implemented as one or more transmitter modules and one or more separate receiver modules. The transceiver module(s) 1370 may support communications on at least one layer of a multiple hierarchical layer wireless communications system. The transceiver module(s) 1370 may include a modem configured to modulate the packets and provide the modulated packets to the antenna(s) 1380 for transmission, and to demodulate packets received from the antenna(s) 1380. While the UE 115-d may include a single antenna, there may be examples in which the UE 115-d may include multiple antennas 1380.

According to the architecture of FIG. 13, the UE 115-d may further include a communications management module 1330. The communications management module 1330 may manage communications with various base stations or eNBs. The communications management module 1330 may be a component of the UE 115-d in communication with some or all of the other components of the UE 115-d over the one or more buses 1335. Alternatively, functionality of the communications management module 1330 may be implemented as a component of the transceiver module(s) 1370, as a computer program product, and/or as one or more controller elements of the processor module 1310.

The UE layer configuration module 1340 may be configured to perform and/or control some or all of the UE hierarchical communications functions or aspects, or communications with regions of different symbol durations that are TDM or FDM, described in FIGS. 1-10 related to using communication on one or more hierarchical layers in a wireless communications system having multiple hierarchical layers. For example, the UE layer configuration module 1340 may be configured to process received symbols and/or generate symbols that may be included in one or more burst subframes. The UE layer configuration module 1340 may include a UE first layer configuration module 1350 to configure the UE 115-d to operate in the wireless communications system with multiple hierarchical layers or having regions configured with different symbol durations, a UE burst mode module 1355 configured to handle processing of received symbols from one or more burst subframes and/or generation of burst mode symbols, UE clock module 1360 configured to provide clock adaptation based on symbol duration or to identify a time duration or periodicity of a carrier region having a particular symbol duration, UE scalable bandwidth module 1365 configured to perform bandwidth scaling across multiple subcarriers or to identify bandwidth of a carrier region configured with a particular symbol duration, and UE region configuration module 1367 to identify one or several regions of a carrier configured with different symbol durations. The UE layer configuration module 1340, or portions of it, may include a processor and/or some or all of the functionality of the UE layer configuration module 1340 may be performed by the processor module 1310 and/or in connection with the processor module 1310.

Figure 14:
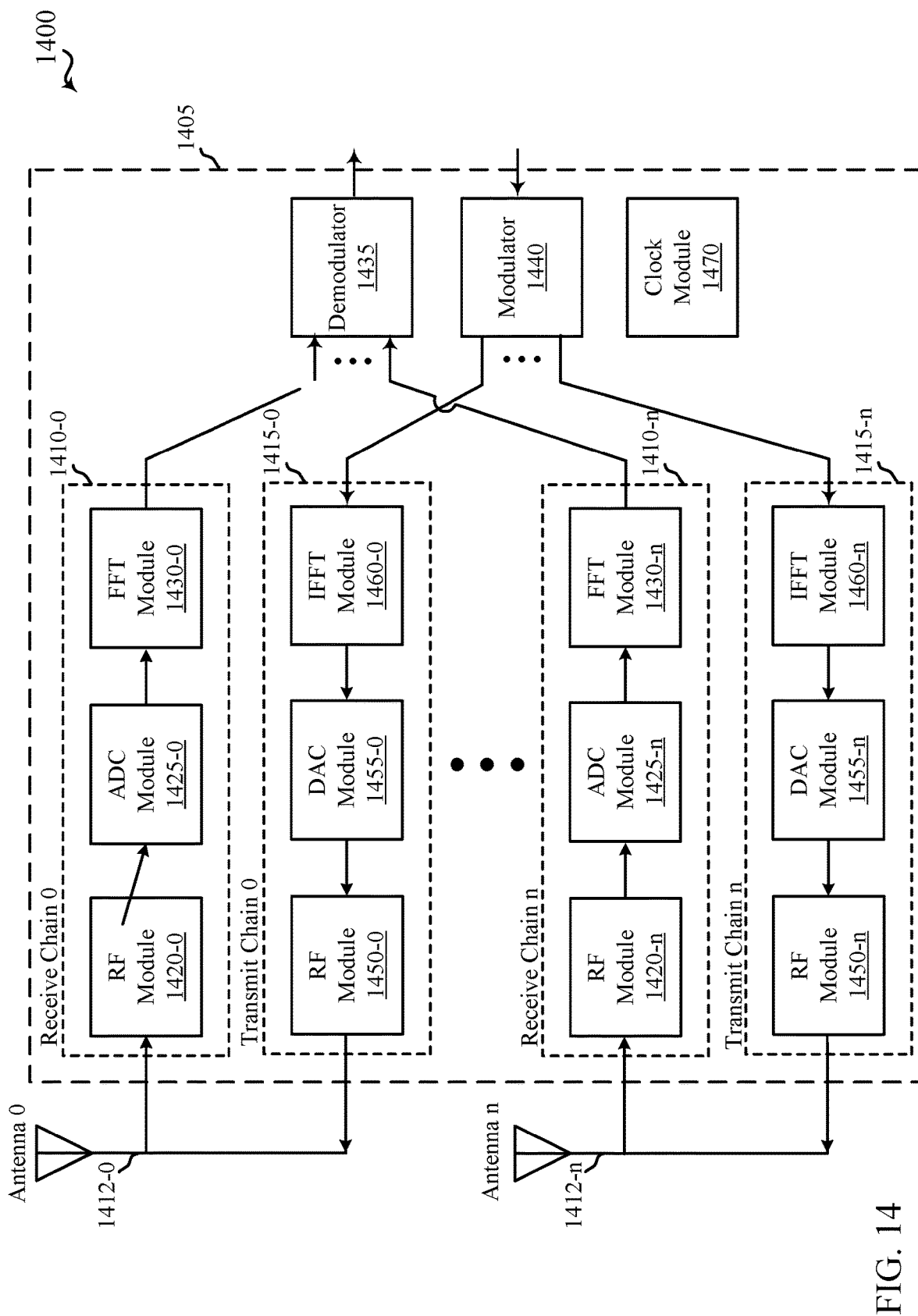
FIG. 14 is a block diagram conceptually illustrating a transceiver module of an eNB or UE, for use in wireless communications in accordance with aspects of the present disclosure.

FIG. 14 is a block diagram 1400 conceptually illustrating a design of transceiver module 1405, in accordance with aspects of the present disclosure. The transceiver module 1405 may have various other configurations and may be included or be part of a UE or device such as UEs or devices 115, 1105, and/or 1155 of FIGS. 1, 7, 11A, 11B, and/or 13. Transceiver module 1405 may also be included or be a part of an access point or eNB, such as access points or eNBs 105 of FIGS. 1, 7, and/or 12. The transceiver module 1405 may be an example of the transceiver module(s) 1255 and/or 1370 of FIGS. 12 and/or 13. The transceiver module 1405 may include multiple receive chains 1410, including receive chain 0 1410-0 through receive chain n 1410-n, and multiple transmit chains 1415, including transmit chain 0 1410-0 through transmit chain n 1410-n. Each of receive chains 1410-0-1410-n and transmit chains 1415-0-1415-n may be coupled with an associated antenna 1412, namely antenna 0 1412-0 through antenna n 1412-n, respectively. Receive chains 1410-0-1410-n may, respectively, include RF modules 1420-0 through 1420-n, analog-to-digital converter (ADC) modules 1425-a through 1425-n, and fast Fourier transform (FFT) module 1430-0 through 1430-n, and may be coupled with a demodulator 1435. Transmit chains 1415-0-1415-n may include, respectively, RF modules 1450-0 through 1450-n, digital-to-analog converter (DAC) modules 1455-0 through 1455-n, and inverse FFT (IFFT) modules 1460-0 through 1460-n, and may be coupled with a modulator 1440.

According to some examples, transceiver module 1405 may be configured to operate in different hierarchical layers in a wireless communications system, and components of the transmit and receive chains may be configured and adapted to transmit and receive symbols having different symbol durations based on whether the symbols are transmitted as part of a burst subframe or as part of a legacy subframe. In some examples, clock module 1470 may be adapted to clock components at different rates in order to generate symbols having different symbol durations, or receive and process symbols having different symbol durations.

In examples that may utilize hierarchical layers with scalable bandwidth, transmit and receive chains may be adapted to transmit/receive carriers having different bandwidths based on whether a carrier is one of multiple component carriers, or a single carrier having a bandwidth that is greater than the bandwidth of a legacy component carrier. In some examples, multiple transmit and/or receive chains may be used to transmit component carriers in a carrier aggregation transmission of legacy subframes. In the event that one or more burst subframes are to be transmitted/received, one or more of the transmit and/or receive chains may be disabled with one of the transmit and/or receive chains remaining enabled to transmit/receive the signal component carrier with scaled bandwidth. In some examples, FFT modules 1430 and IFFT modules 1460 may have different FFT points based on the hierarchical layer of a particular symbol. In some examples, legacy 20 MHz symbols may have a 2048 point FFT, and burst 20 MHz symbols may have a 256 point FFT. In examples where burst mode symbols may have scaled bandwidth, the FFT size may be increased accordingly to, for example, a 2048 point FFT for a 160 MHz carrier bandwidth.

Figure 15:
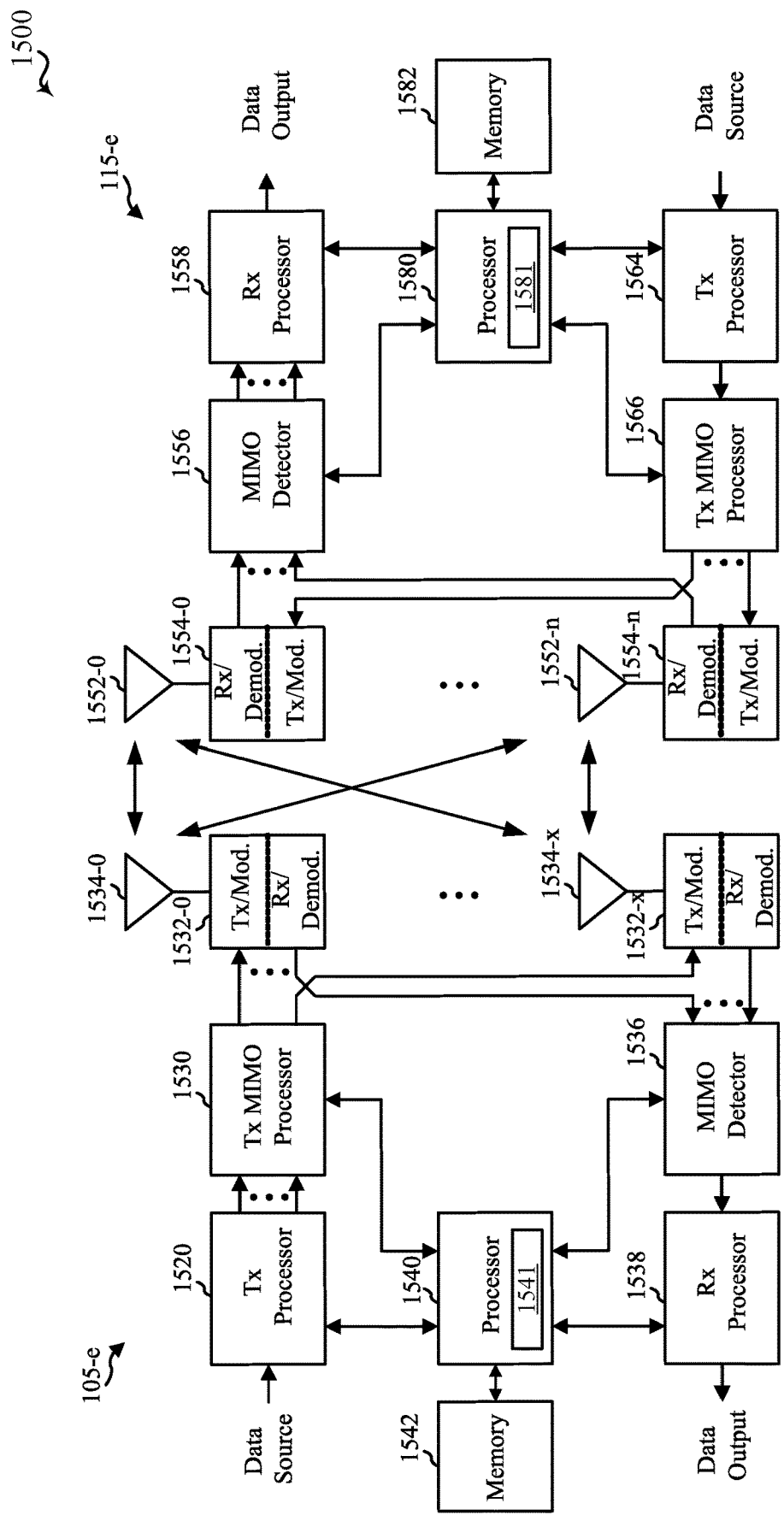
FIG. 15 is a block diagram conceptually illustrating an example of a UE and an eNB, in accordance with aspects of the present disclosure.

Turning next to FIG. 15, a block diagram of a multiple-input multiple-output (MIMO) communication system 1500 is shown including an eNB 105-e and a UE 115-e. The eNB 105-e and the UE 115-e may support communications in a wireless communications system having multiple hierarchical layers. The eNB 105-*e* may be an example of one or more aspects of the access points, eNBs or devices 105, 1105, and/or 1155 described with reference to FIGS. 1, 7, 11A, 11B, and/or 12, while the UE 115-*e* may be an example of one or more aspects of the UEs or devices 115, 1105, and/or 1155 described with reference to FIGS. 1, 7, 11A, 11B, and/or 13. The system 1500 may illustrate aspects of the wireless communications system 100 and/or 700 described with reference to FIGS. 1 and/or 7, and may support hierarchical transmissions on multiple hierarchical layers across different subsets of nodes during different time periods such as described above with reference to FIGS. 1-14.

The eNB 105-*e* may be equipped with antennas 1534-0 through 1534-*x*, and the UE 115-*e* may be equipped with antennas 1552-0 through 1552-*n*. In the system 1500, the eNB 105-*e* may be able to send data over multiple communication links at the same time. Each communication link may be called a "layer" and the "rank" of the communication link may indicate the number of layers used for communication. For example, in a 2×2 MIMO system where eNB 105-*e* transmits two "layers," the rank of the communication link between the eNB 105-*e* and the UE 115-*e* may be two.

At the eNB 105-*e*, a transmit (Tx) processor 1520 may receive data from a data source. The transmit processor 1520 may process the data. The transmit processor 1520 may also generate reference symbols and/or a cell-specific reference signal. A transmit (Tx) MIMO processor 1530 may perform spatial processing (e.g., precoding) on data symbols, control symbols, and/or reference symbols, if applicable, and may provide output symbol streams to the transmit (Tx) modulators 1532-0 through 1532-*x*. Each modulator 1532 may process a respective output symbol stream (e.g., for OFDM, etc.) to obtain an output sample stream. Each modulator 1532 may further process (e.g., convert to analog, amplify, filter, and upconvert) the output sample stream to obtain a downlink (DL) signal. In one example, DL signals from modulators 1532-0 through 1532-*x* may be transmitted via the antennas 1534-0 through 1534-*x*, respectively.

At the UE 115-*e*, the antennas 1552-0 through 1552-*n* may receive the DL signals from the eNB 105-*e* and may provide the received signals to the receive (Rx) demodulators 1554-0 through 1554-*n*, respectively. Each demodulator 1554 may condition (e.g., filter, amplify, downconvert, and digitize) a respective received signal to obtain input samples. Each demodulator 1554 may further process the input samples (e.g., for OFDM, etc.) to obtain received symbols. A MIMO detector 1556 may obtain received symbols from all the demodulators 1554-0 through 1554-*n*, perform MIMO detection on the received symbols if applicable, and provide detected symbols. A receive (Rx) processor 1558 may process (e.g., demodulate, deinterleave, and decode) the detected symbols, providing decoded data for the UE 115-*e* to a data output, and provide decoded control information to a processor 1580, or memory 1582. The processor 1580 may include a module or function 1581 that may perform various functions related to hierarchical transmissions on multiple hierarchical layers in a wireless communications system. For example, the module or function 1581 may perform some or all of the functions of the layer configuration module 1120 or 1160 described with reference to FIG. 11A or 11B, and/or of the eNB layer configuration module 1270 described with reference to FIG. 12.

On the uplink (UL), at the UE 115-*e*, a transmit (Tx) processor 1564 may receive and process data from a data source. The transmit processor 1564 may also generate reference symbols for a reference signal. The symbols from the transmit processor 1564 may be precoded by a transmit (Tx) MIMO processor 1566 if applicable, further processed by the transmit (Tx) modulators 1554-0 through 1554-*n* (e.g., for SC-FDMA, etc.), and be transmitted to the eNB 105-*e* in accordance with the transmission parameters received from the eNB 105-*e*. At the eNB 105-*e*, the UL signals from the UE 115-*e* may be received by the antennas 1534, processed by the receiver (Rx) demodulators 1532, detected by a MIMO detector 1536 if applicable, and further processed by a receive (Rx) processor 1538. The receive processor 1538 may provide decoded data to a data output and to the processor 1540. The processor 1540 may include a module or function 1541 that may perform various aspects related to hierarchical transmissions on multiple hierarchical layers in a wireless communications system. For example, the module or function 1541 may perform some or all of the functions of the layer configuration module 1120 or 1160 described with reference to FIG. 11A or 11B, and/or of the UE layer configuration module 1340 described with reference to FIG. 13.

The components of the eNB 105-*e* may, individually or collectively, be implemented with one or more ASICs adapted to perform some or all of the applicable functions in hardware. Each of the noted modules may be a means for performing one or more functions related to operation of the system 1500. Similarly, the components of the UE 115-*e* may, individually or collectively, be implemented with one or more ASICs adapted to perform some or all of the applicable functions in hardware. Each of the noted components may be a means for performing one or more functions related to operation of the system 1500.

In one configuration, the eNB 105-*e* includes means for configuring to operate within a wireless communications system that is partially defined through a first layer having first layer transmissions that have a first subframe type having a first round trip time (RTT) between transmission and acknowledgment of receipt of the transmission, and means for operating at a second layer multiplexed with the first layer, the second layer transmissions having a second subframe type having a second RTT that is less than the first RTT. In one aspect, the aforementioned means may be the eNB controller/processor 1540, the eNB memory 1542, the eNB transmit processor 1520, eNB receiver processor 1538, the eNB modulators/demodulators 1532, and the eNB antennas 1534 of the eNB 105-*e* configured to perform the functions recited by the aforementioned means. In configurations, the UE 115-*e* includes means for configuring to operate within a wireless communications system that is partially defined through a first layer having first layer transmissions that have a first subframe type having a first round trip time (RTT) between transmission and acknowledgment of receipt of the transmission, and means for operating at a second layer multiplexed with the first layer, the second layer transmissions having a second subframe type having a second RTT that is less than the first RTT. The aforementioned means may be the UE controller/processor 1580, the UE memory 1582, the UE transmit processor 1564, UE receiver processor 1558, the UE modulators/demodulators 1554, and the UE antennas 1552 of the UE 115-*e* configured to perform the functions recited by the aforementioned means.

In another configuration, the eNB 105-*e* includes means for concurrently transmitting, in a frame, one or more subframes having a first subframe type using two or more separate carriers, at least one of the carriers having a first bandwidth, and means for transmitting, in the frame, a subframe of a second subframe type using one carrier having a second bandwidth, the second bandwidth being greater than the first bandwidth. In one aspect, the aforementioned means may be the eNB controller/processor 1540, the eNB memory 1542, the eNB transmit processor 1520, eNB receiver processor 1538, the eNB modulators/demodulators 1532, and the eNB antennas 1534 of the eNB 105-*e* configured to perform the functions recited by the aforementioned means. In configurations, the UE 115-*e* includes means for concurrently transmitting, in a frame, one or more subframes having a first subframe type using two or more separate carriers, at least one of the carriers having a first bandwidth, and means for transmitting, in the frame, a subframe of a second subframe type using one carrier having a second bandwidth, the second bandwidth being greater than the first bandwidth. The aforementioned means may be the UE controller/processor 1580, the UE memory 1582, the UE transmit processor 1564, UE receiver processor 1558, the UE modulators/demodulators 1554, and the UE antennas 1552 of the UE 115-*e* configured to perform the functions recited by the aforementioned means.

Figure 16:
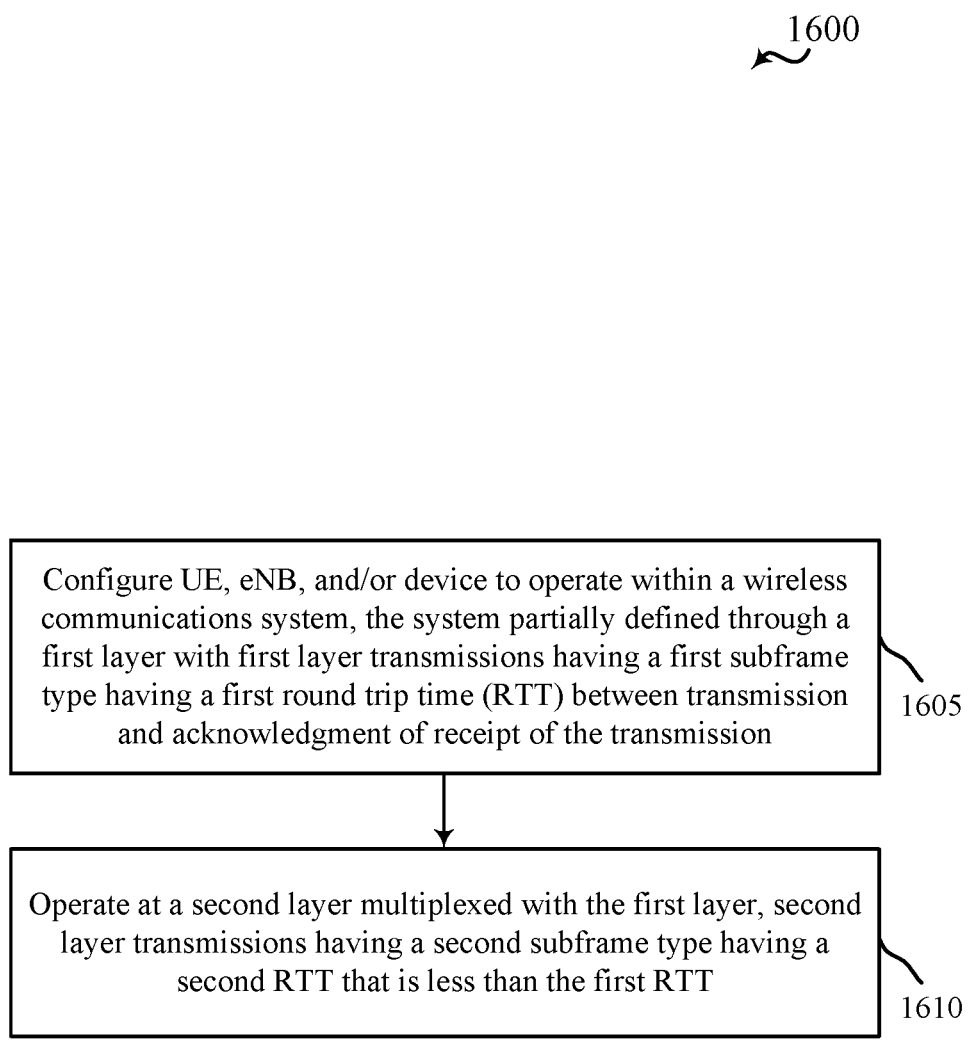
FIG. 16 is a flowchart conceptually illustrating an example of a method of wireless communication, in accordance with aspects of the present disclosure.

FIG. 16 is a flowchart conceptually illustrating an example of a method of wireless communication, in accordance with aspects of the present disclosure. For clarity, the method 1600 is described below with reference to ones of the access points, eNBs, UEs, or devices 105, 115, 1105, and/or 1155 described with reference to FIGS. 1, 7, 11A, 11B, 12, 13, and/or 15. In one example, an eNB, UE, or device may execute one or more sets of codes to control the functional elements of the eNB, UE, or device to perform the functions described below.

At block 1605, an eNB, UE, and/or device may be configured to operate within a wireless communications system, the system partially defined through a first layer with first layer transmissions having a first subframe type having a first RTT between transmission and acknowledgment of receipt of the transmission. The operation(s) at block 1605 may in some cases be performed using the layer configuration module 1120 and/or 1160 described with reference to FIGS. 11A and/or 11B, the eNB layer configuration module 1270 described with reference to FIG. 12, the UE layer configuration module 1340 described with reference to FIG. 13, the processor 1580 and/or the processor 1540 and related components described with reference to FIG. 15.

At block 1610, the eNB, UE, and/or device may operate at a second layer multiplexed with the first layer, second layer transmissions having a second subframe type having a second RTT that is less than the first RTT. The operation(s) at block 1610 may in some cases be performed using layer configuration module 1120 and/or 1160 in conjunction with receiver modules 1110 and transmitter modules 1130, described with reference to FIGS. 11A and/or 11B, the eNB layer configuration module 1270 in conjunction with transceiver module(s) 1255 and antenna(s) 1260, described with reference to FIG. 12, the UE layer configuration module 1340 in conjunction with transceiver module(s) 1370 and antenna(s) 1380, described with reference to FIG. 13, the processor 1580 and/or the processor 1540 and related components described with reference to FIG. 15.

Thus, the method 1600 may provide for wireless communications in different hierarchical layers in which RTTs for the second layer are shorter than RTTs for the first layer, and may thus provide a second layer with enhanced TCP segment error rates and thereby enhanced data transfer rates. It should be noted that the method 1600 is just one implementation and that the operations of the method 1600 may be rearranged or otherwise modified such that other implementations are possible.

Figure 17:
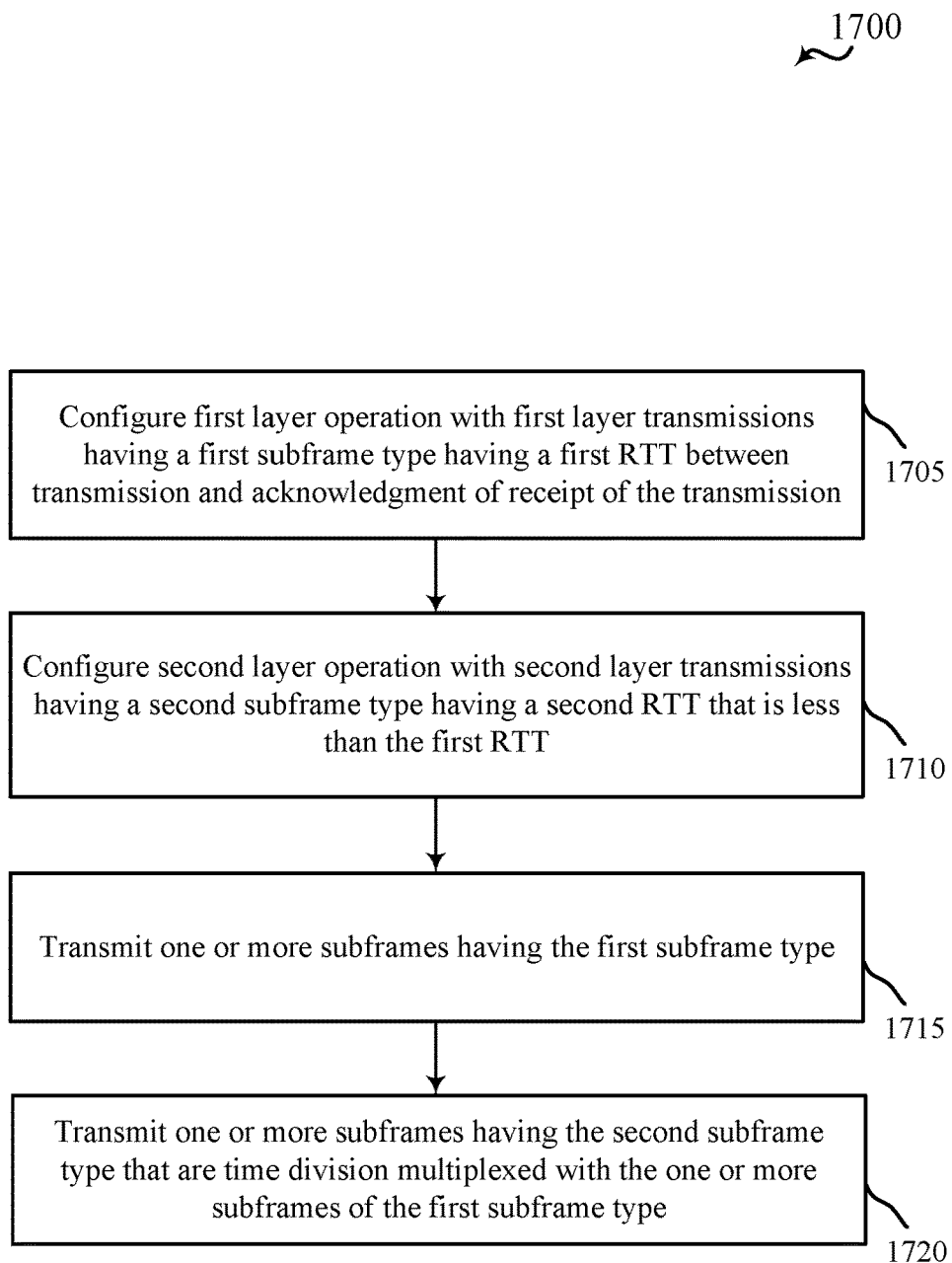
FIG. 17 is a flowchart conceptually illustrating an example of a method of wireless communication, in accordance with aspects of the present disclosure.

FIG. 17 is a flowchart conceptually illustrating an example of a method of wireless communication, in accordance with aspects of the present disclosure. For clarity, the method 1700 is described below with reference to ones of the access points, eNBs, UEs, or devices 105, 115, 1105, and/or 1155 described with reference to FIGS. 1, 7, 11A, 11B, 12, 13, and/or 15. In one example, an eNB, UE, or device may execute one or more sets of codes to control the functional elements of the eNB, UE, or device to perform the functions described below.

At block 1705, an eNB, UE, and/or device may configure a first layer operation with first layer transmissions having a first subframe type having a first RTT between transmission and acknowledgment of receipt of the transmission. The operation(s) at block 1705 may in some cases be performed using the layer configuration module 1120 and/or 1160 in conjunction with first layer configuration module 1170 described with reference to FIGS. 11A and/or 11B, the eNB layer configuration module 1270 in conjunction with eNB first layer configuration module 1280 described with reference to FIG. 12, the UE layer configuration module 1340 in conjunction with UE first layer configuration module 1350 described with reference to FIG. 13, the processor 1580 and/or the processor 1540 and related components described with reference to FIG. 15.

At block 1710, the eNB, UE, and/or device may configure second layer operation with second layer transmissions having a second subframe type having a second RTT that is less than the first RTT. The operation(s) at block 1710 may in some cases be performed using layer configuration module 1120 and/or 1160 in conjunction with burst mode module 1175 described with reference to FIGS. 11A and/or 11B, the eNB layer configuration module 1270 in conjunction with eNB burst mode module 1285 described with reference to FIG. 12, the UE layer configuration module 1340 in conjunction with UE burst mode module 1355 described with reference to FIG. 13, the processor 1580 and/or the processor 1540 and related components described with reference to FIG. 15.

At block 1715, the eNB, UE, and/or device may transmit one or more subframes having the first subframe type. The operation(s) at block 1715 may in some cases be performed using layer configuration module 1120 and/or 1160 in conjunction with first layer configuration module 1170 and transmitter modules 1130, described with reference to FIGS. 11A and/or 11B, the eNB layer configuration module 1270 in conjunction with eNB first layer configuration module 1280, transceiver module(s) 1255 and antenna(s) 1260, described with reference to FIG. 12, the UE layer configuration module 1340 in conjunction with UE first layer configuration module 1350, transceiver module(s) 1370 and antenna(s) 1380, described with reference to FIG. 13, the processor 1580 and/or the processor 1540 and related components described with reference to FIG. 15.

At block 1720, the eNB, UE, and/or device may transmit one or more subframes having the second subframe type that are time division multiplexed with the one or more subframes of the first subframe type. The operation(s) at block 1720 may in some cases be performed using layer configuration module 1120 and/or 1160 in conjunction with burst mode module 1175 and transmitter modules 1130, described with reference to FIGS. 11A and/or 11B, the eNB layer configuration module 1270 in conjunction with eNB burst mode module 1285, transceiver module(s) 1255, and antenna(s) 1260, described with reference to FIG. 12, the UE layer configuration module 1340 in conjunction with UE burst mode module 1355, transceiver module(s) 1370, and antenna(s) 1380, described with reference to FIG. 13, the processor 1580 and/or the processor 1540 and related components described with reference to FIG. 15.

Thus, the method 1700 may provide for wireless communications in different hierarchical layers in which RTTs for the second layer are shorter than RTTs for the first layer, and may thus provide a second layer with enhanced TCP segment error rates and thereby enhanced data transfer rates. It should be noted that the method 1700 is just one implementation and that the operations of the method 1700 may be rearranged or otherwise modified such that other implementations are possible.

Figure 18:
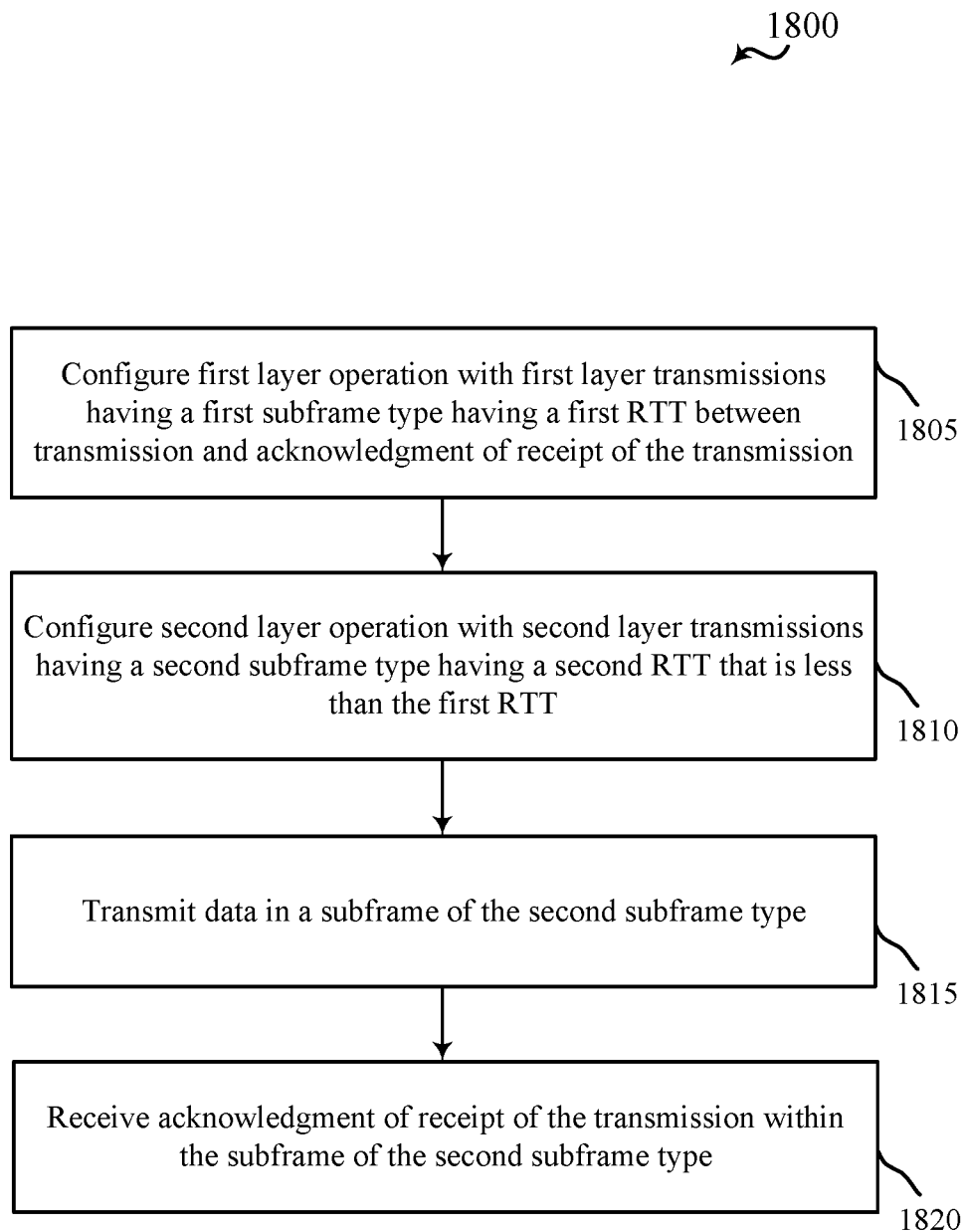
FIG. 18 is a flowchart conceptually illustrating an example of a method of wireless communication, in accordance with aspects of the present disclosure.

FIG. 18 is a flowchart conceptually illustrating an example of a method of wireless communication, in accordance with aspects of the present disclosure. For clarity, the method 1800 is described below with reference to ones of the access points, eNBs, UEs, or devices 105, 115, 1105, and/or 1155 described with reference to FIGS. 1, 7, 11A, 11B, 12, 13, and/or 15. In one example, an eNB, UE, or device may execute one or more sets of codes to control the functional elements of the eNB, UE, or device to perform the functions described below.

At block 1805, an eNB, UE, and/or device may configure a first layer operation with first layer transmissions having a first subframe type having a first RTT between transmission and acknowledgment of receipt of the transmission. The operation(s) at block 1805 may in some cases be performed using the layer configuration module 1120 and/or 1160 in conjunction with first layer configuration module 1170 described with reference to FIGS. 11A and/or 11B, the eNB layer configuration module 1270 in conjunction with eNB first layer configuration module 1280 described with reference to FIG. 12, the UE layer configuration module 1340 in conjunction with UE first layer configuration module 1350 described with reference to FIG. 13, the processor 1580 and/or the processor 1540 and related components described with reference to FIG. 15.

At block 1810, the eNB, UE, and/or device may configure second layer operation with second layer transmissions having a second subframe type having a second RTT that is less than the first RTT. The operation(s) at block 1810 may in some cases be performed using layer configuration module 1120 and/or 1160 in conjunction with burst mode module 1175 described with reference to FIGS. 11A and/or 11B, the eNB layer configuration module 1270 in conjunction with eNB burst mode module 1285 described with reference to FIG. 12, the UE layer configuration module 1340 in conjunction with UE burst mode module 1355 described with reference to FIG. 13, the processor 1580 and/or the processor 1540 and related components described with reference to FIG. 15.

At block 1815, the eNB, UE, and/or device may transmit data in a subframe of the second subframe type. The operation(s) at block 1815 may in some cases be performed using layer configuration module 1120 and/or 1160 in conjunction with burst mode module 1175 and transmitter modules 1130, described with reference to FIGS. 11A and/or 11B, the eNB layer configuration module 1270 in conjunction with eNB burst mode module 1285, transceiver module(s) 1255, and antenna(s) 1260, described with reference to FIG. 12, the UE layer configuration module 1340 in conjunction with UE burst mode module 1355, transceiver module(s) 1370, and antenna(s) 1380, described with reference to FIG. 13, the processor 1580 and/or the processor 1540 and related components described with reference to FIG. 15.

At block 1820, the eNB, UE, and/or device may receive acknowledgment of receipt of the transmission within the subframe of the second subframe type. The operation(s) at block 1820 may in some cases be performed using layer configuration module 1120 and/or 1160 in conjunction with burst mode module 1175 and receiver modules 1110, described with reference to FIGS. 11A and/or 11B, the eNB layer configuration module 1270 in conjunction with eNB burst mode module 1285, transceiver module(s) 1255, and antenna(s) 1260, described with reference to FIG. 12, the UE layer configuration module 1340 in conjunction with UE burst mode module 1355, transceiver module(s) 1370, and antenna(s) 1380, described with reference to FIG. 13, the processor 1580 and/or the processor 1540 and related components described with reference to FIG. 15.

Thus, the method 1800 may provide for wireless communications in different hierarchical layers in which acknowledgment of receipt of the a transmission may be received within a same subframe as the transmission. It should be noted that the method 1800 is just one implementation and that the operations of the method 1800 may be rearranged or otherwise modified such that other implementations are possible.

Figure 19:
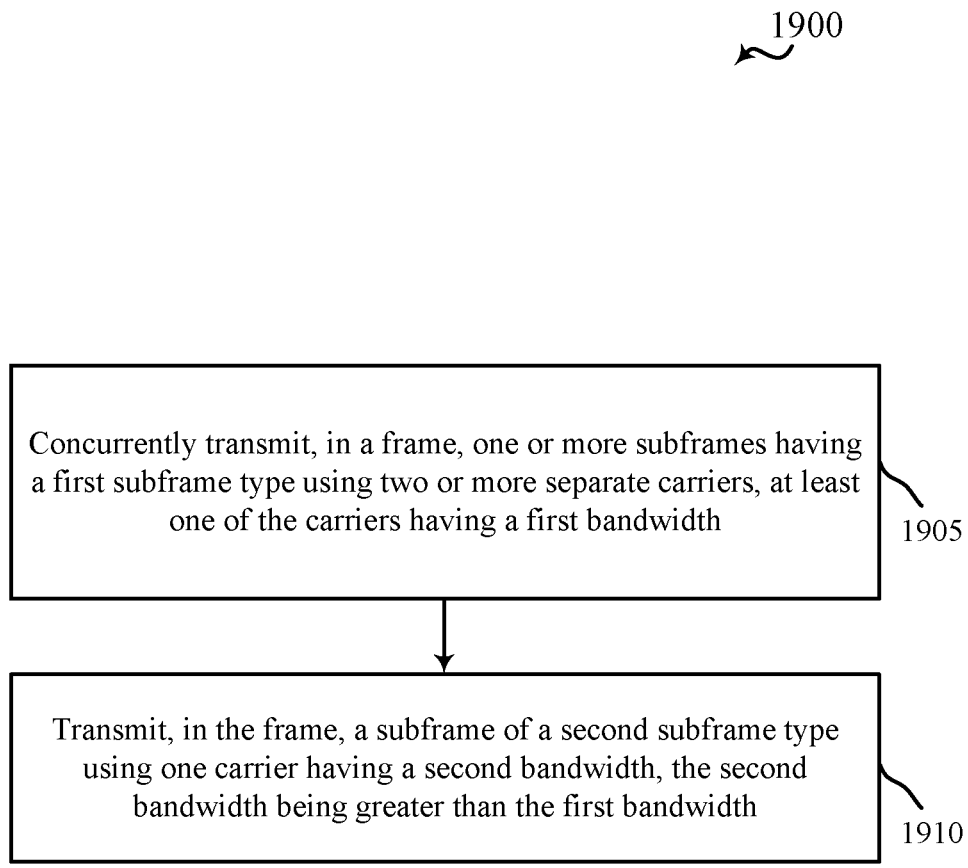
FIG. 19 is a flowchart conceptually illustrating an example of a method of wireless communication, in accordance with aspects of the present disclosure.

FIG. 19 is a flowchart conceptually illustrating an example of a method of wireless communication, in accordance with aspects of the present disclosure. For clarity, the method 1900 is described below with reference to ones of the access points, eNBs, UEs, or devices 105, 115, 1105, and/or 1155 described with reference to FIGS. 1, 7, 11A, 11B, 12, 13, and/or 15. In one example, an eNB, UE, or device may execute one or more sets of codes to control the functional elements of the eNB, UE, or device to perform the functions described below.

At block 1905, an eNB, UE, and/or device may concurrently transmit, in a frame, one or more subframes having a first subframe type using two or more separate carriers, at least one of the carriers having a first bandwidth. The operation(s) at block 1905 may in some cases be performed using the layer configuration module 1120 and/or 1160 in conjunction with scalable bandwidth module 1185 and transmitter modules 1130 described with reference to FIGS. 11A and/or 11B, the eNB layer configuration module 1270 in conjunction with eNB scalable bandwidth module 1295, transceiver module(s) 1255, and antenna(s) 1260, described with reference to FIG. 12, the UE layer configuration module 1340 in conjunction with UE scalable bandwidth configuration module 1365, transceiver module(s) 1370, and antenna(s) 1380, described with reference to FIG. 13, the processor 1580 and/or the processor 1540 and related components described with reference to FIG. 15.

At block 1910, the eNB, UE, and/or device may transmit, in the frame, a subframe of a second subframe type using one carrier having a second bandwidth, the second bandwidth being greater than the first bandwidth. The operation(s) at block 1910 may in some cases be performed using the layer configuration module 1120 and/or 1160 in conjunction with scalable bandwidth module 1185 and transmitter modules 1130 described with reference to FIGS. 11A and/or 11B, the eNB layer configuration module 1270 in conjunction with eNB scalable bandwidth module 1295, transceiver module(s) 1255, and antenna(s) 1260, described with reference to FIG. 12, the UE layer configuration module 1340 in conjunction with UE scalable bandwidth configuration module 1365, transceiver module(s) 1370, and antenna(s) 1380, described with reference to FIG. 13, the processor 1580 and/or the processor 1540 and related components described with reference to FIG. 15.

Thus, the method 1900 may provide for wireless communications that may utilize scalable bandwidth in different hierarchical layers. It should be noted that the method 1900 is just one implementation and that the operations of the method 1900 may be rearranged or otherwise modified such that other implementations are possible.

Figure 20:
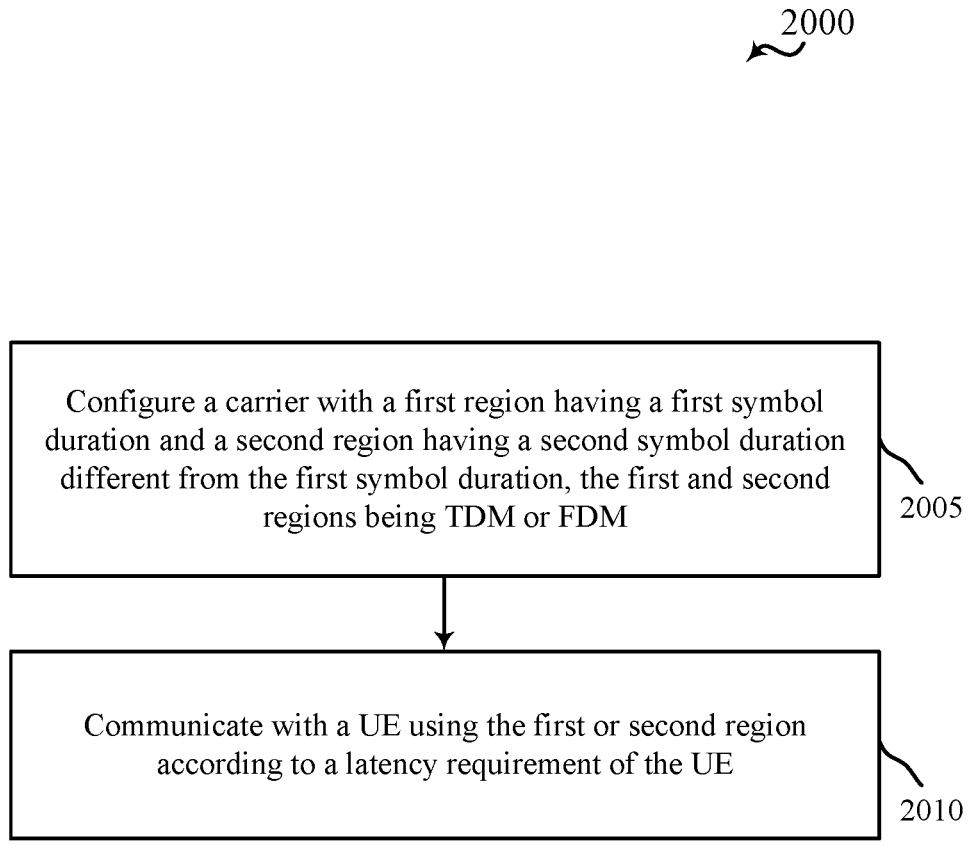
FIG. 20 is a flowchart conceptually illustrating an example of a method of wireless communication, in accordance with aspects of the present disclosure.

FIG. 20 is a flowchart conceptually illustrating an example of a method of wireless communication, in accordance with aspects of the present disclosure. For clarity, the method 2000 is described below with reference to ones of the access points, eNBs, UEs, or devices 105, 115, 1105, and/or 1155 described with reference to FIGS. 1, 7, 11A, 11B, 12, 13, and/or 15. In one example, an eNB may execute one or more sets of codes to control the functional elements of the eNB to perform the functions described below.

At block 2005, the eNB may configure a carrier with a first region having a first symbol duration and a second region having a second symbol duration different from the first symbol duration, the first and second regions being TDM or FDM. In some examples, second symbol duration is shorter than the first symbol duration. The operation(s) at block 2005 may in some cases be performed using the layer configuration module 1120 and/or 1160 described with reference to FIGS. 11A and/or 11B, the eNB region configuration module 1297 described with reference to FIG. 12, and/or the processor 1540 and related components described with reference to FIG. 15.

At block 2010, the eNB may communicate with a UE using the first or second region according to a latency requirement of the UE. This may include transmitting a signal in a symbol of the first region, where the signal is indicative of the second symbol duration. The signal may be RRC signaling, a broadcast message, Layer 1 signaling, MAC layer signaling, or the like. The operation(s) at block 2010 may in some cases be performed using the receiver modules 1110 or 1110-*a* or transmitter modules 1130 or 1130-*a* of FIG. 11A or 11B, the transceiver modules 1255 of FIG. 12, and/or the processor 1540 and related components FIG. 15.

In some examples, the method 1600 may also include adjusting a portion of the carrier occupied by the second region based at least in part on the latency requirement of the UE. This may include adjusting a time duration or periodicity of the second region; or it may include adjusting a bandwidth of the second region. These adjusting operations may be performed by the clock module 1180 or scalable bandwidth module 1185 of FIG. 11B, or the eNB clock module 1290 or eNB scalable bandwidth module 1295 of FIG. 12.

The method 2000 may also include configuring a guard band between the first and second regions. Additionally or alternatively, the method 2000 may include configuring a third region of the carrier with the second symbol duration. In various examples, the first and second regions may be FDM, and the third region may be TDM with the first and second regions. The operations of configuring the third region or the guard band, or both, may be performed by the region configuration module 1190 of FIG. 11B, eNB region configuration module 1297 of FIG. 12, or the processor 1540 and related components of FIG. 15.

Figure 21:
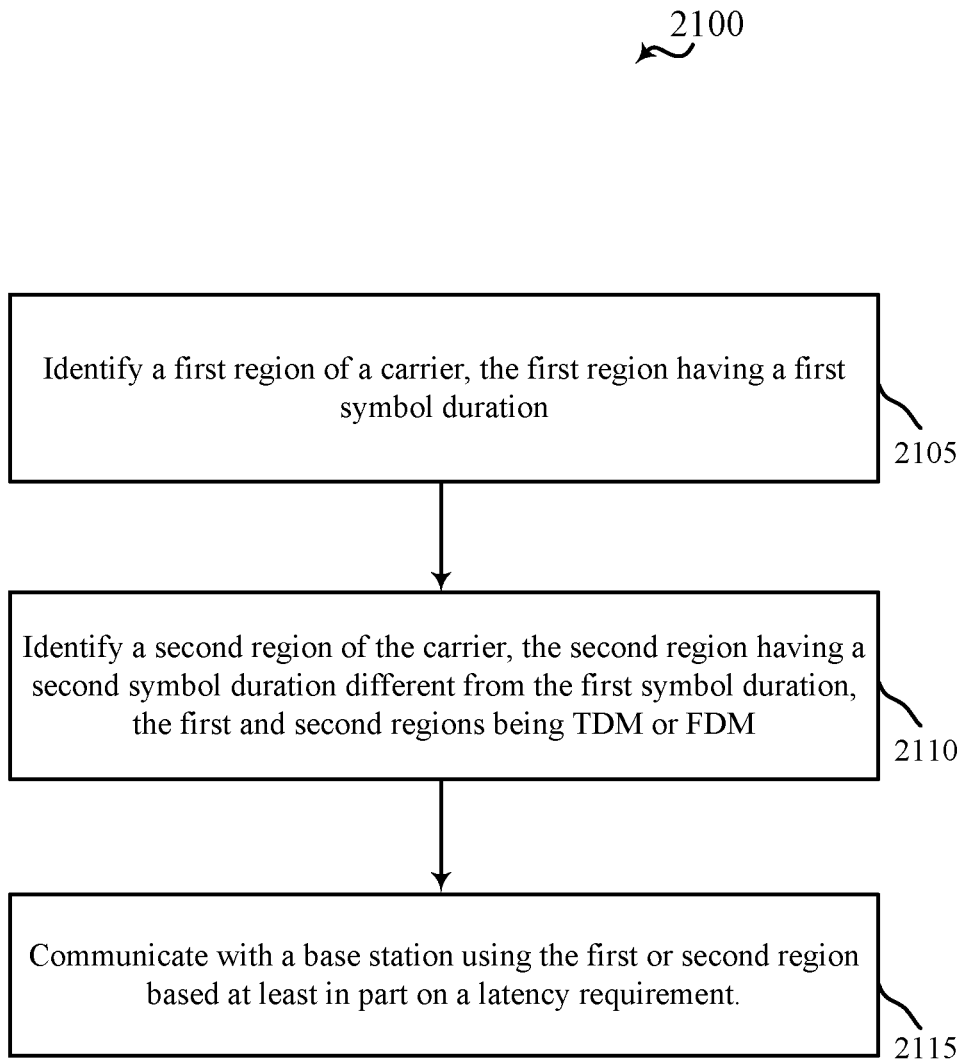
FIG. 21 is a flowchart conceptually illustrating an example of a method of wireless communication, in accordance with aspects of the present disclosure.

FIG. 21 is a flowchart conceptually illustrating an example of a method of wireless communication, in accordance with aspects of the present disclosure. For clarity, the method 2100 is described below with reference to ones of the access points, eNBs, UEs, or devices 105, 115, 1105, and/or 1155 described with reference to FIGS. 1, 7, 11A, 11B, 12, 13, and/or 15. In one example, a UE may execute one or more sets of codes to control the functional elements of the UE to perform the functions described below.

At block 2105, the UE may identify a first region having a first symbol duration. The operation(s) at block 2105 may in some cases be performed using the layer configuration module 1120 and/or 1160 described with reference to FIGS. 11A and/or 11B, the UE region configuration module 1367 described with reference to FIG. 13, and/or the processor 1580 and related components described with reference to FIG. 15.

At block 2110, the UE may identify a second region having a second symbol duration different from the first symbol duration, the first and second regions being TDM or FDM. In some examples, second symbol duration is shorter than the first symbol duration. The operation(s) at block 2105 may in some cases be performed using the layer configuration module 1120 and/or 1160 described with reference to FIGS. 11A and/or 11B, the UE region configuration module 1367 described with reference to FIG. 13, and/or the processor 1580 and related components described with reference to FIG. 15.

At block 2115, the UE may communicate with a base station using the first or second region based at least in part on a latency requirement. This may include receiving a signal in a symbol of the first region, where the signal is indicative of the second symbol duration. The signal may be RRC signaling, a broadcast message, Layer 1 signaling, MAC layer signaling, or the like. The operation(s) at block 2115 may in some cases be performed using the receiver modules 1110 or 1110-*a* or transmitter modules 1130 or 1130-*a* of FIG. 11A or 11B, the transceiver modules 1370 of FIG. 12, and/or the processor 1580 and related components FIG. 15.

In some examples, the method 2100 may also include identifying a guard band between the first and second regions. Additionally or alternatively, the method 2100 may include identifying a third region of the carrier with the second symbol duration. In various examples, the first and second regions may be FDM, and the third region may be TDM with the first and second regions. The operations of identifying the third region or the guard band, or both, may be performed by the region configuration module 1190 of FIG. 11B, UE region configuration module 1367 of FIG. 13, or the processor 1580 and related components of FIG. 15.

The detailed description set forth above in connection with the appended drawings describes exemplary embodiments and does not represent the only examples that may be implemented or that are within the scope of the claims. The term "exemplary" used throughout this description means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication by a base station, comprising:
   configuring a carrier with a first region having a first symbol duration and a second region having a second symbol duration different from the first symbol duration, wherein the first and second regions are time division multiplexed (TDM) or frequency-division multiplexed (FDM), wherein the first region includes a control channel and a shared channel, and the second region includes a control channel and a shared channel, wherein the second region includes both downlink symbols and uplink symbols, and wherein the second symbol duration is configurable; and
   communicating with a user equipment (UE) by the base station using the first region or the second region of the carrier.

2. The method of claim 1, further comprising:
   adjusting a portion of the carrier occupied by the second region based at least in part on a latency requirement of the UE.

3. The method of claim 2, wherein adjusting the portion of the carrier occupied by the second region comprises:
   adjusting a bandwidth of the second region.

4. The method of claim 1, wherein configuring the carrier comprises:
   transmitting a signal in a symbol of the first region, the signal indicative of the second symbol duration and comprising at least one of radio resource control (RRC) signaling, a broadcast message, Layer 1 signaling, or a media access control (MAC) layer signaling.

5. The method of claim 1, wherein the shared channel of the first region comprises a first physical downlink shared channel (PDSCH), and the control channel of the first region comprises a first physical downlink control channel (PDCCH); and
   wherein the shared channel of the second region comprises a second physical downlink shared channel (PDSCH), and the control channel of the second region comprises a second physical downlink control channel (PDCCH).

6. The method of claim 1, wherein the first region comprises a first number of orthogonal frequency division multiplexing (OFDM) symbols, and the second region comprises a second number of OFDM symbols that is different from the first number of OFDM symbols; and
   wherein each of the OFDM symbols in the first region have the first symbol duration, and each of the OFDM symbols in the second region have the second symbol duration that is different than the first symbol duration.

7. The method of claim 1, wherein the first region has a 15 kHz subcarrier spacing, and the second region has a 60 kHz or 120 kHz subcarrier spacing.

8. The method of claim 1, wherein the first region has a first bandwidth and wherein the second region has a second bandwidth different from the first bandwidth.

9. The method of claim 1, wherein a symbol associated with the first symbol duration comprises an orthogonal frequency-division multiplexing (OFDM) symbol or a single carrier frequency division multiplex (SC-FDM) symbol, and a symbol associated with the second symbol duration comprises an OFDM symbol or a SC-FDM symbol.

10. The method of claim 1, wherein the second region has a shorter symbol duration than the first region, and wherein communicating with the UE comprises communicating with the UE using the second region based at least in part on a latency requirement of the UE and that the second region serves lower latency traffic of the UE than the first region due to the shorter symbol duration of the second region.

11. A method of wireless communication by a user equipment (UE), comprising:
identifying a first region of a carrier, the first region having a first symbol duration, wherein the first region includes a control channel and a shared channel;
identifying a second region of the carrier, the second region having a second symbol duration different from the first symbol duration, wherein the first and second regions are time division multiplexed (TDM) or frequency-division multiplexed (FDM), wherein the second region includes a control channel and a shared channel, wherein the second region includes both downlink symbols and uplink symbols, and wherein the second symbol duration is configurable; and
communicating with a base station by the UE using the first region or the second region of the carrier.

12. The method of claim 11, wherein identifying the second region of the carrier comprises:
receiving a signal in a symbol of the first region, the signal indicative of the second symbol duration and comprising at least one of radio resource control (RRC) signaling, a broadcast message, Layer 1 signaling, or a media access control (MAC) layer signaling.

13. The method of claim 11, wherein communicating with the base station comprises using either the first region or the second region based at least in part on a latency requirement of the UE and a difference in symbol duration between the first region and the second region.

14. The method of claim 11, wherein the shared channel of the first region comprises a first physical downlink shared channel (PDSCH), and the control channel of the first region comprises a first physical downlink control channel (PDCCH); and
wherein the shared channel of the second region comprises a second physical downlink shared channel (PDSCH), and the control channel of the second region comprises a second physical downlink control channel (PDCCH).

15. The method of claim 11, wherein the first region has a 15 kHz subcarrier spacing, and the second region has a 60 kHz or 120 kHz subcarrier spacing.

16. The method of claim 11, wherein the first region comprises a first number of orthogonal frequency division multiplexing (OFDM) symbols, and the second region comprises a second number of OFDM symbols that is different from the first number of OFDM symbols; and
wherein each of the OFDM symbols in the first region have the first symbol duration, and each of the OFDM symbols in the second region have the second symbol duration that is different than the first symbol duration.

17. The method of claim 11, wherein the first region has a first bandwidth and wherein the second region has a second bandwidth different from the first bandwidth.

18. The method of claim 11, wherein a symbol associated with the first symbol duration comprises an orthogonal frequency-division multiplexing (OFDM) symbol or a single carrier frequency division multiplex (SC-FDM) symbol, and a symbol associated with the second symbol duration comprises an OFDM symbol or a SC-FDM symbol.

19. The method of claim 11, wherein the second region has a shorter symbol duration than the first region, and wherein communicating with the base station comprises communicating with the base station using the second region based at least in part on a latency requirement of the UE and that the second region serves lower latency traffic of the UE than the first region due to the shorter symbol duration of the second region.

20. An apparatus for wireless communication, comprising:
a processor; and
a memory coupled with the processor, wherein the memory includes instructions executable by the processor to cause a base station to:
configure a carrier with a first region having a first symbol duration and a second region having a second symbol duration different from the first symbol duration, wherein the first and second regions are time division multiplexed (TDM) or frequency-division multiplexed (FDM), wherein the first region includes a control channel and a shared channel, and the second region includes a control channel and a shared channel, wherein the second region includes both downlink symbols and uplink symbols, and wherein the second symbol duration is configurable; and
communicate with a user equipment (UE) by the base station using the first region or the second region of the carrier.

21. The apparatus of claim 20, wherein the instructions are further executable by the processor to cause the base station to:
adjust a bandwidth of the carrier occupied by the second region based at least in part on a latency requirement of the UE.

22. The apparatus of claim 20, wherein the shared channel of the first region comprises a first physical downlink shared channel (PDSCH), and the control channel of the first region comprises a first physical downlink control channel (PDCCH); and
wherein the shared channel of the second region comprises a second physical downlink shared channel (PDSCH), and the control channel of the second region comprises a second physical downlink control channel (PDCCH).

23. The apparatus of claim 20, wherein the first region comprises a first number of orthogonal frequency division multiplexing (OFDM) symbols, and the second region comprises a second number of OFDM symbols that is different from the first number of OFDM symbols; and
wherein each of the OFDM symbols in the first region have the first symbol duration, and each of the OFDM symbols in the second region have the second symbol duration that is different than the first symbol duration.

24. An apparatus for wireless communication, comprising:
a processor; and
a memory coupled with the processor, wherein the memory includes instructions executable by the processor to cause a user equipment (UE) to:

identify a first region of a carrier, the first region having a first symbol duration, wherein the first region includes a control channel and a shared channel;

identify a second region of the carrier, the second region having a second symbol duration different from the first symbol duration, wherein the first and second regions are time division multiplexed (TDM) or frequency-division multiplexed (FDM), wherein the second region includes a control channel and a shared channel, wherein the second region includes both downlink symbols and uplink symbols, and wherein the second symbol duration is configurable; and communicate with a base station by the UE using the first region or the second region of the carrier.

25. The apparatus of claim 24, wherein the instructions are further executable by the processor to cause the UE to:

receive a signal in a symbol of the first region, the signal indicative of the second symbol duration and comprising at least one of radio resource control (RRC) signaling, a broadcast message, Layer 1 signaling, or a media access control (MAC) layer signaling.

26. The apparatus of claim 24, wherein the instructions are further executable by the processor to cause the UE to use either the first region or the second region based at least in part on a latency requirement of the UE and a difference in symbol duration between the first region and the second region.

27. The apparatus of claim 24, wherein the shared channel of the first region comprises a first physical downlink shared channel (PDSCH), and the control channel of the first region comprises a first physical downlink control channel (PDCCH); and wherein the shared channel of the second region comprises a second physical downlink shared channel (PDSCH), and the control channel of the second region comprises a second physical downlink control channel (PDCCH).

28. The apparatus of claim 24, wherein the first region has a 15 kHz subcarrier spacing, and the second region has a 60 kHz or 120 kHz subcarrier spacing.

29. The apparatus of claim 24, wherein the first region comprises a first number of orthogonal frequency division multiplexing (OFDM) symbols, and the second region comprises a second number of OFDM symbols that is different from the first number of OFDM symbols; and wherein each of the OFDM symbols in the first region have the first symbol duration, and each of the OFDM symbols in the second region have the second symbol duration that is different than the first symbol duration.

30. The apparatus of claim 24, wherein the second region has a shorter symbol duration than the first region, and wherein the instructions that cause the UE to communicate with the base station are further executable by the processor to cause the UE to communicate with the base station using the second region based at least in part on a latency requirement of the UE and that the second region serves lower latency traffic of the UE than the first region due to the shorter symbol duration of the second region.

* * * * *